(12) United States Patent
Sanders et al.

(10) Patent No.: US 12,443,422 B2
(45) Date of Patent: Oct. 14, 2025

(54) USER INTERFACES FOR CALIBRATIONS AND/OR SYNCHRONIZATIONS

(71) Applicant: Apple Inc., Cupertino, CA (US)

(72) Inventors: Christopher John Sanders, San Jose, CA (US); Dennis Sungwoo Park, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/341,121

(22) Filed: Jun. 7, 2021

(65) Prior Publication Data

US 2021/0382736 A1 Dec. 9, 2021

Related U.S. Application Data

(60) Provisional application No. 63/036,284, filed on Jun. 8, 2020.

(51) Int. Cl.
*G06F 9/451* (2018.01)
*G06F 3/16* (2006.01)

(52) U.S. Cl.
CPC .............. *G06F 9/453* (2018.02); *G06F 3/167* (2013.01)

(58) Field of Classification Search
CPC ................................. G06F 9/453; G06F 3/167
See application file for complete search history.

(56) References Cited

U.S. PATENT DOCUMENTS

| | | | |
|---|---|---|---|
| 6,323,846 B1 | 11/2001 | Westerman et al. | |
| 6,570,557 B1 | 5/2003 | Westerman et al. | |
| 6,677,932 B1 | 1/2004 | Westerman | |
| 6,937,249 B2* | 8/2005 | Herbert | G09G 5/00 345/581 |
| 7,614,008 B2 | 11/2009 | Ording | |
| 7,630,501 B2 | 12/2009 | Blank et al. | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,701,489 B1* | 4/2010 | Christie | H04N 9/735 348/224.1 |

(Continued)

FOREIGN PATENT DOCUMENTS

| | | |
|---|---|---|
| CN | 106415721 A | 2/2017 |
| CN | 107430501 A | 12/2017 |

(Continued)

OTHER PUBLICATIONS

Advisory Action received for U.S. Appl. No. 14/863,099, mailed on Sep. 8, 2016, 3 pages.

(Continued)

*Primary Examiner* — Matthew Ell
*Assistant Examiner* — Alvaro R Calderon, IV
(74) *Attorney, Agent, or Firm* — Kubota & Basol LLP

(57) ABSTRACT

In some embodiments, a first electronic device displays a user interface with a first electronic device directing placement of a second electronic device to calibrate and/or synchronize the output(s) of one or more third electronic devices or the first electronic device. In some embodiments, a first electronic device evaluates the position of a first electronic device to perform a calibration and/or synchronization of one or more outputs of another electronic device.

27 Claims, 52 Drawing Sheets

(56) References Cited

U.S. PATENT DOCUMENTS

| | | |
|---|---|---|
| 7,844,914 B2 | 11/2010 | Andre et al. |
| 7,957,762 B2 | 6/2011 | Herz et al. |
| 7,987,294 B2 | 7/2011 | Bryce et al. |
| 8,006,002 B2 | 8/2011 | Kalayjian et al. |
| 8,234,395 B2 | 7/2012 | Millington |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 8,483,853 B1 | 7/2013 | Lambourne |
| 8,624,836 B1 | 1/2014 | Miller et al. |
| 8,995,687 B2 | 3/2015 | Marino et al. |
| 9,348,458 B2 | 5/2016 | Hotelling et al. |
| 9,794,710 B1 | 10/2017 | Sheen |
| 9,933,937 B2 | 4/2018 | Lemay et al. |
| 9,979,998 B1 | 5/2018 | Pogue et al. |
| 10,097,942 B2 | 10/2018 | Griffiths et al. |
| 10,284,980 B1 | 5/2019 | Woo et al. |
| 10,609,505 B1 | 3/2020 | Pires et al. |
| 10,906,475 B2 | 2/2021 | Wang et al. |
| 10,911,748 B1* | 2/2021 | Molholm ............ G09G 3/2003 |
| 11,363,382 B2 | 6/2022 | Carrigan et al. |
| 2001/0031622 A1 | 10/2001 | Kivela et al. |
| 2002/0015024 A1 | 2/2002 | Westerman et al. |
| 2002/0068600 A1 | 6/2002 | Chihara et al. |
| 2002/0095508 A1 | 7/2002 | Okazawa |
| 2002/0116172 A1 | 8/2002 | Vargas |
| 2002/0128036 A1 | 9/2002 | Yach et al. |
| 2002/0142734 A1 | 10/2002 | Wickstead |
| 2003/0092395 A1 | 5/2003 | Gassho et al. |
| 2003/0101340 A1 | 5/2003 | Sato |
| 2003/0108039 A1 | 6/2003 | Shell et al. |
| 2003/0120936 A1 | 6/2003 | Farris et al. |
| 2003/0122806 A1* | 7/2003 | Edge .................... H04N 1/6011 345/204 |
| 2003/0144009 A1 | 7/2003 | Nowlin |
| 2003/0158917 A1 | 8/2003 | Andrew et al. |
| 2004/0010569 A1 | 1/2004 | Thomas et al. |
| 2004/0063464 A1 | 4/2004 | Akram et al. |
| 2004/0151476 A1 | 8/2004 | Suzuki |
| 2004/0203354 A1 | 10/2004 | Yue |
| 2004/0220869 A1 | 11/2004 | Perera |
| 2005/0097229 A1 | 5/2005 | Saito et al. |
| 2005/0177256 A1 | 8/2005 | Shintani et al. |
| 2005/0190059 A1 | 9/2005 | Wehrenberg |
| 2005/0210525 A1 | 9/2005 | Carle et al. |
| 2005/0228638 A1 | 10/2005 | Muramatsu |
| 2006/0017692 A1 | 1/2006 | Wehrenberg et al. |
| 2006/0023246 A1 | 2/2006 | Vidyanand |
| 2006/0033724 A1 | 2/2006 | Chaudhri et al. |
| 2006/0101449 A1 | 5/2006 | Gatz |
| 2006/0197753 A1 | 9/2006 | Hotelling |
| 2006/0217104 A1 | 9/2006 | Cho |
| 2006/0280360 A1* | 12/2006 | Holub .................. H04N 17/045 382/162 |
| 2006/0293877 A1 | 12/2006 | Soor |
| 2007/0019815 A1 | 1/2007 | Asada et al. |
| 2007/0038999 A1 | 2/2007 | Millington |
| 2007/0250597 A1 | 10/2007 | Resner et al. |
| 2008/0007768 A1 | 1/2008 | Cho |
| 2008/0048837 A1 | 2/2008 | Montgomery et al. |
| 2008/0068139 A1 | 3/2008 | Jam et al. |
| 2008/0070561 A1 | 3/2008 | Keum et al. |
| 2008/0168245 A1 | 7/2008 | De et al. |
| 2008/0259829 A1 | 10/2008 | Rosenblatt |
| 2009/0060170 A1 | 3/2009 | Coughlan et al. |
| 2009/0064038 A1 | 3/2009 | Fleischman et al. |
| 2009/0195497 A1 | 8/2009 | Fitzgerald et al. |
| 2009/0231960 A1 | 9/2009 | Hutcheson |
| 2009/0300010 A1 | 12/2009 | Ratnakar |
| 2009/0311993 A1 | 12/2009 | Horodezky |
| 2010/0100838 A1 | 4/2010 | Vigesaa et al. |
| 2010/0180017 A1 | 7/2010 | Goldstein |
| 2011/0059769 A1 | 3/2011 | Brunolli |
| 2011/0223862 A1* | 9/2011 | Satoh .................... H03J 9/02 455/41.2 |
| 2011/0249015 A1* | 10/2011 | Lonkar ................ G06F 3/1431 345/589 |
| 2012/0016927 A1 | 1/2012 | Leffert et al. |
| 2012/0044062 A1 | 2/2012 | Jersa et al. |
| 2012/0074851 A1* | 3/2012 | Erinjippurath ........... G09G 3/20 315/158 |
| 2012/0127324 A1* | 5/2012 | Dickins ................ H04N 17/04 348/191 |
| 2012/0237037 A1 | 9/2012 | Ninan et al. |
| 2013/0027341 A1 | 1/2013 | Mastandrea |
| 2013/0109310 A1* | 5/2013 | Mine .................... G06F 1/1632 455/41.1 |
| 2013/0205208 A1* | 8/2013 | Kim ...................... G11B 27/34 715/716 |
| 2013/0207996 A1* | 8/2013 | Shibuya ................ G09G 5/003 345/604 |
| 2013/0222270 A1 | 8/2013 | Winkler et al. |
| 2014/0177846 A1 | 6/2014 | Strub |
| 2014/0314250 A1 | 10/2014 | Park et al. |
| 2014/0323036 A1 | 10/2014 | Daley et al. |
| 2014/0328485 A1 | 11/2014 | Saulters |
| 2015/0070337 A1* | 3/2015 | Bell ....................... G09G 3/007 345/207 |
| 2015/0100991 A1 | 4/2015 | Risberg et al. |
| 2015/0206468 A1* | 7/2015 | Wu ........................ G09G 3/2092 345/207 |
| 2015/0317928 A1* | 11/2015 | Safaee-Rad .............. G09G 3/20 345/593 |
| 2015/0317944 A1* | 11/2015 | Safaee-Rad .............. G09G 3/20 345/595 |
| 2015/0348502 A1* | 12/2015 | Marcu ..................... G09G 5/02 345/594 |
| 2015/0373083 A1* | 12/2015 | Geurts .................. H04L 67/025 715/740 |
| 2016/0014266 A1 | 1/2016 | Bhatt |
| 2016/0028869 A1 | 1/2016 | Bhatt |
| 2016/0073210 A1 | 3/2016 | Sheen |
| 2016/0227014 A1* | 8/2016 | Takagi ............... H04M 1/72412 |
| 2016/0292376 A1* | 10/2016 | Sudo ...................... G09G 5/02 |
| 2016/0316305 A1 | 10/2016 | Sheen et al. |
| 2017/0242653 A1 | 8/2017 | Lang et al. |
| 2017/0245079 A1 | 8/2017 | Sheen et al. |
| 2018/0335903 A1 | 11/2018 | Coffman et al. |
| 2019/0102049 A1 | 4/2019 | Anzures et al. |
| 2019/0124458 A1 | 4/2019 | Sheen |
| 2019/0191153 A1* | 6/2019 | Speigle ................... G09G 5/10 |
| 2019/0327406 A1* | 10/2019 | Tokunaga ........... G06F 3/04847 |
| 2020/0359487 A1* | 11/2020 | Tolen ...................... H05B 45/20 |
| 2020/0382872 A1 | 12/2020 | Carrigan et al. |
| 2021/0225322 A1* | 7/2021 | Ichihara ................ G06F 3/147 |
| 2021/0358451 A1* | 11/2021 | Araki .................... G06F 3/1462 |
| 2021/0383773 A1* | 12/2021 | Huss ....................... G09G 5/10 |
| 2023/0035075 A1 | 2/2023 | Carrigan et al. |

FOREIGN PATENT DOCUMENTS

| | | |
|---|---|---|
| CN | 108108146 A | 6/2018 |
| CN | 109257941 A | 1/2019 |
| CN | 109463004 A | 3/2019 |
| EP | 1705883 A1 | 9/2006 |
| WO | 2007/142703 A1 | 12/2007 |
| WO | 2007/149731 A1 | 12/2007 |
| WO | 2013/169849 A2 | 11/2013 |
| WO | 2014/105276 A1 | 7/2014 |
| WO | 2019/011177 A1 | 1/2019 |

OTHER PUBLICATIONS

Examiner's Answer to Appeal Brief received for U.S. Appl. No. 11/850,020, mailed on Nov. 1, 2019, 7 pages.

Examiner's Answer to Appeal Brief received for U.S. Appl. No. 14/774,664, mailed on May 31, 2018, 28 pages.

Examiner's Answer to Appeal Brief received for U.S. Appl. No. 14/863,099, mailed on Jul. 28, 2017, 31 pages.

(56) References Cited

OTHER PUBLICATIONS

Final Office Action received for U.S. Appl. No. 11/850,020, mailed on Dec. 14, 2018, 21 pages.
Final Office Action received for U.S. Appl. No. 11/850,020, mailed on Jun. 4, 2014, 12 pages.
Final Office Action received for U.S. Appl. No. 11/850,020, mailed on Oct. 4, 2012, 10 pages.
Final Office Action received for U.S. Appl. No. 11/850,020, mailed on Oct. 31, 2011, 12 pages.
Final Office Action received for U.S. Appl. No. 11/850,020, mailed on Sep. 22, 2017, 19 pages.
Final Office Action received for U.S. Appl. No. 11/850,020, mailed on Sep. 24, 2015, 14 pages.
Final Office Action received for U.S. Appl. No. 14/774,664, mailed on Aug. 25, 2017, 23 pages.
Final Office Action received for U.S. Appl. No. 14/863,099, mailed on Apr. 21, 2016, 20 pages.
International Search Report received for PCT Patent Application No. PCT/US2014/027882, mailed on Oct. 10, 2014, 4 pages.
International Search Report received for PCT Patent Application No. PCT/US2020/035477, mailed on Sep. 11, 2020, 3 pages.
International Search Report received for PCT Patent Application No. PCT/US2013/032498, mailed on Feb. 10, 2014, 7 pages.
Non-Final Office Action received for U.S. Appl. No. 11/850,020, mailed on Apr. 8, 2016, 14 pages.
Non-Final Office Action received for U.S. Appl. No. 11/850,020, mailed on Feb. 3, 2011, 8 pages.
Non-Final Office Action received for U.S. Appl. No. 11/850,020, mailed on Feb. 10, 2015, 11 pages.
Non-Final Office Action received for U.S. Appl. No. 11/850,020, mailed on Jan. 12, 2017, 18 pages.
Non-Final Office Action received for U.S. Appl. No. 11/850,020, mailed on Jun. 5, 2018, 26 pages.
Non-Final Office Action received for U.S. Appl. No. 11/850,020, mailed on Jun. 14, 2013, 8 pages.
Non-Final Office Action received for U.S. Appl. No. 11/850,020, mailed on May 30, 2012, 12 pages.
Non-Final Office Action received for U.S. Appl. No. 11/850,020, mailed on Nov. 18, 2013, 11 pages.
Non-Final Office Action received for U.S. Appl. No. 14/774,664, mailed on Mar. 7, 2017, 23 pages.
Non-Final Office Action received for U.S. Appl. No. 14/863,099, mailed on Dec. 2, 2015, 12 pages.
Non-Final Office Action received for U.S. Appl. No. 16/667,684, mailed on Oct. 1, 2020, 11 pages.
Notice of Allowance received for U.S. Appl. No. 16/667,684, mailed on Feb. 18, 2022, 6 pages.
Notice of Allowance received for U.S. Appl. No. 16/667,684, mailed on Jun. 10, 2021, 10 pages.
Notice of Allowance received for U.S. Appl. No. 16/667,684, mailed on Oct. 8, 2021, 6 pages.
Patent Board Decision received for U.S. Appl. No. 14/774,664, mailed on Sep. 12, 2019, 8 pages.
Patent Board Decision received for U.S. Appl. No. 14/863,099, mailed on Aug. 22, 2019, 9 pages.
Dharmasena, Anusha, "iMessage-send as Text Message Option", YouTube, Available online at: <https://www.youtube.com/watch?v=hXG-MdlW6FA>, Feb. 19, 2013, 1 page.
Non-Final Office Action received for U.S. Appl. No. 17/806,625, mailed on Jun. 21, 2024, 16 pages.
Search Report received for Chinese Patent Application No. 202080040424.4, mailed on Apr. 20, 2024, 4 pages (2 pages of English Translation and 2 pages of Official Copy).

\* cited by examiner

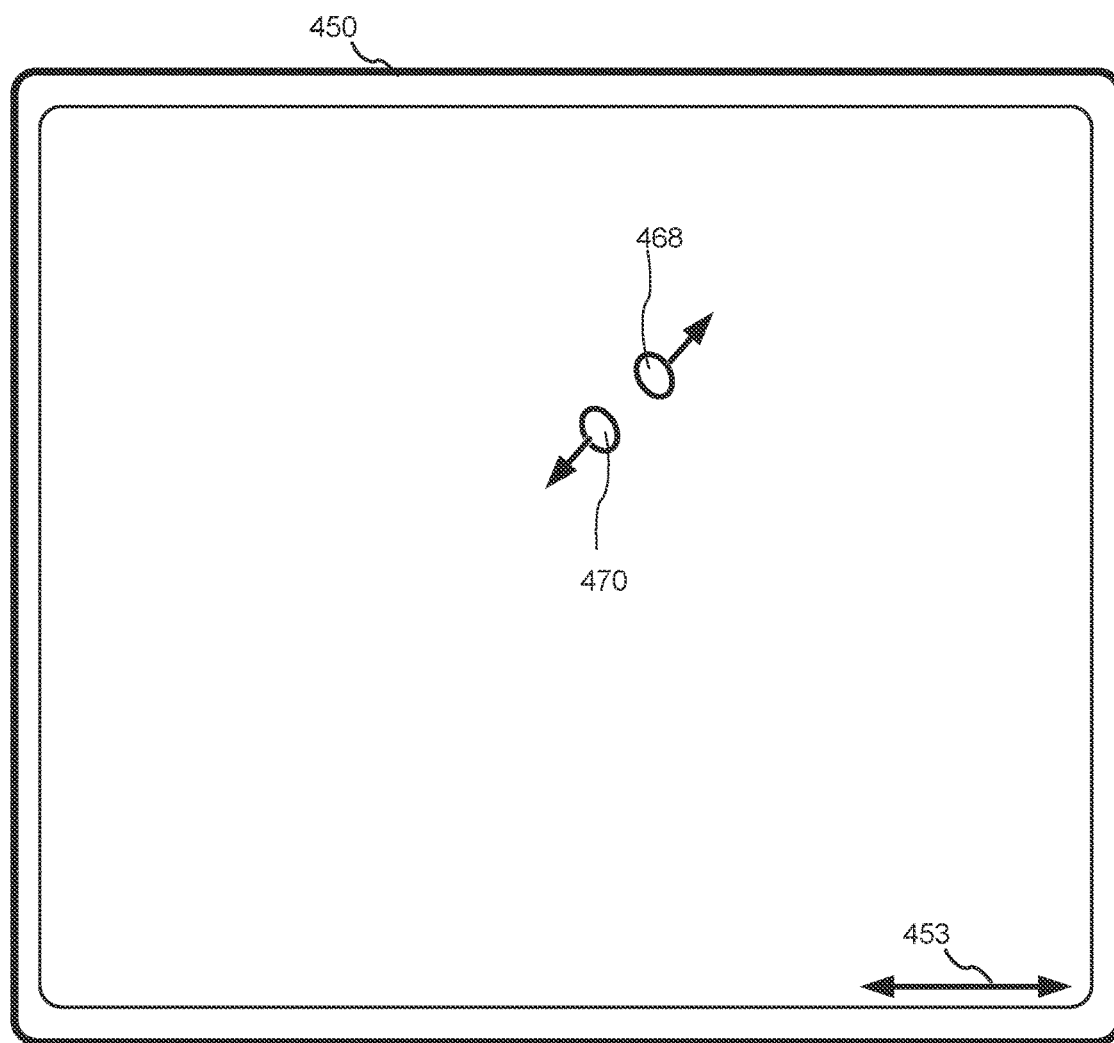
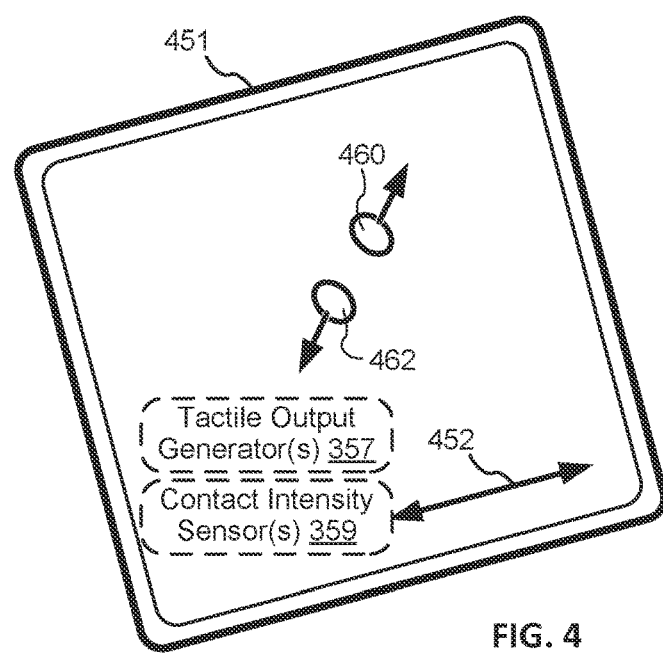
FIG. 4

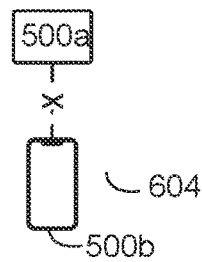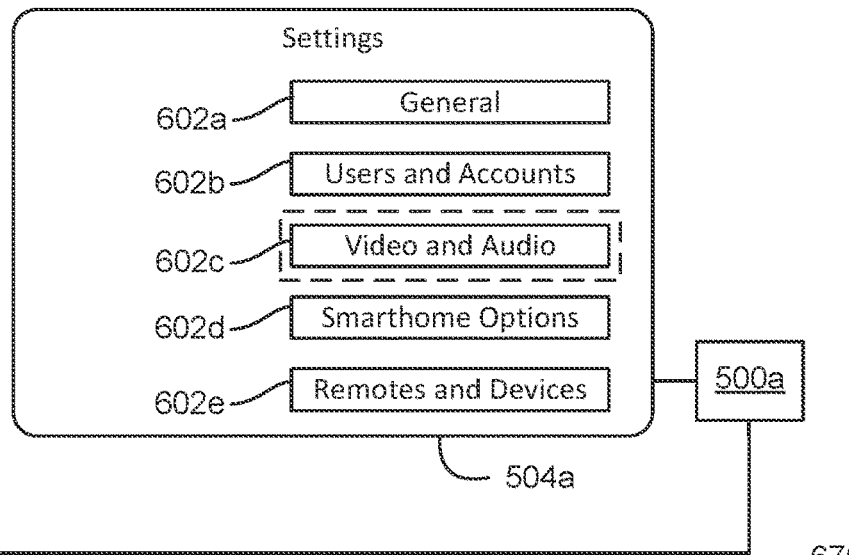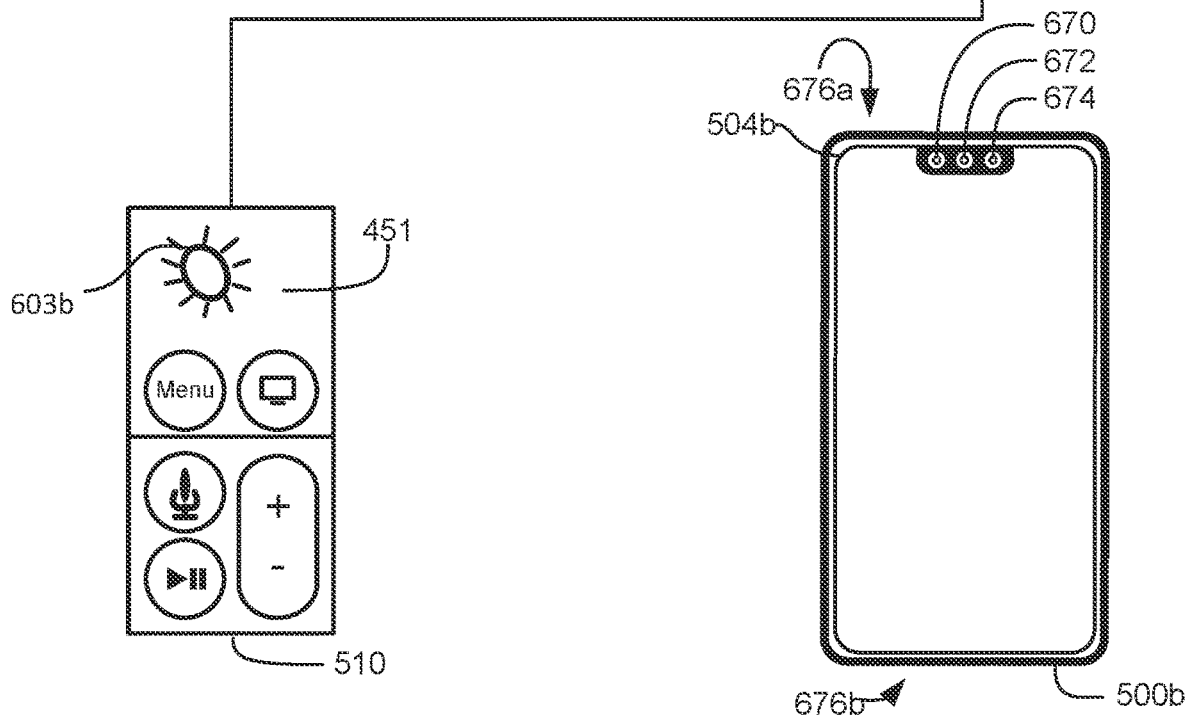
FIG. 6B

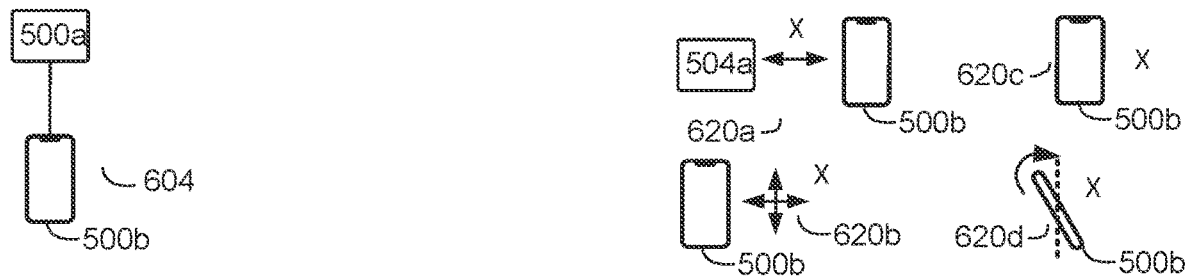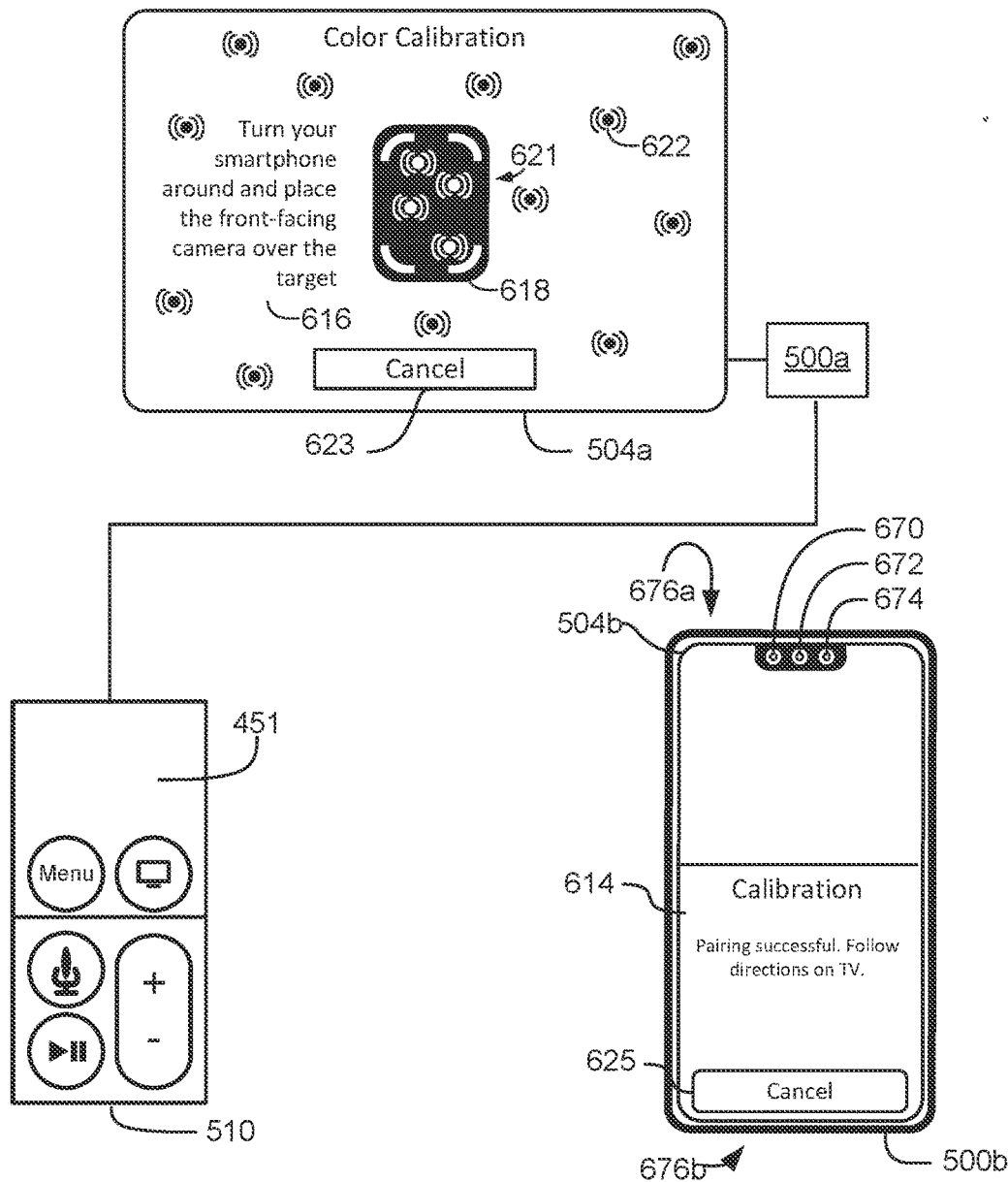
FIG. 6E

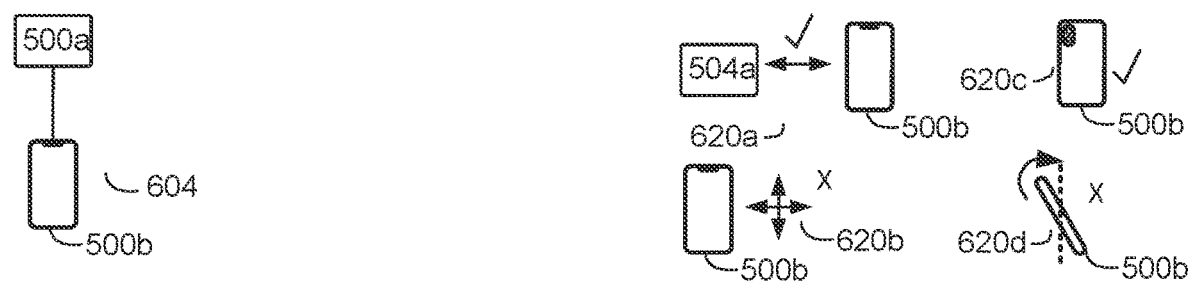
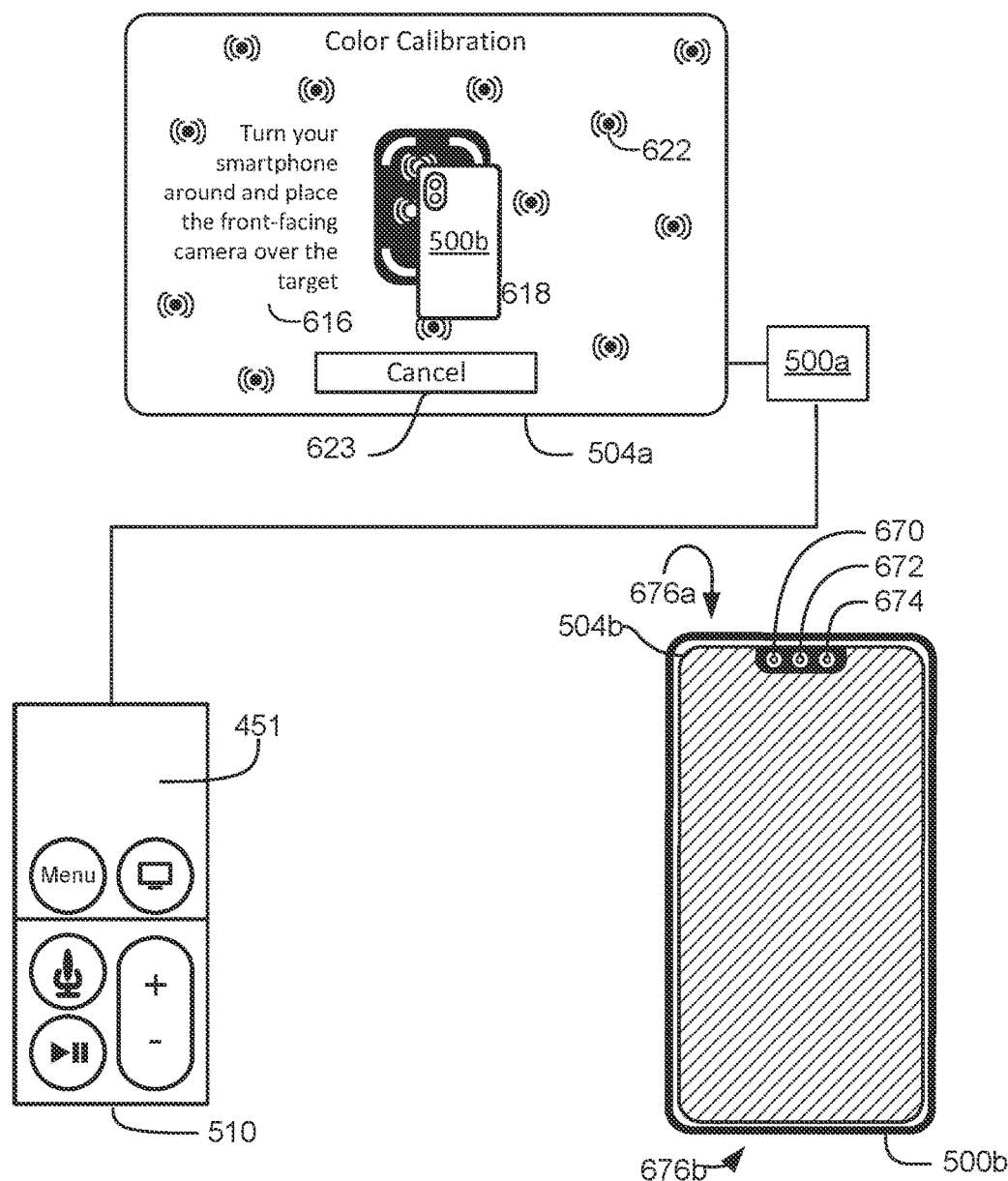
FIG. 6F

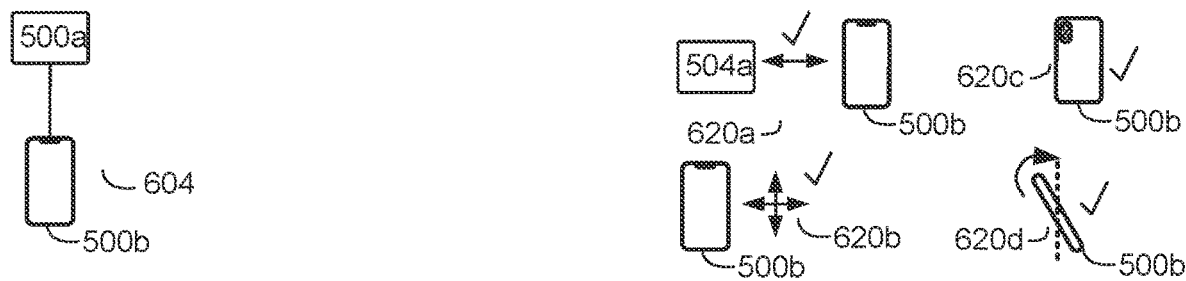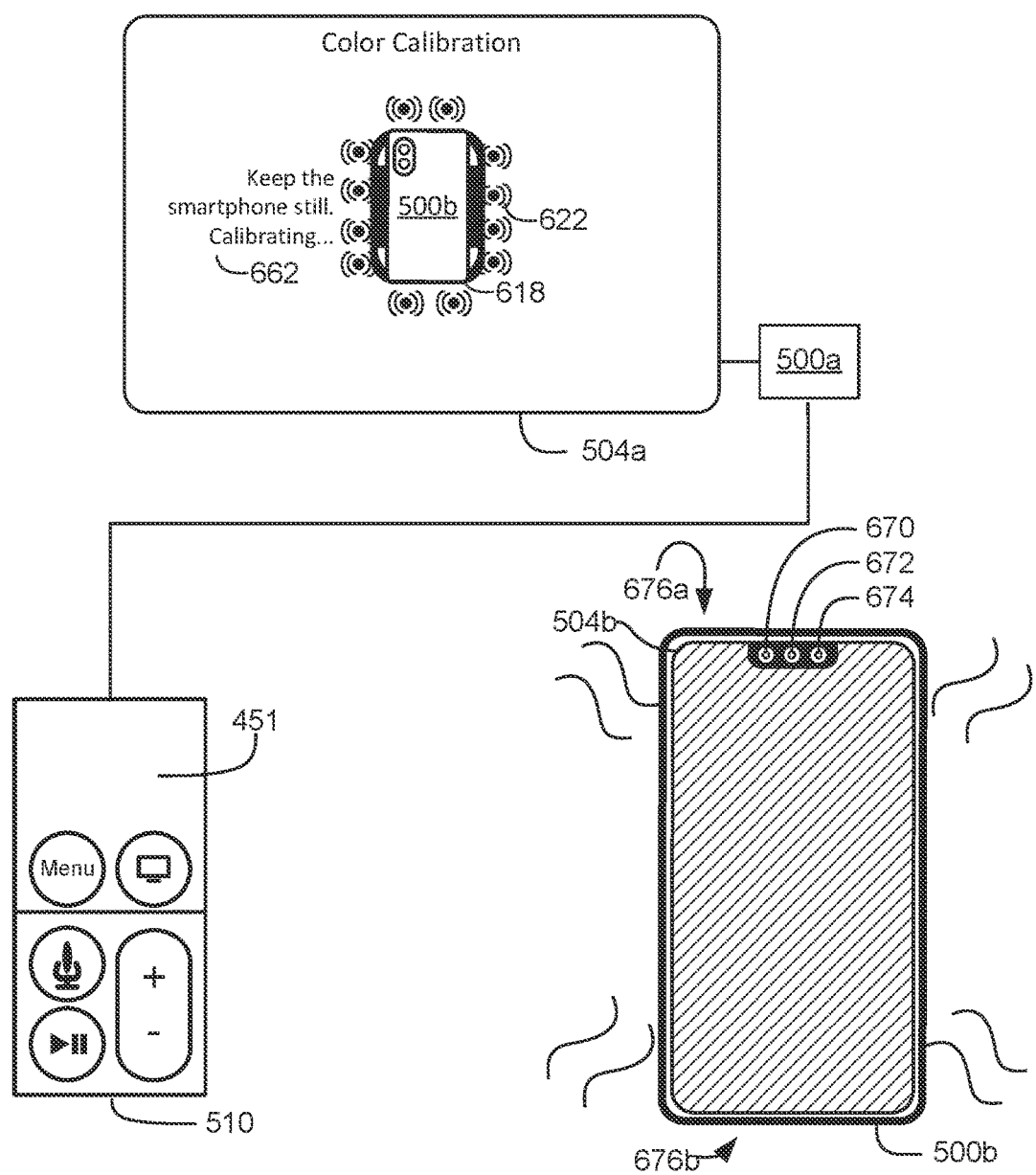
FIG. 6G

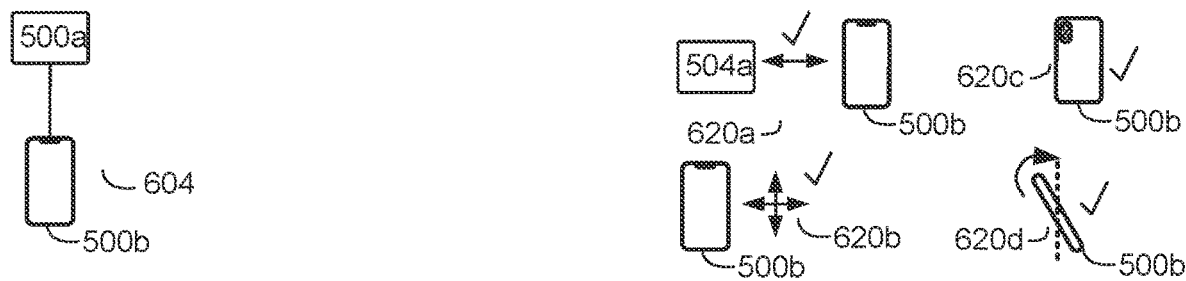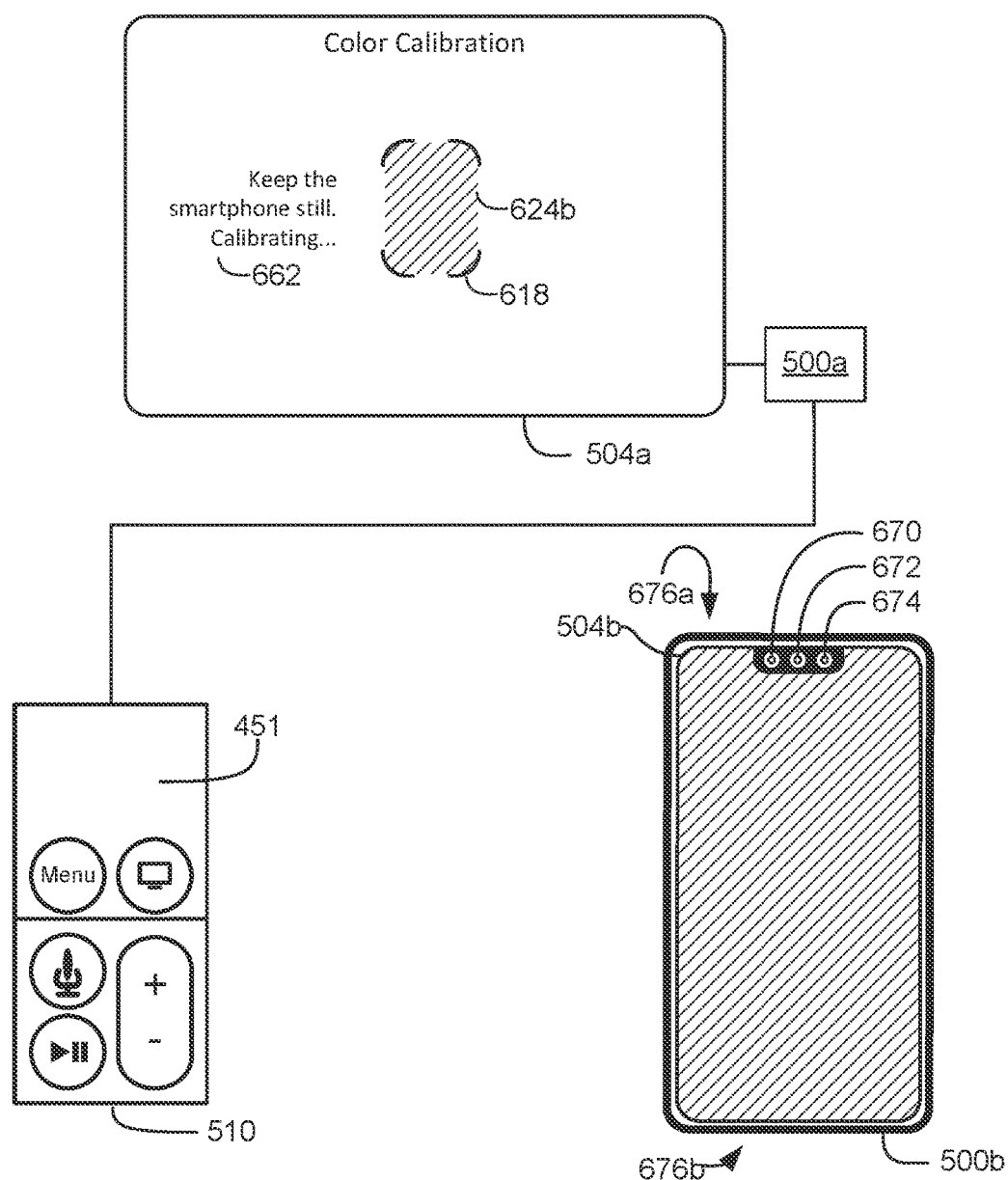
FIG. 6I

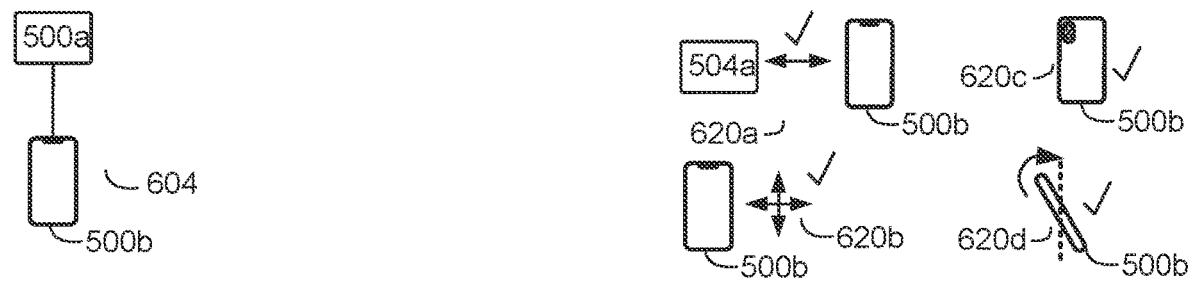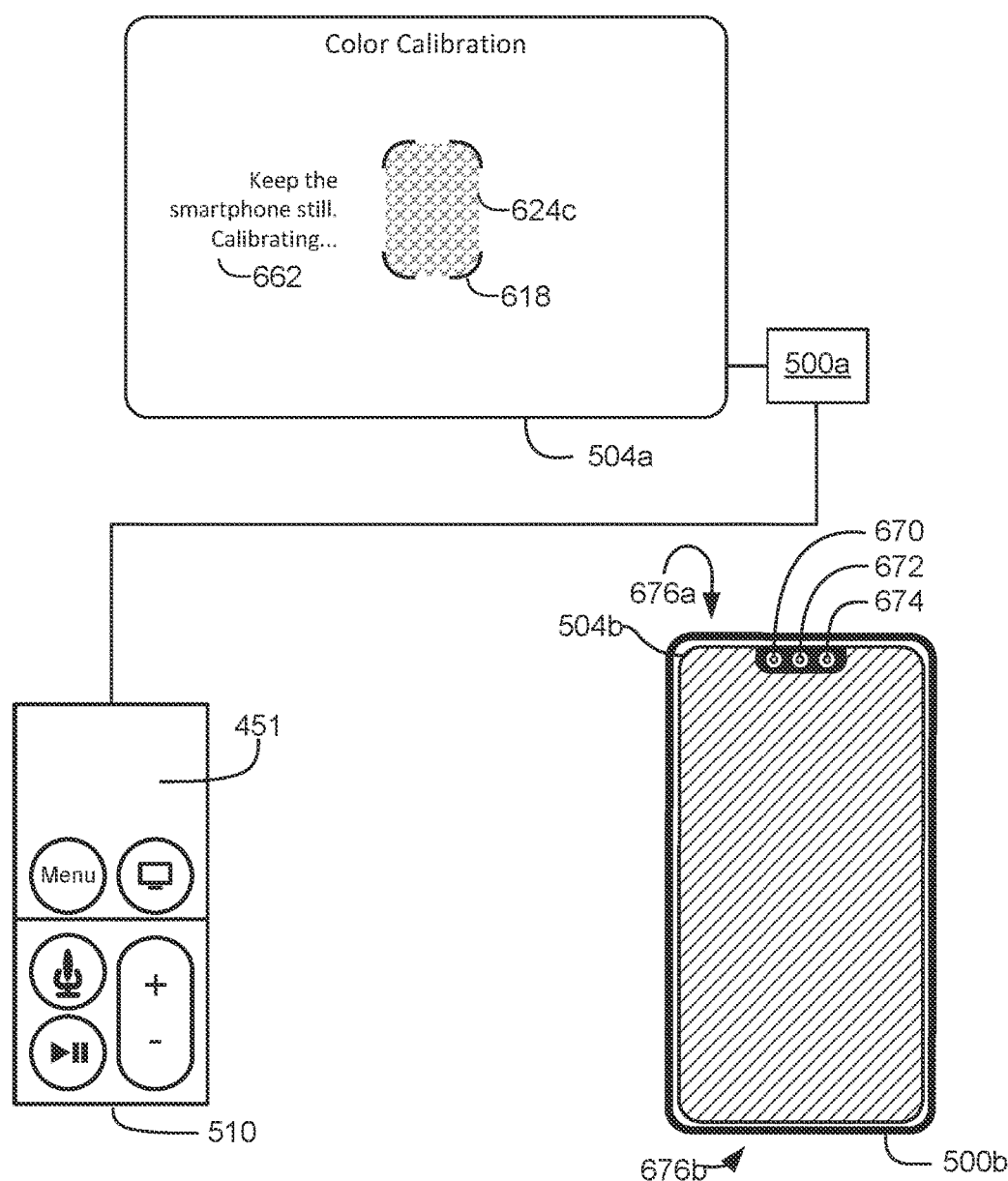
FIG. 6J

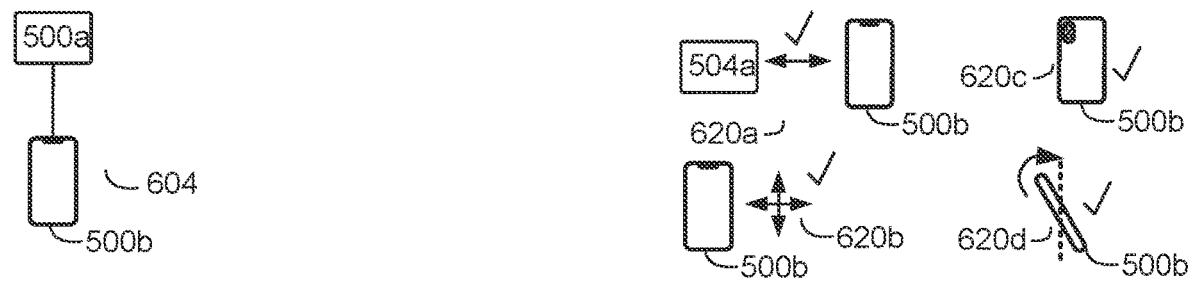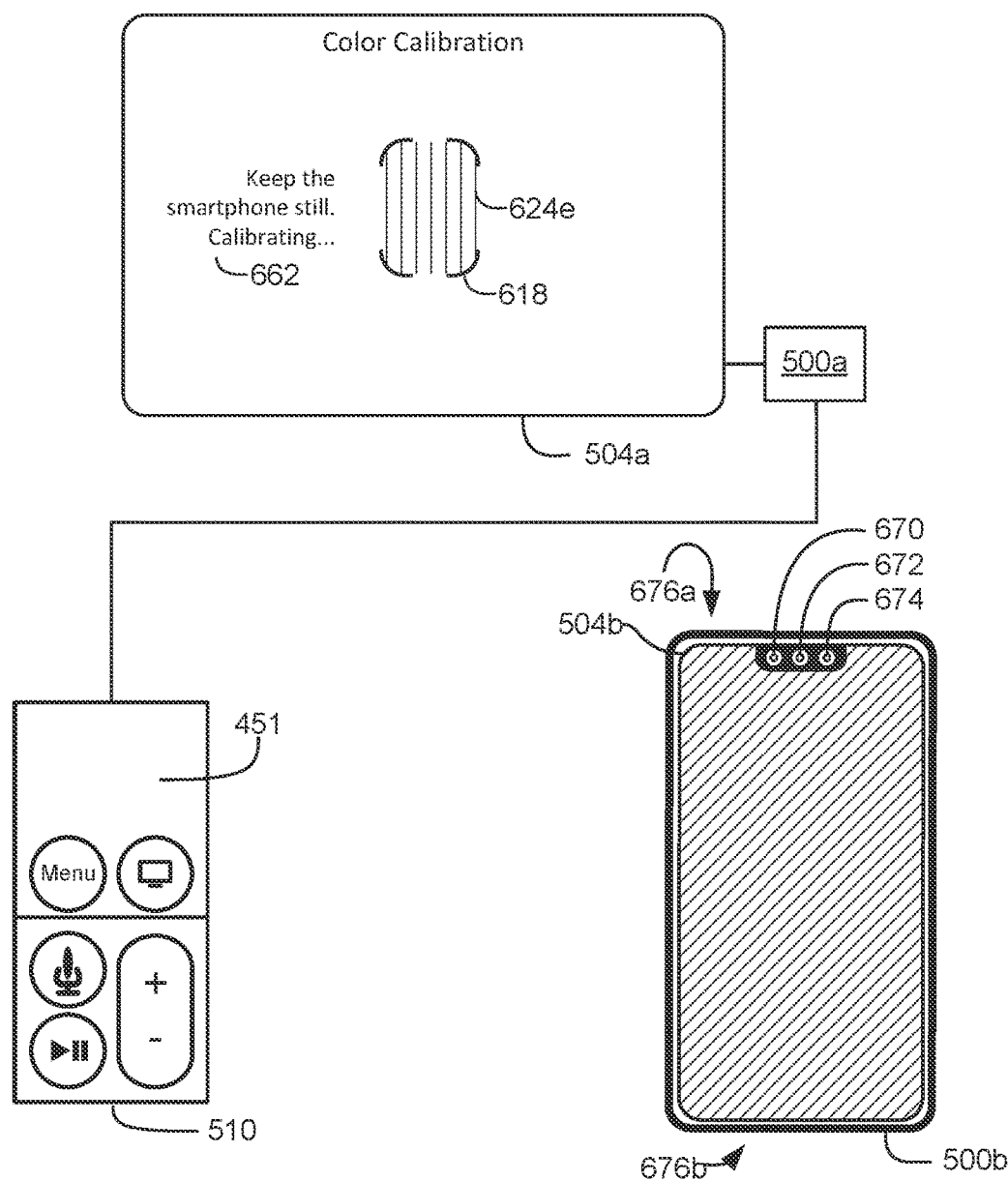
FIG. 6L

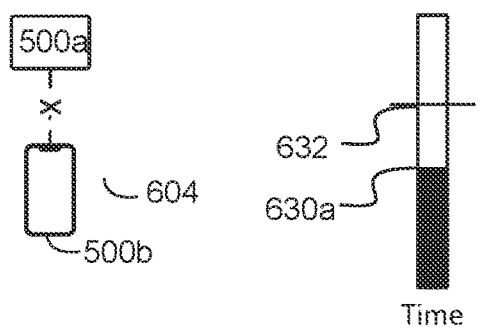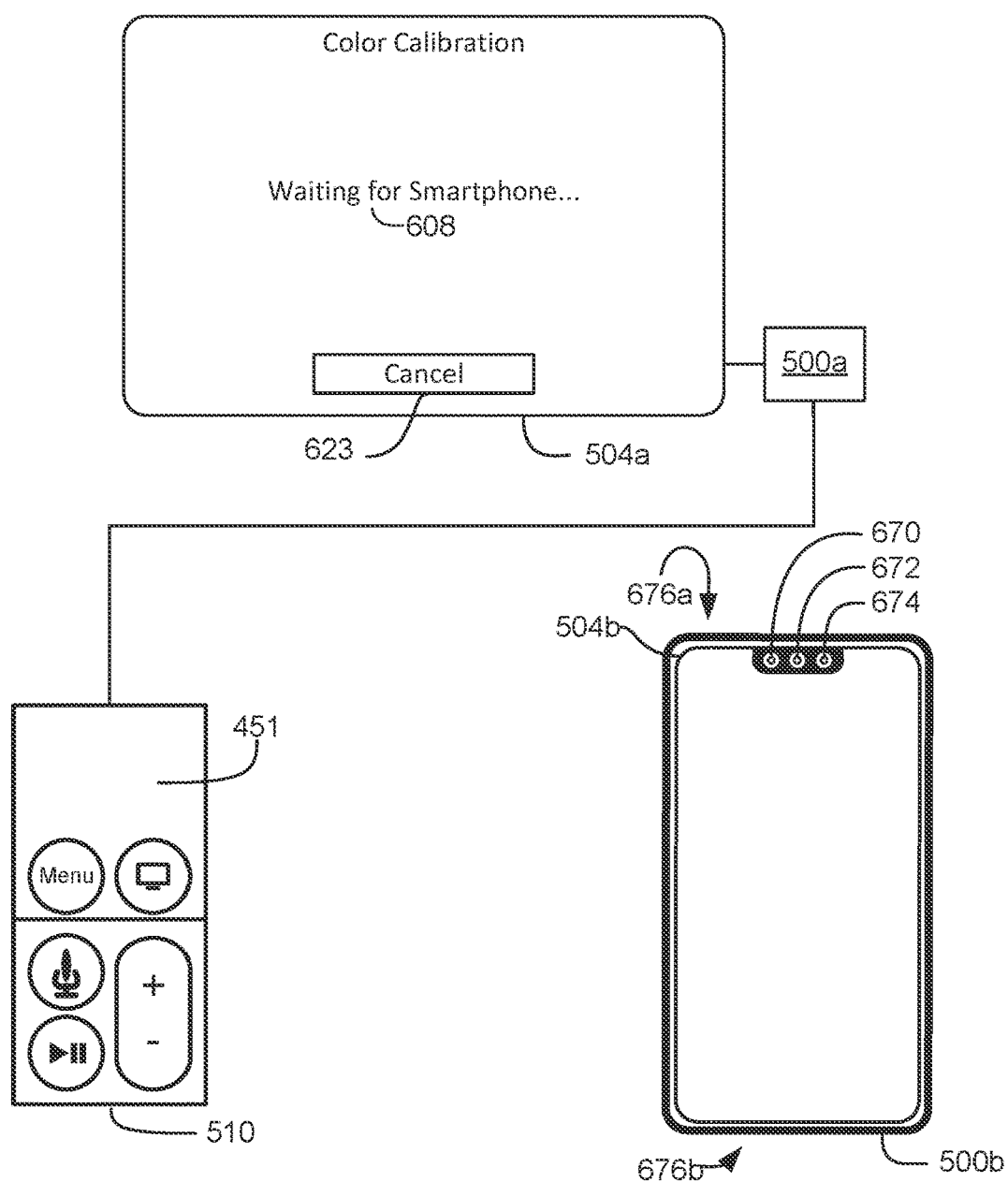
FIG. 6N

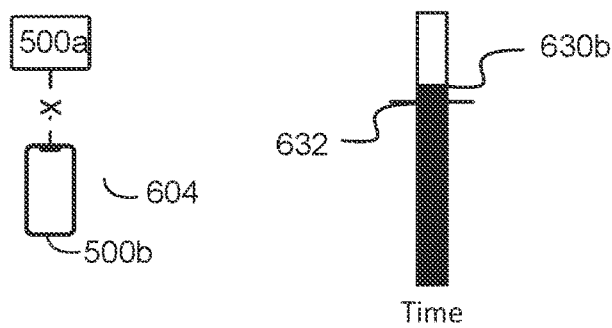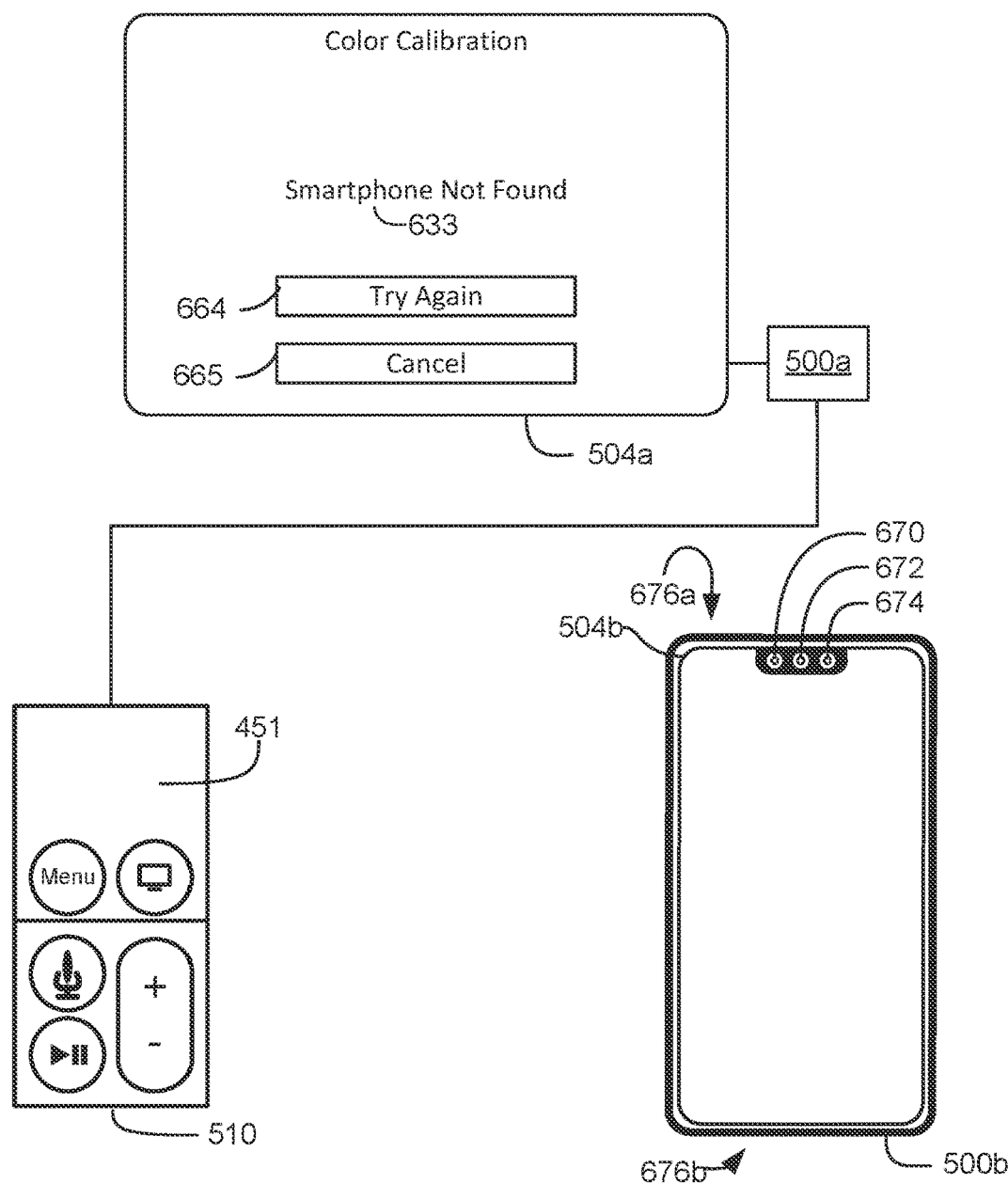
FIG. 6O

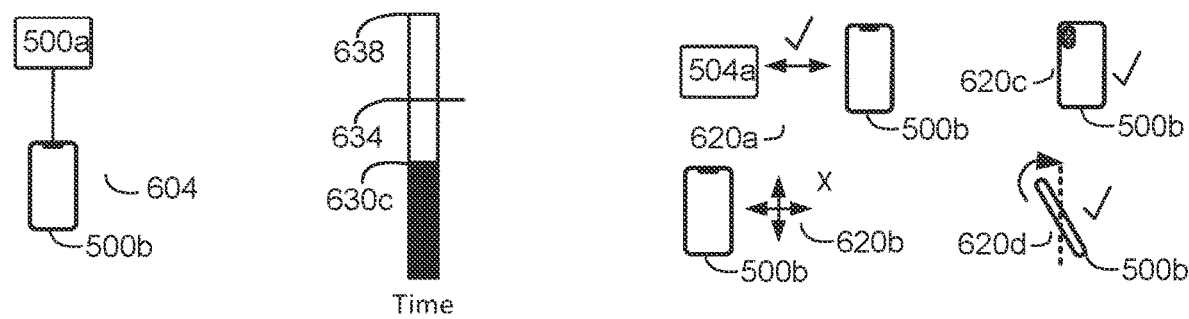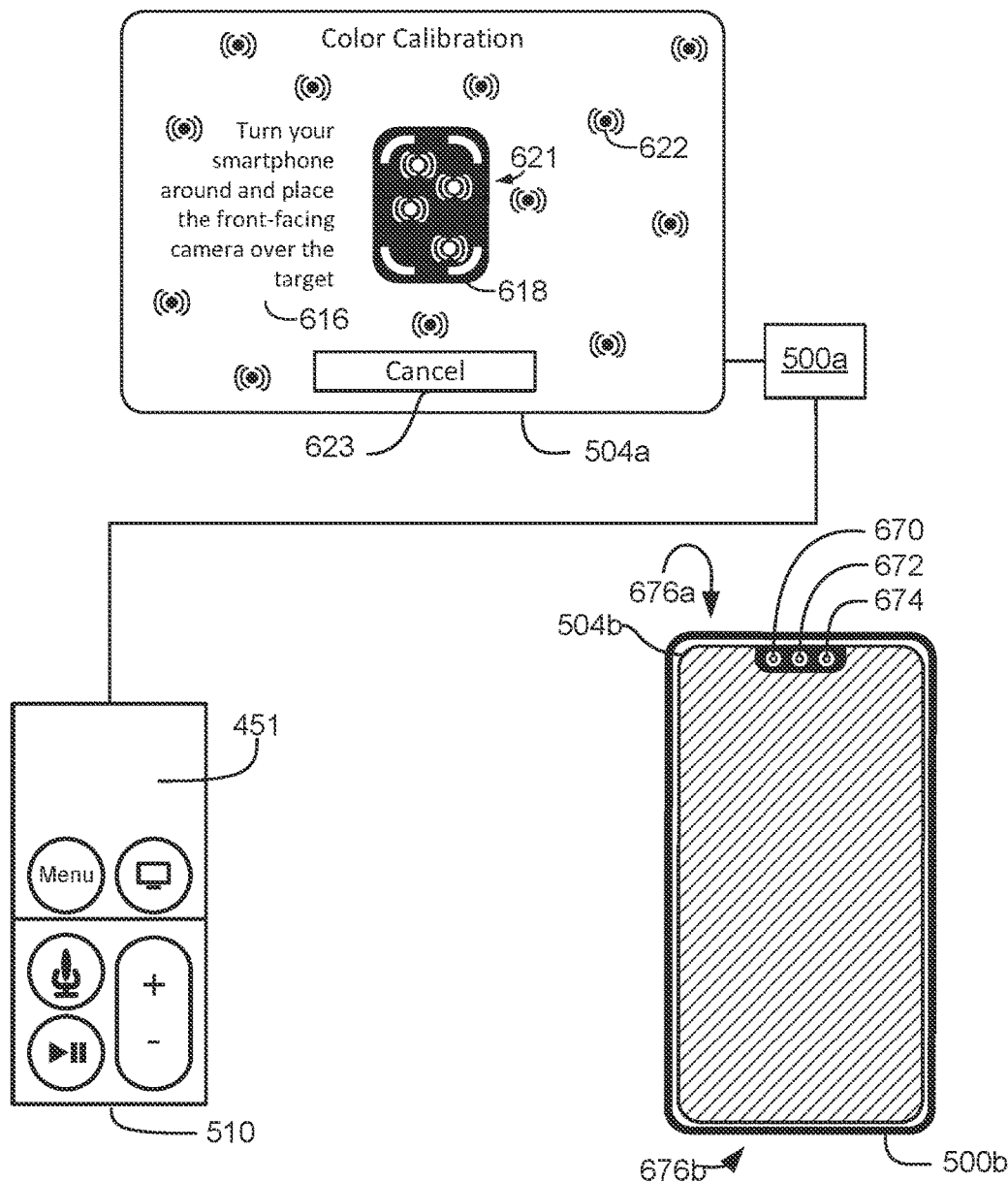
FIG. 6P

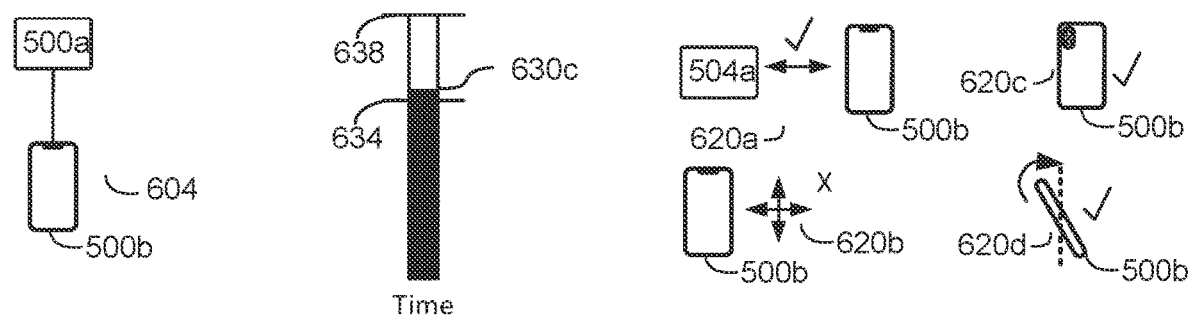
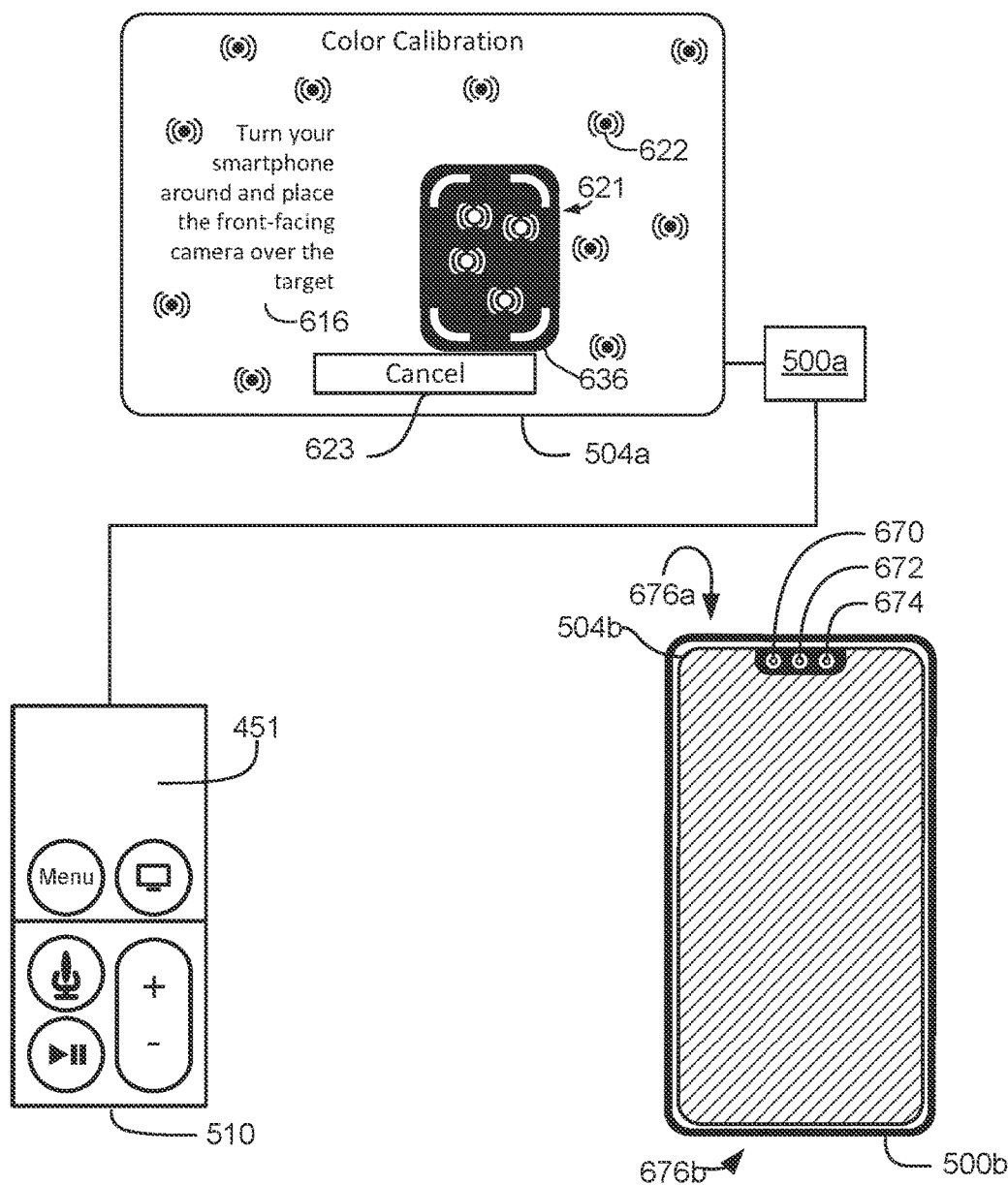
FIG. 6Q

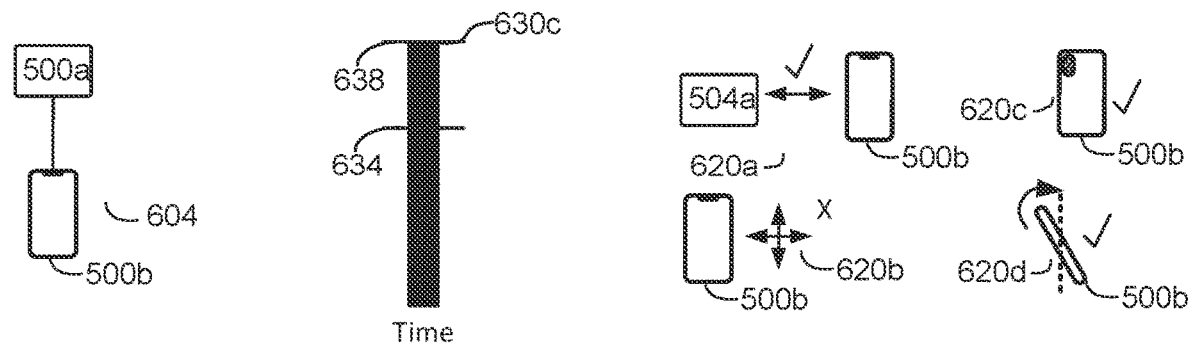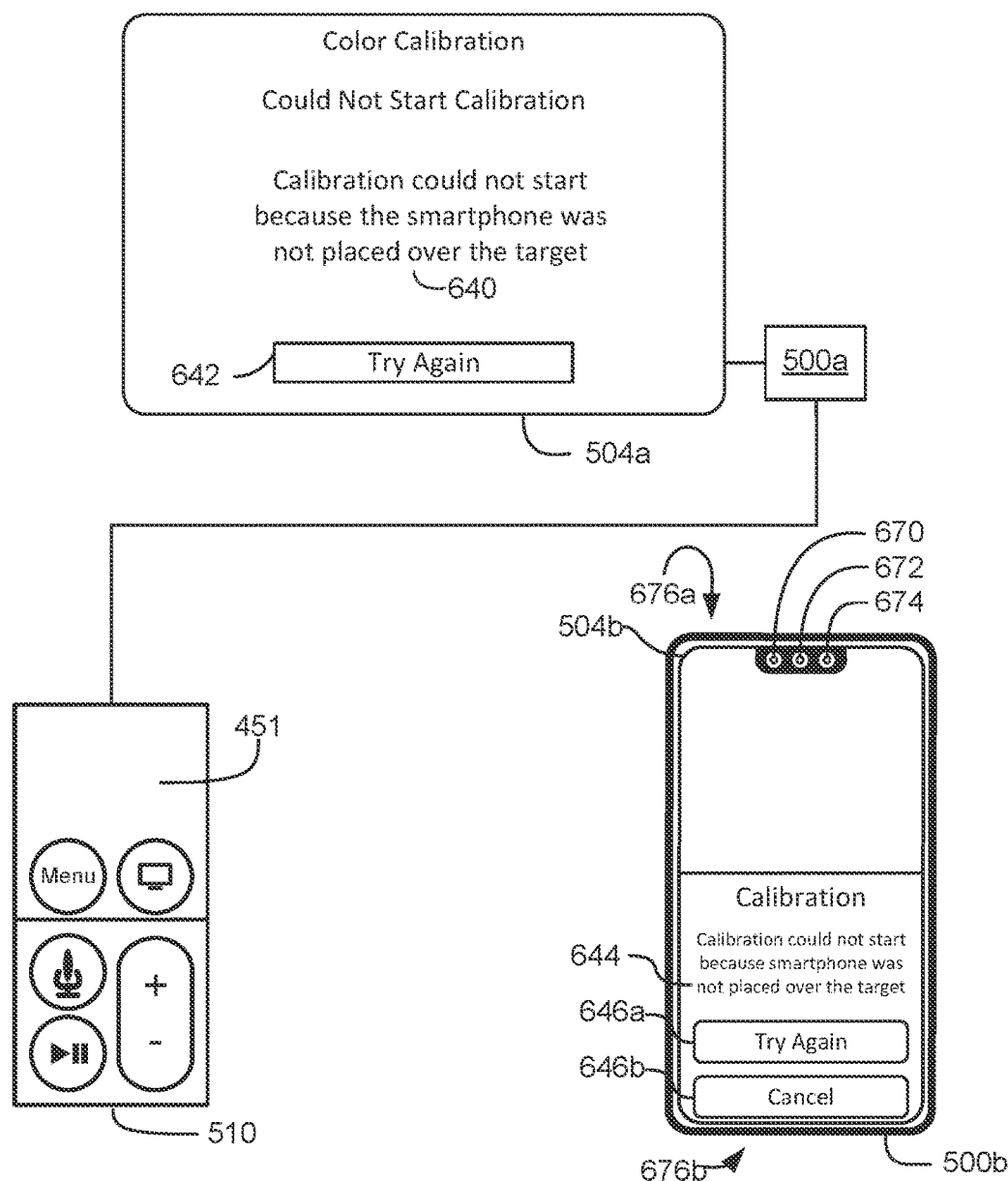
FIG. 6R

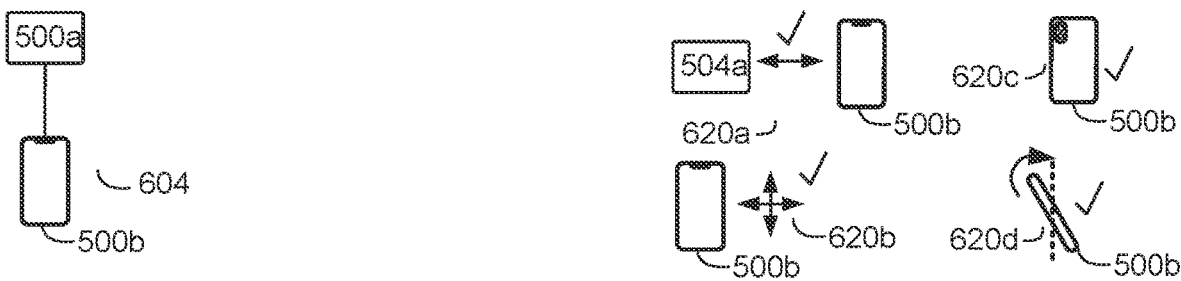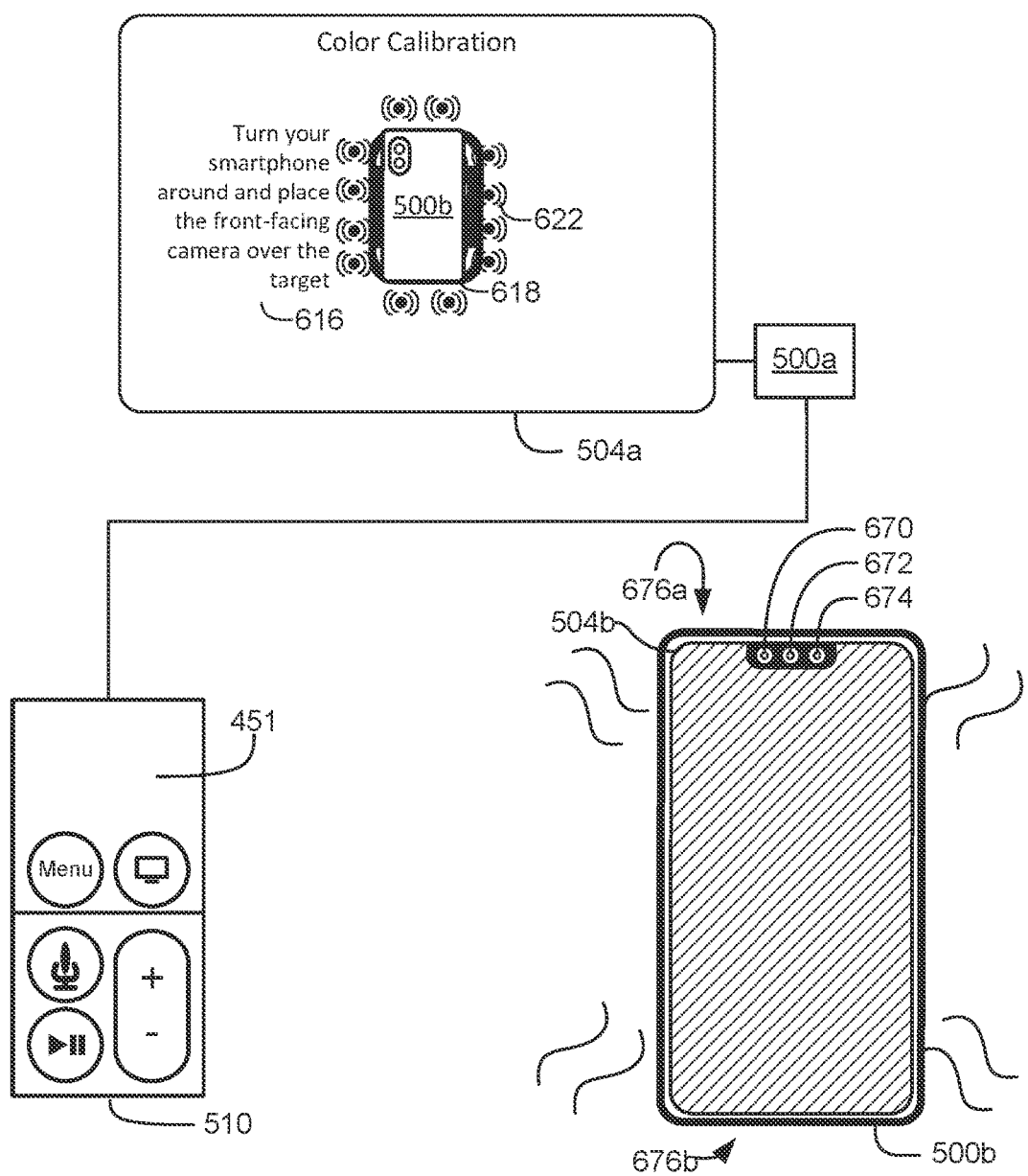
FIG. 6S

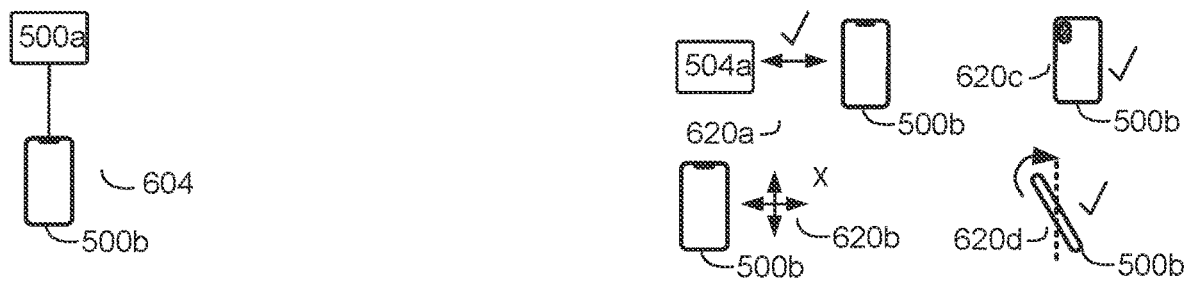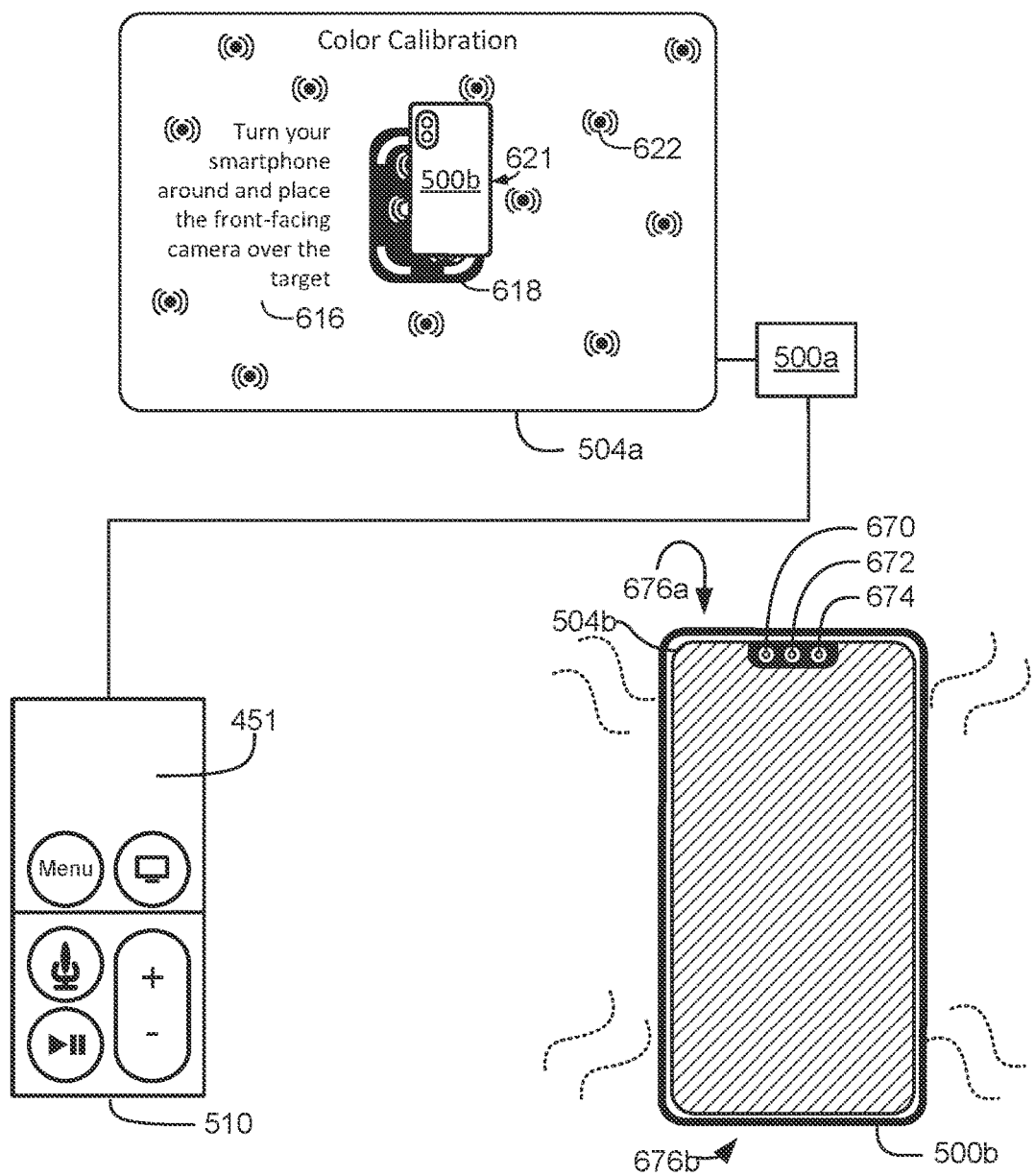
FIG. 6T

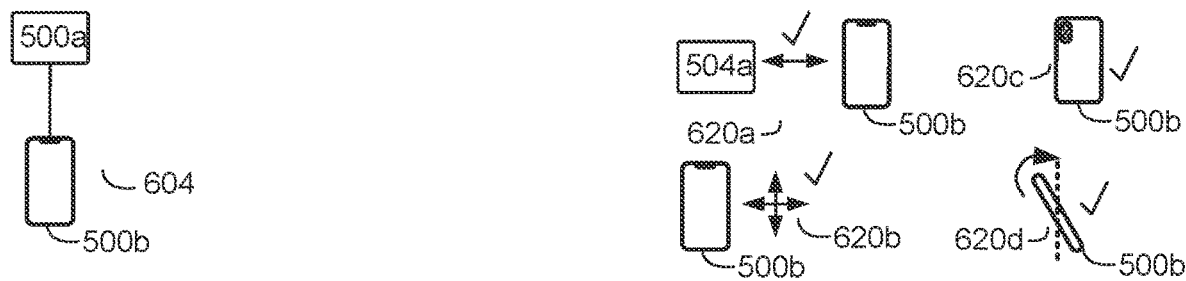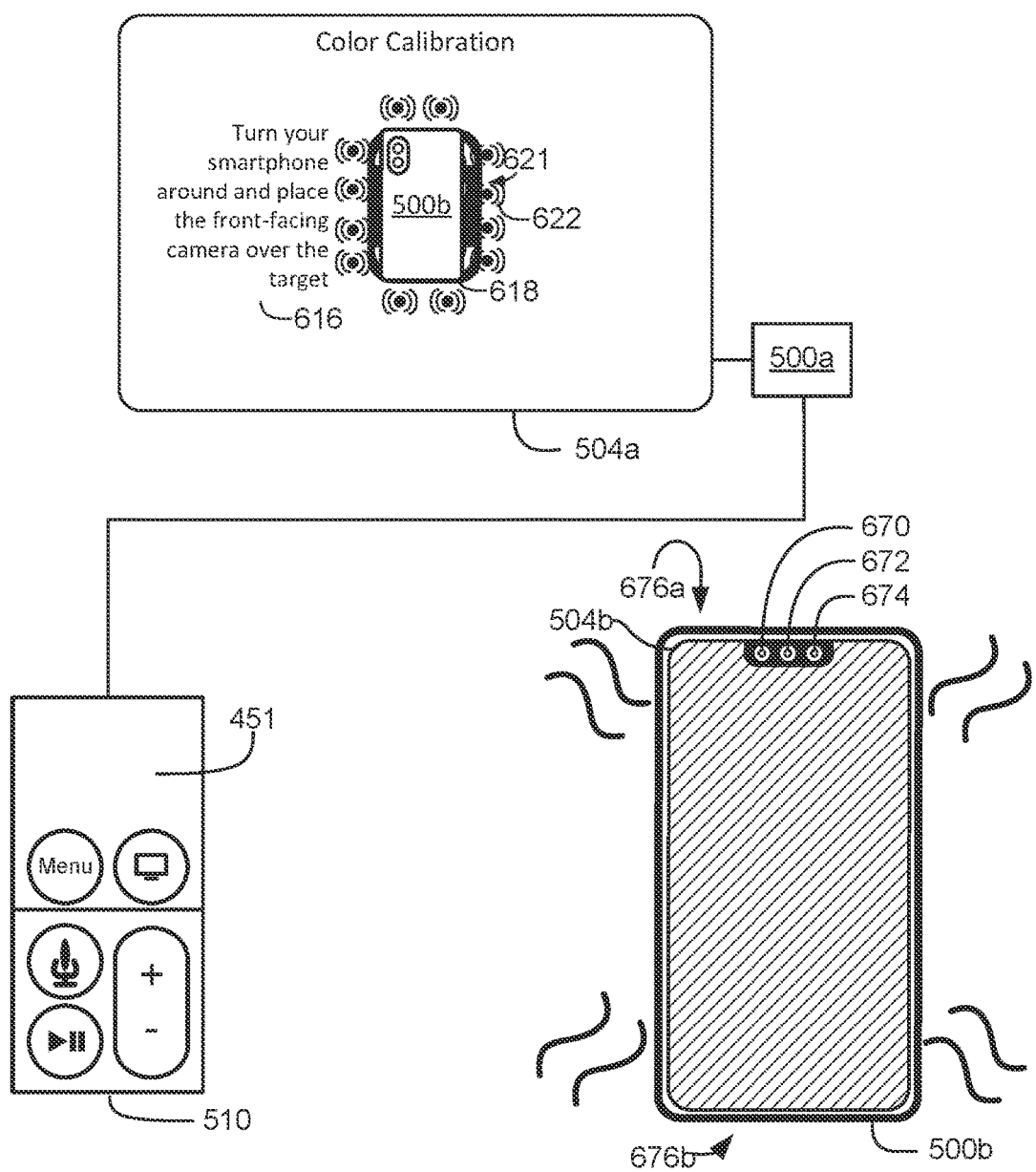
FIG. 6U

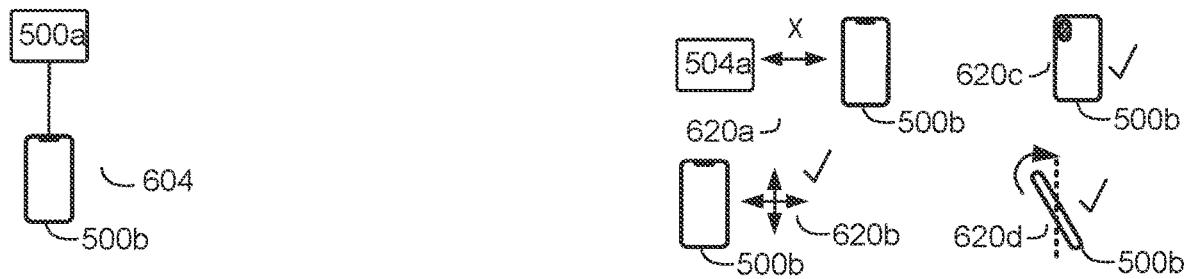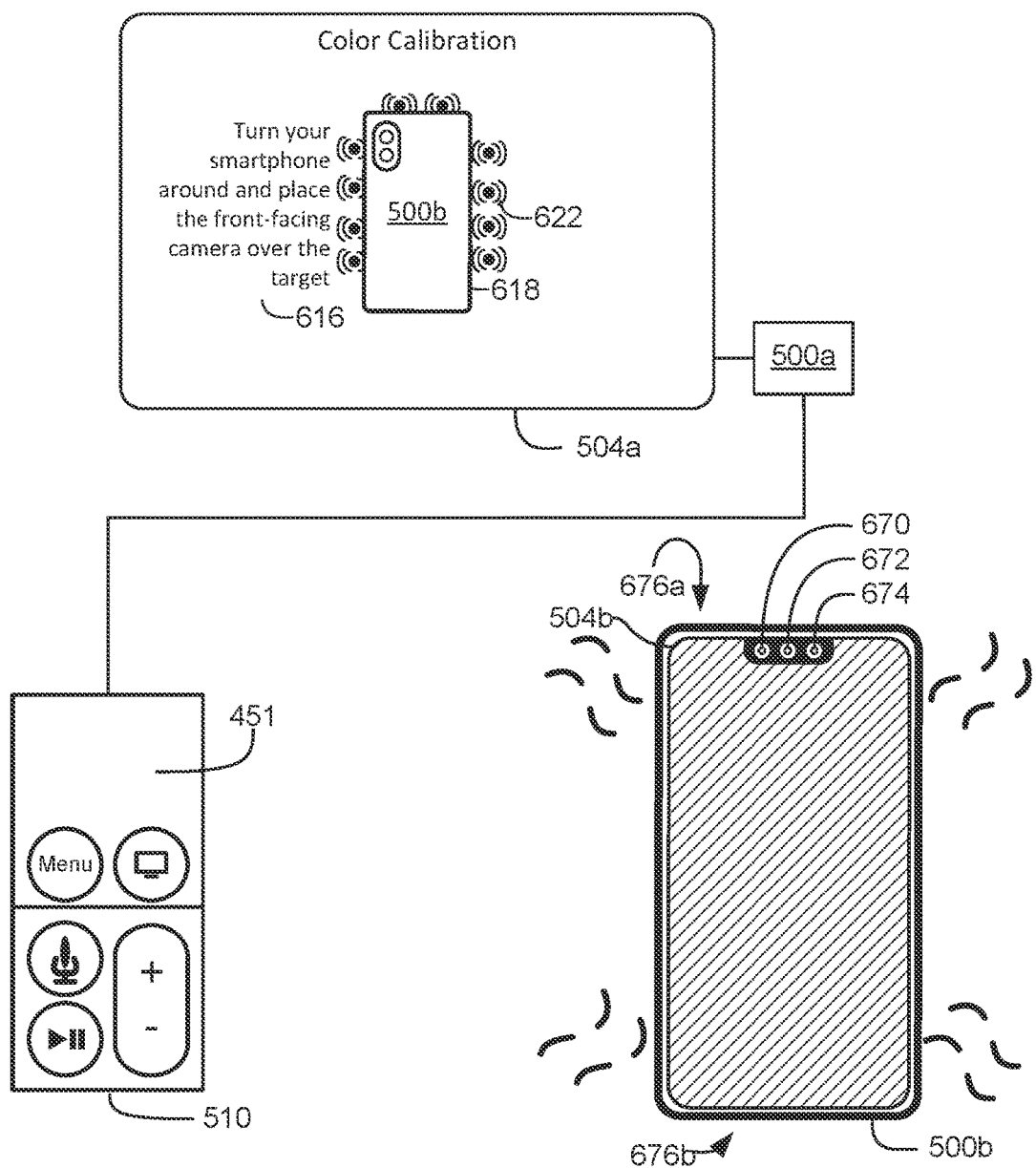
FIG. 6V

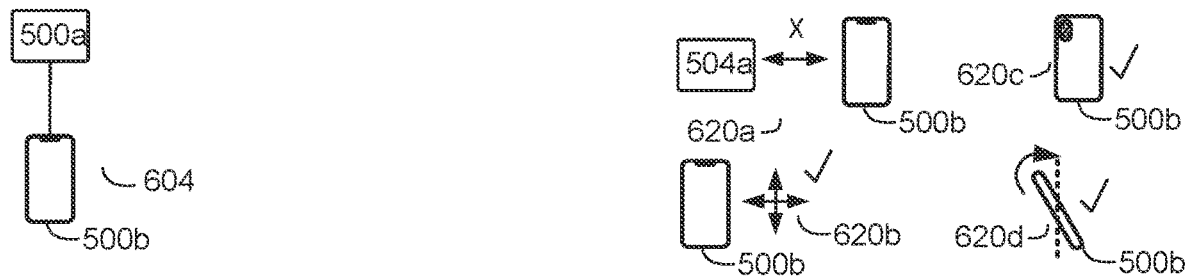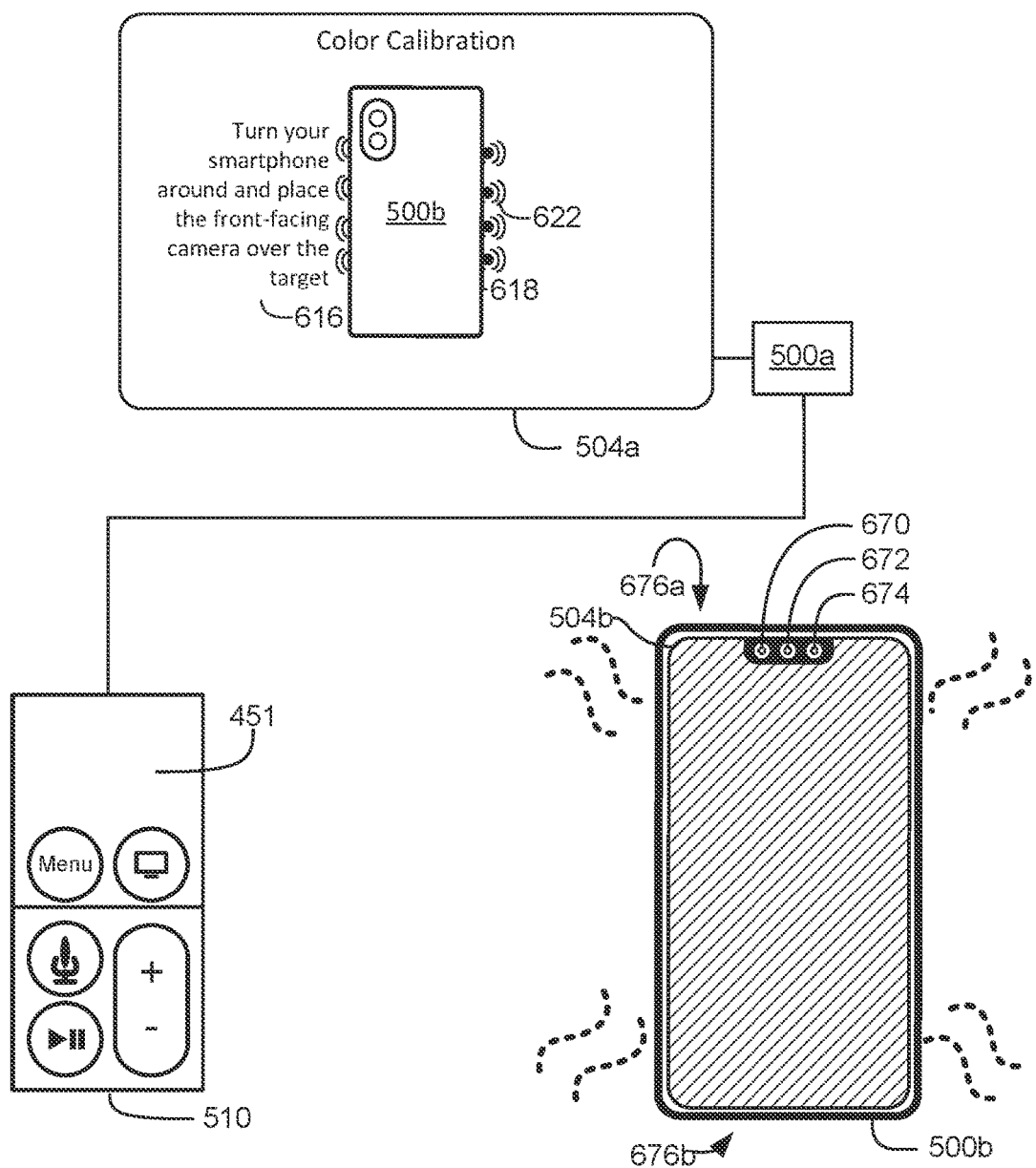
FIG. 6W

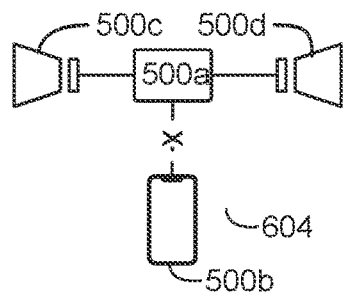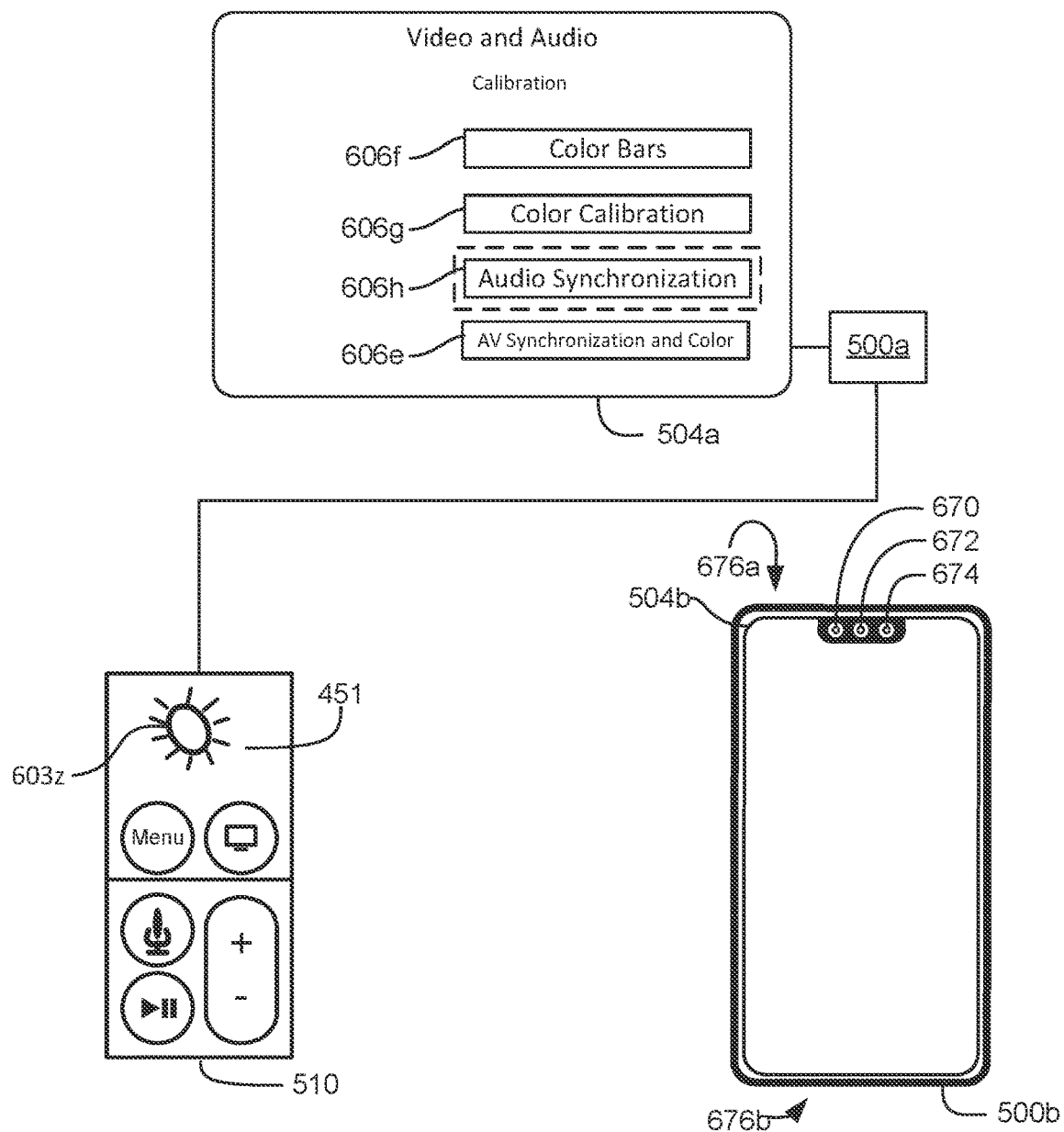
FIG. 6Z

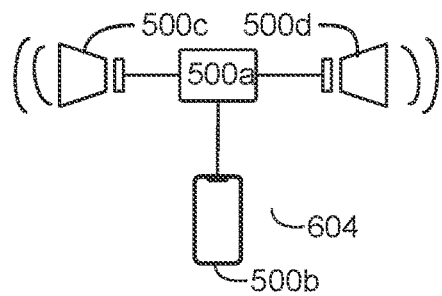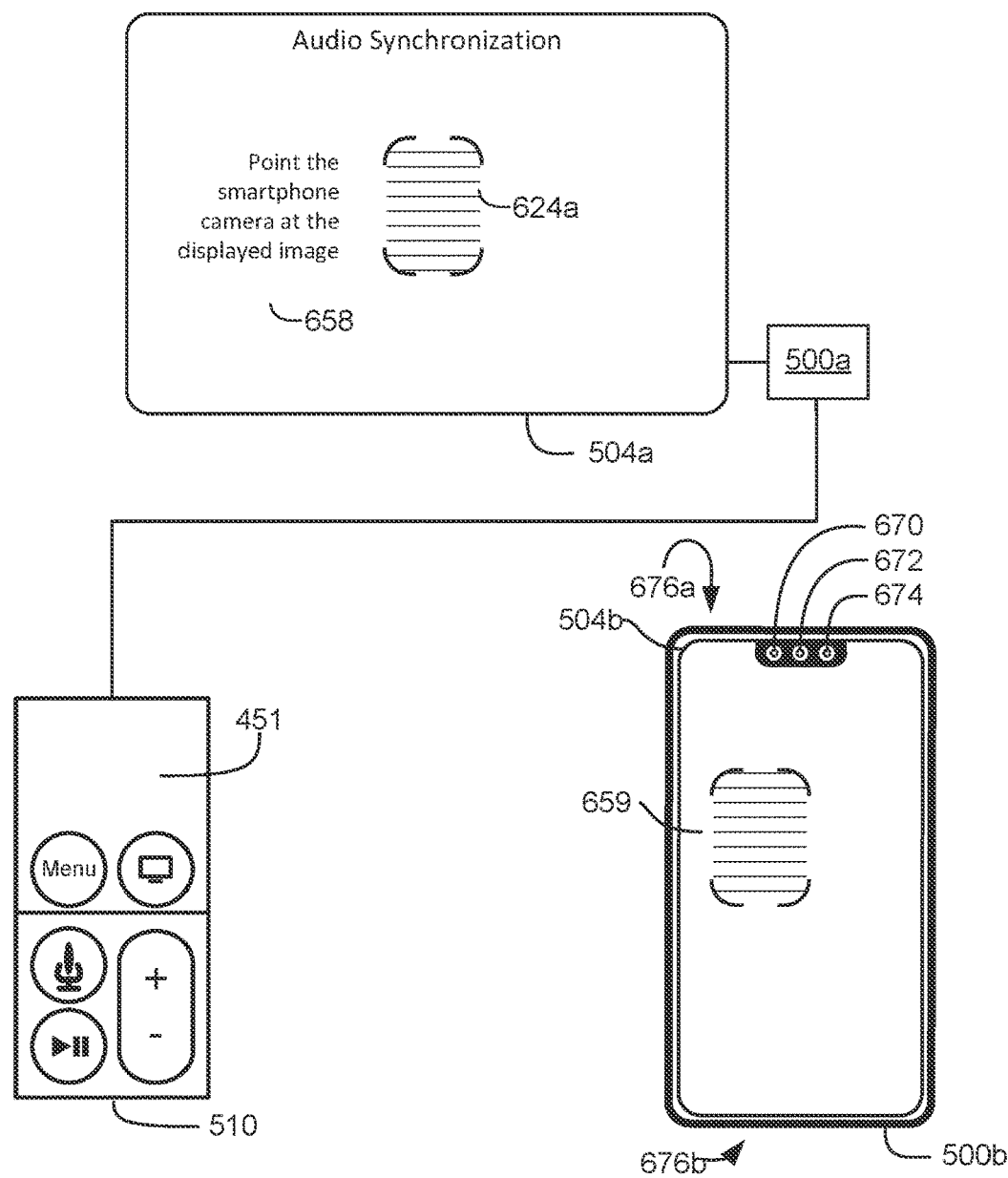
FIG. 6AA

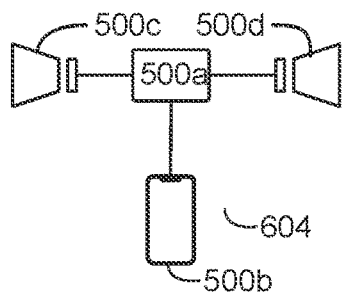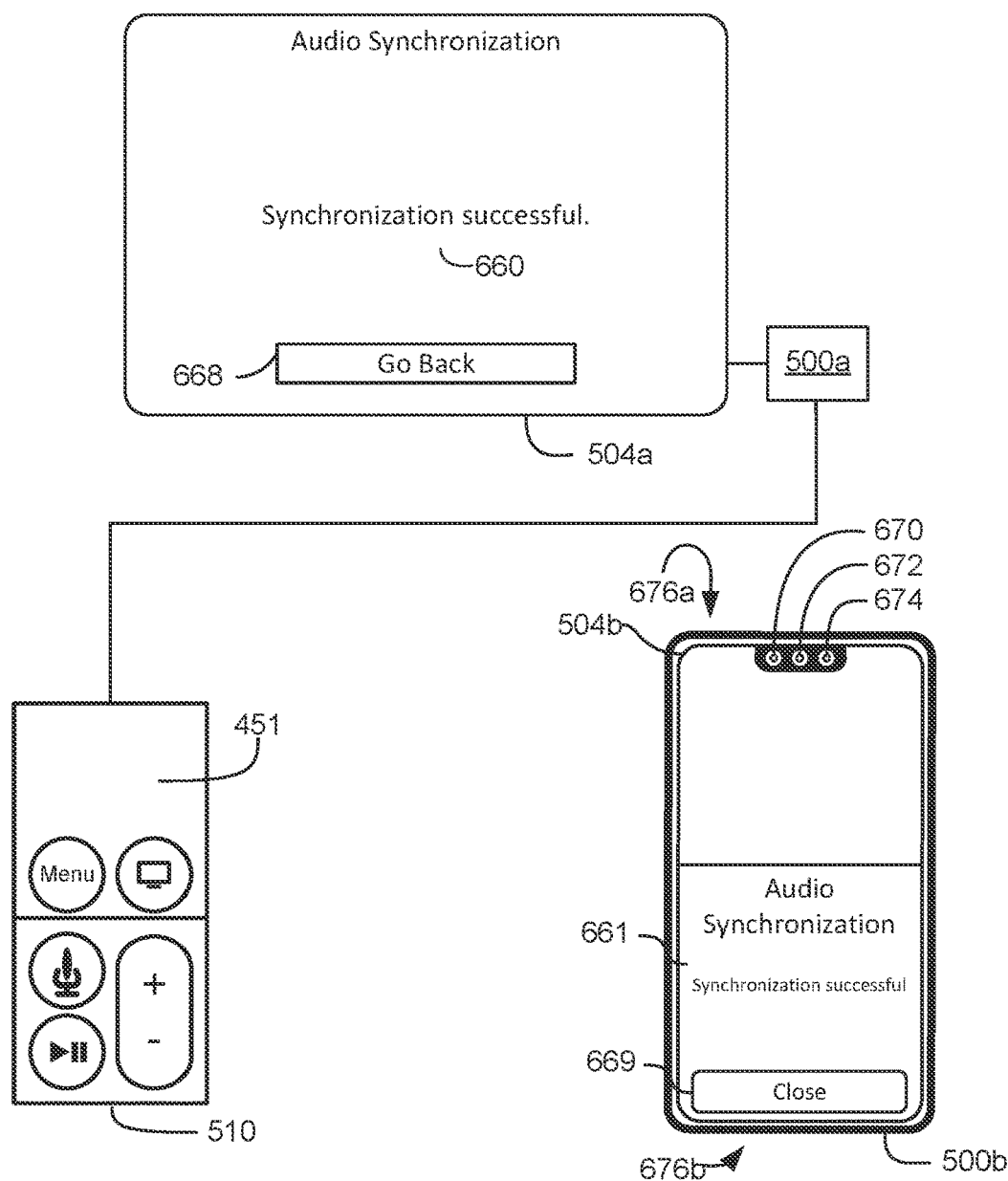
FIG. 6BB

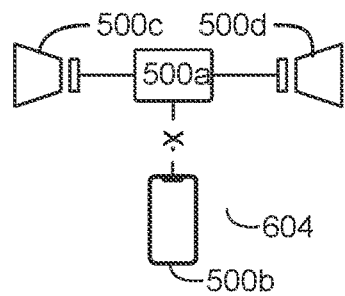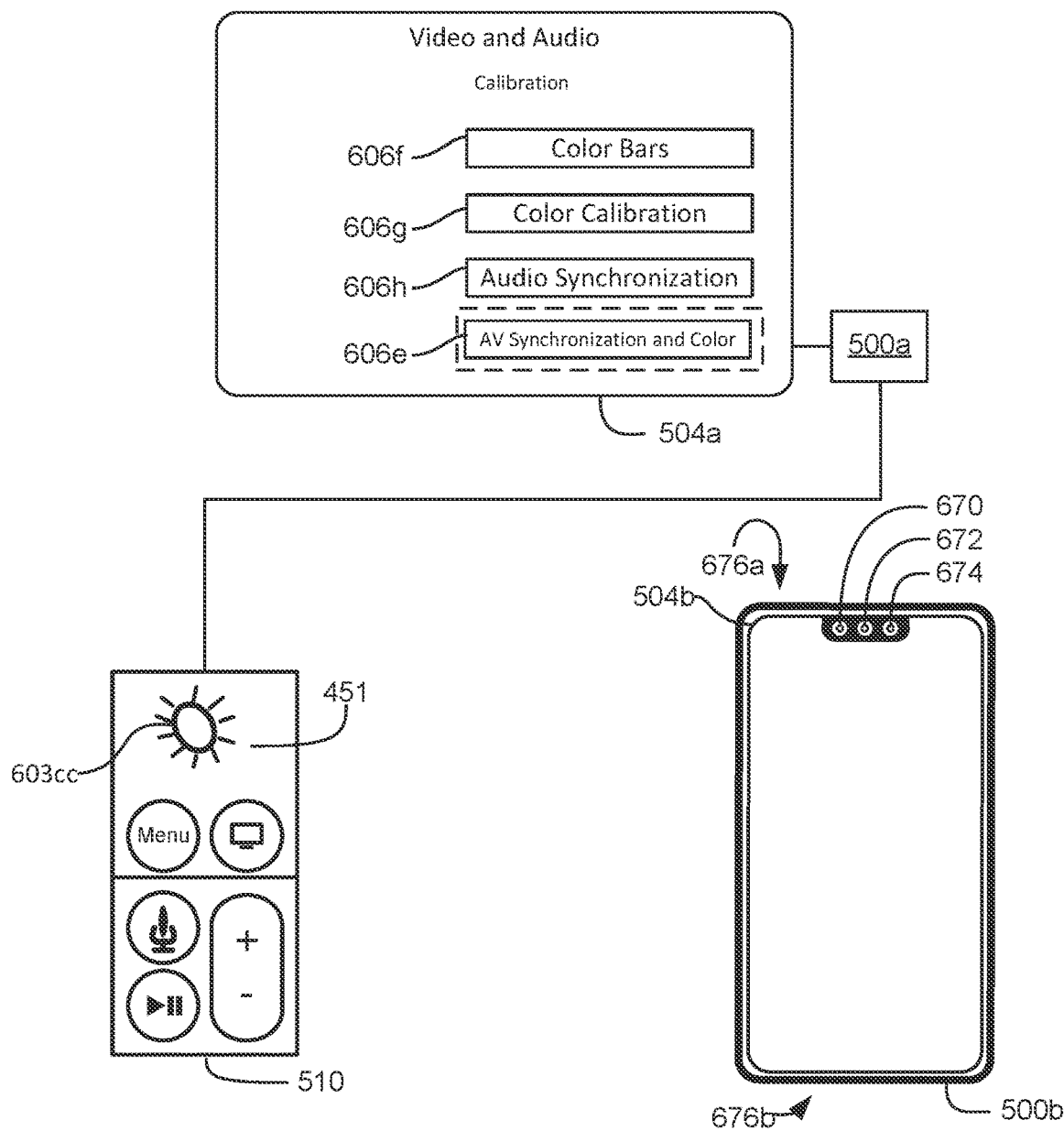
FIG. 6CC

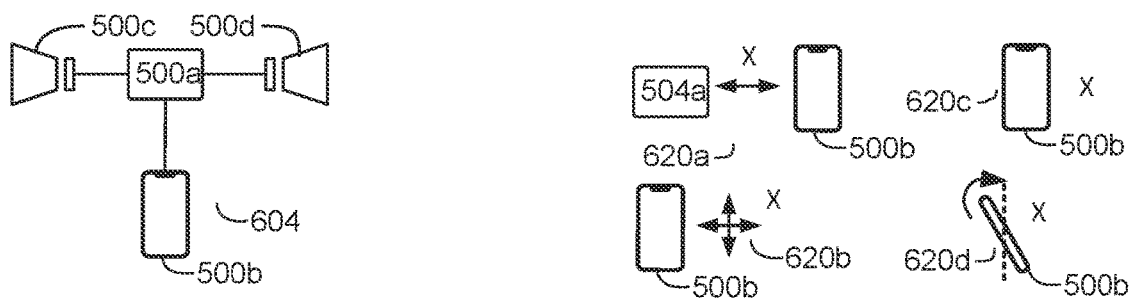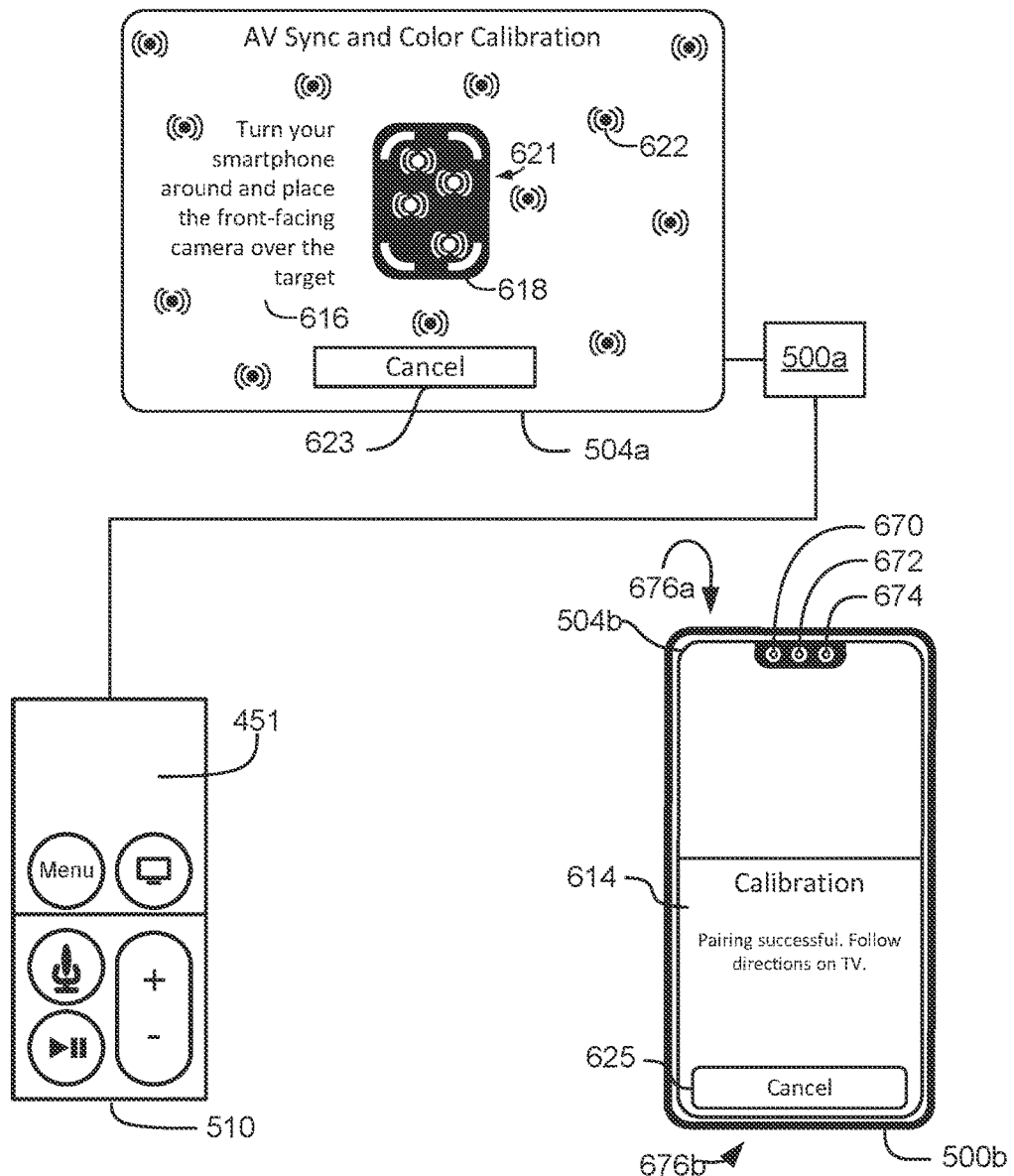
FIG. 6DD

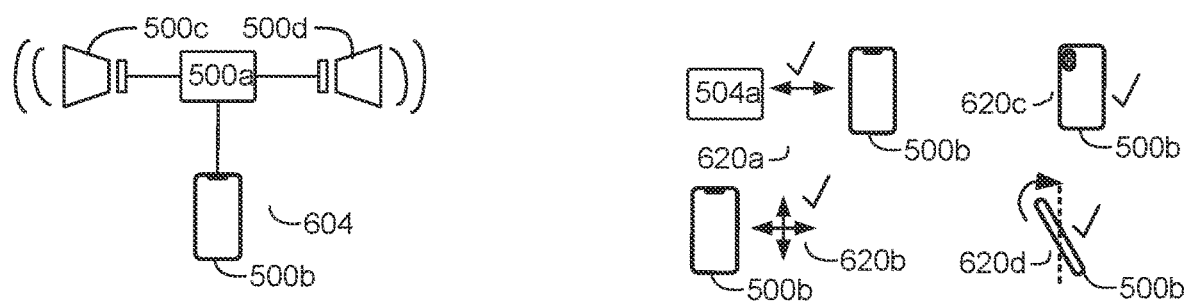
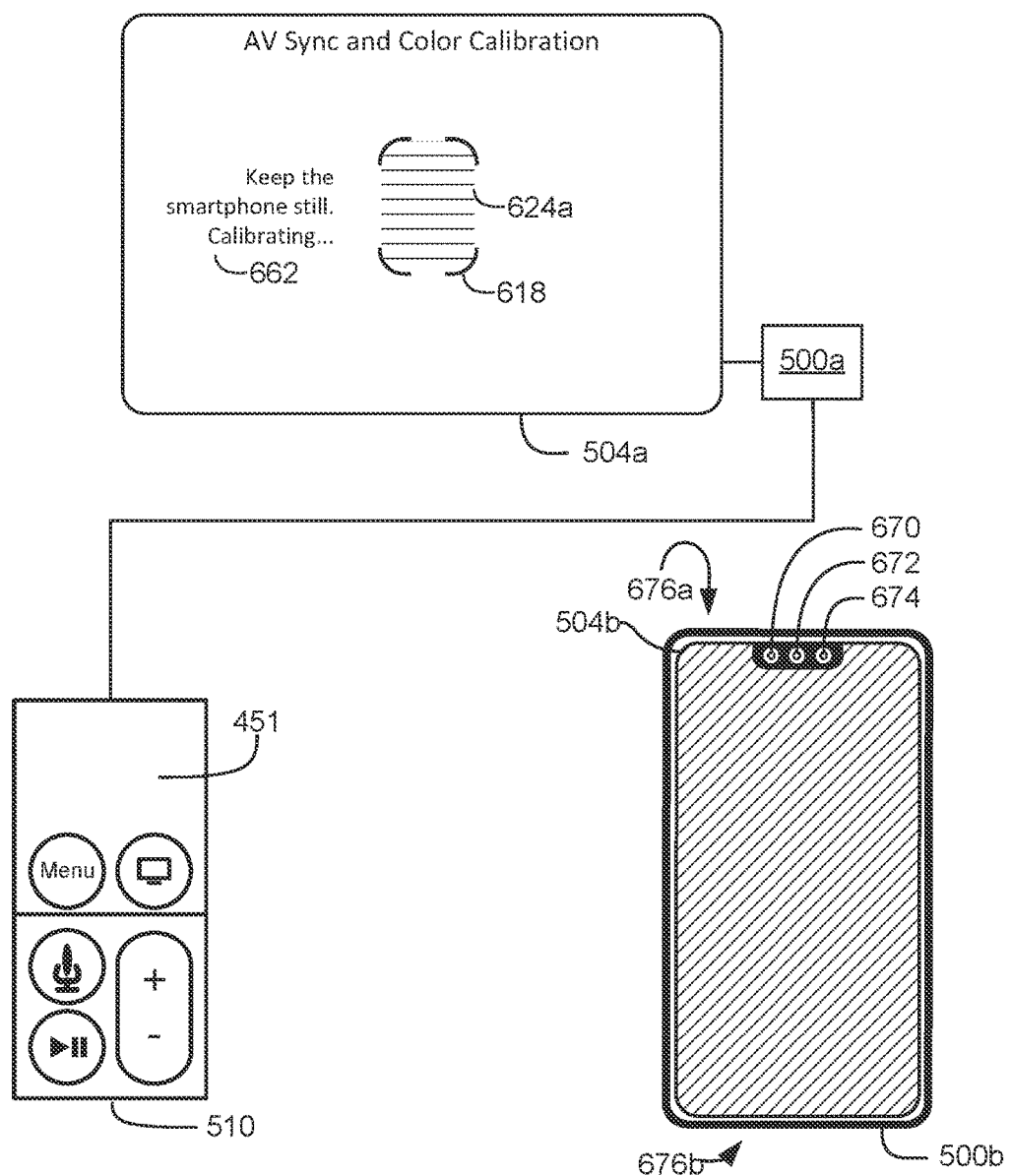
FIG. 6FF

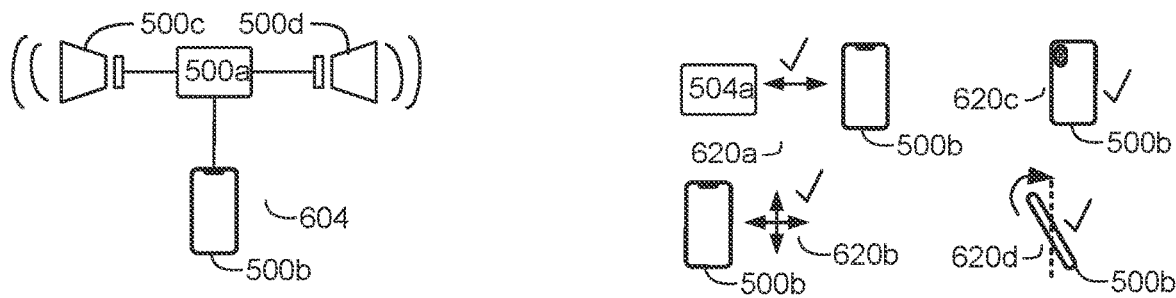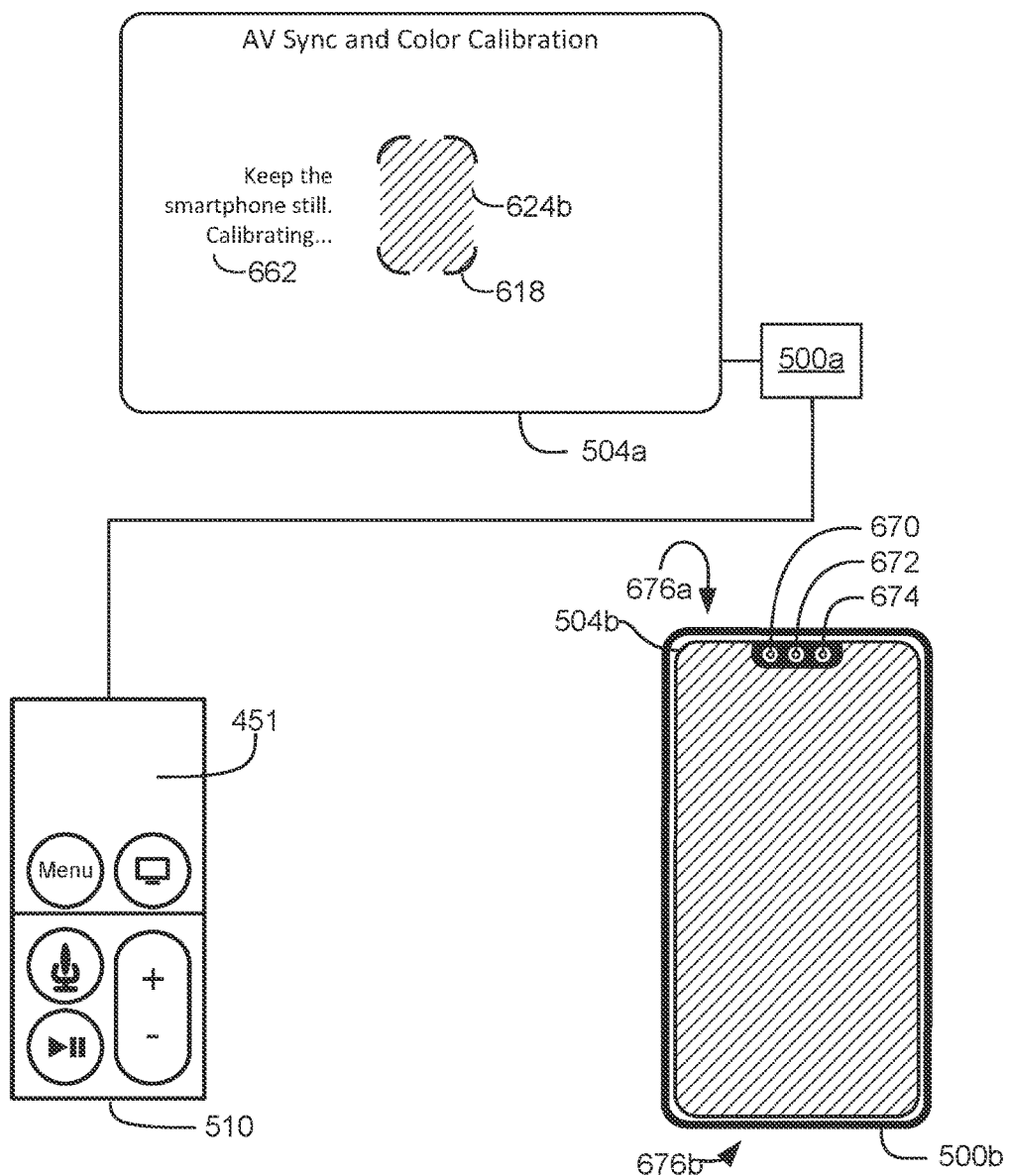
FIG. 6GG

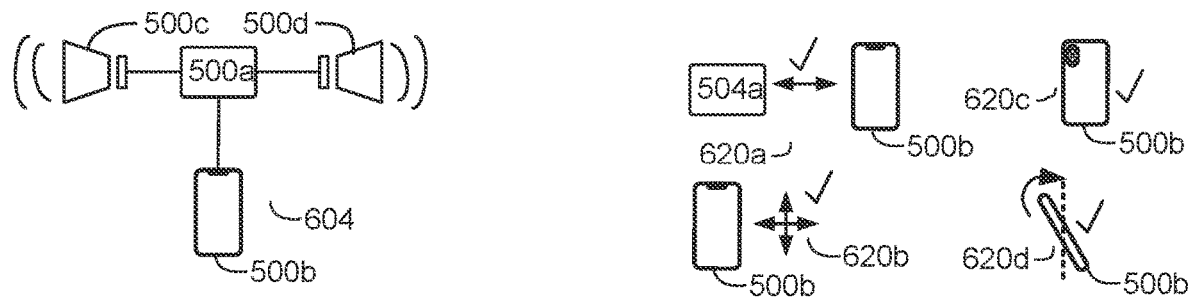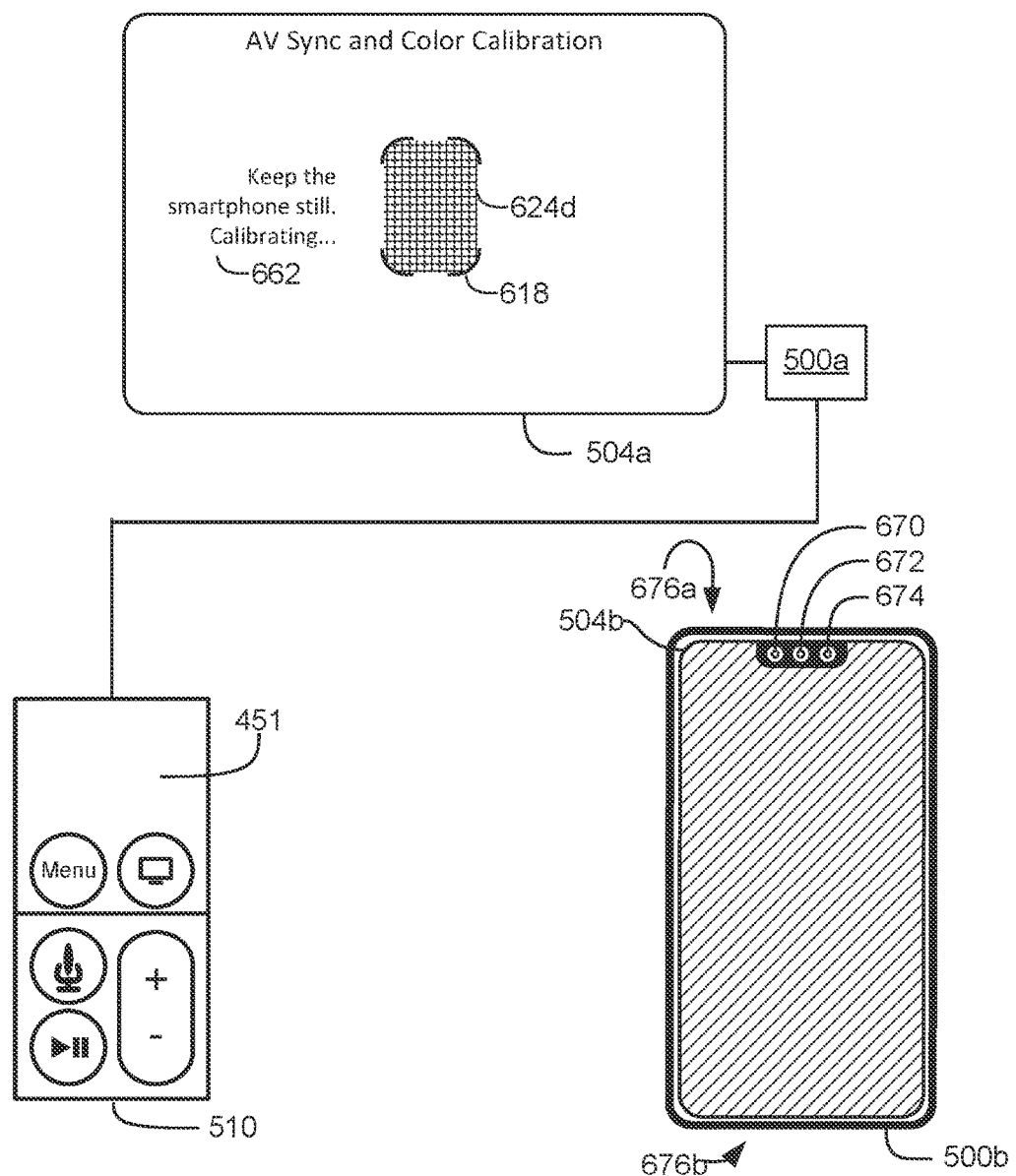
FIG. 6II

USER INTERFACES FOR CALIBRATIONS AND/OR SYNCHRONIZATIONS

CROSS-REFERENCE TO RELATED APPLICATIONS

This application claims the benefit of U.S. Provisional Application No. 63/036,284, filed Jun. 8, 2020, the contents of which is incorporated herein by reference in its entirety for all purposes.

FIELD OF THE DISCLOSURE

This disclosure relates generally to user interfaces for calibrating and/or synchronizing output of electronic devices.

BACKGROUND OF THE DISCLOSURE

User interaction with electronic devices has increased significantly in recent years. These devices can be devices such as computers, tablet computers, televisions, multimedia devices, or mobile devices. Sometimes a user may be playing multimedia content on multiple devices at the same time. The user may therefore want to calibrate and/or synchronize the output of devices, such as audio or video output.

SUMMARY OF THE DISCLOSURE

In some circumstances, electronic devices provide various outputs, e.g., audio output(s) and/or video output(s). In some circumstances, the electronic devices present user interfaces for calibrating and/or synchronizing these outputs. Enhancing the user's interactions with the device improves the user's experience with the device and decreases user interaction time, which is particularly important where input devices are battery-operated. Specifically, display calibration improves the ability of content to be displayed and improves readability for users.

Some embodiments described in this disclosure are directed to presenting user interfaces with a first electronic device for guiding placement of a second electronic device to perform a calibration of one or more outputs of a display generation component and/or one or more speakers in communication with the first electronic device and/or one or more outputs (e.g., audio and/or video signals) of the first electronic device itself. Some embodiments described in this disclosure are directed to detecting whether the position of a first electronic device satisfies one or more criteria for performing a calibration of one or more outputs of a second electronic device. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4 illustrates an exemplary user interface for a multifunction device with a touch-sensitive surface that is separate from the display in accordance with some embodiments of the disclosure.

FIGS. 5D-5I provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein.

DETAILED DESCRIPTION

Figure 1A:
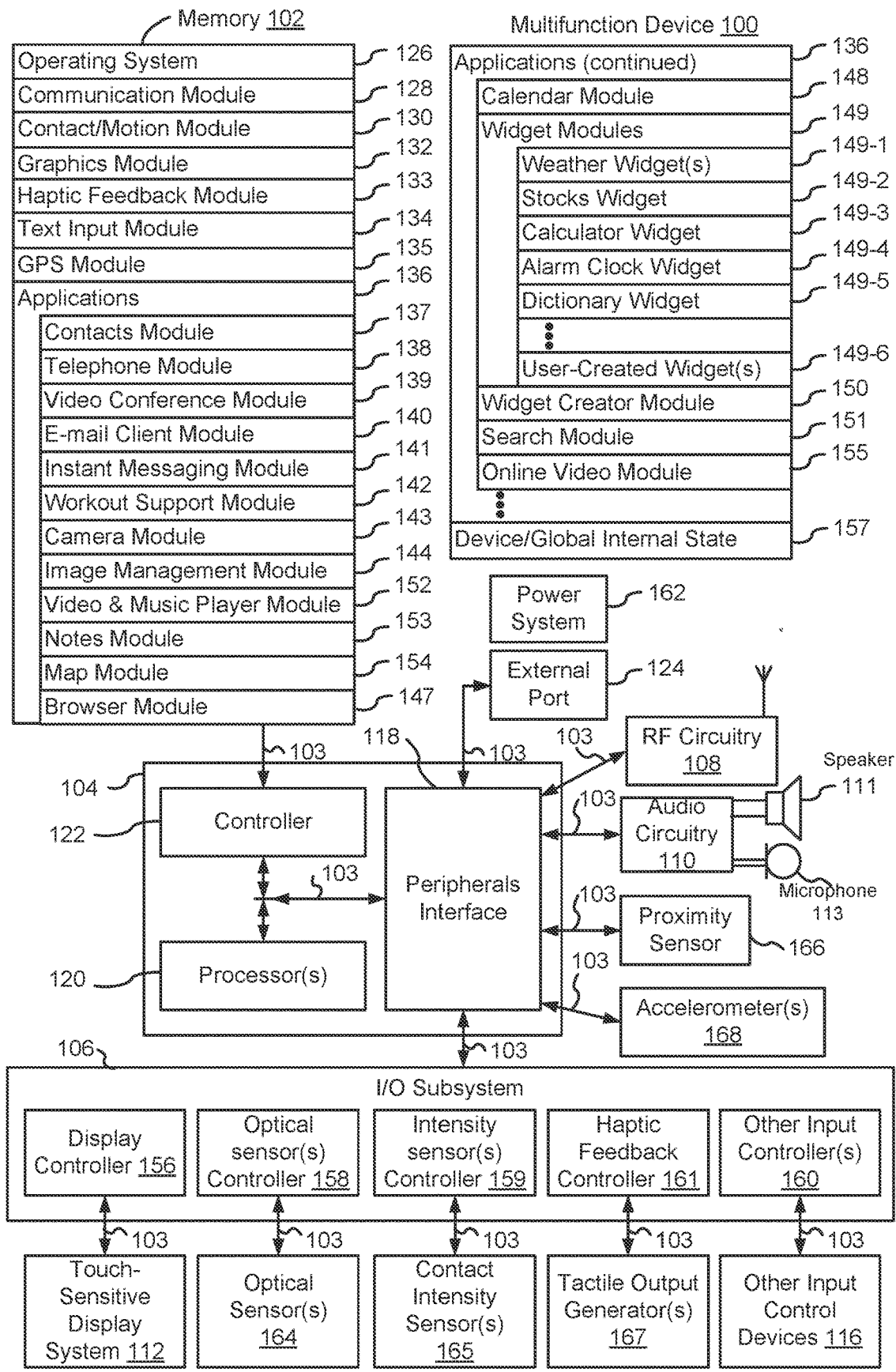
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

There is a need for electronic devices that provide efficient user interfaces and mechanisms for user interaction for calibrating and/or synchronizing one or more outputs of electronic devices. In some implementations, an electronic device displays an indication directing placement of another electronic device to perform the calibration and/or synchronization. In some implementations, an electronic device evaluates its position against one or more criteria for performing a calibration and/or synchronization of the output of one or more other electronic devices. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11 ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/ to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California A touch-sensitive display in some embodiments of touch screen 112 is, optionally, analogous to the multi-touch sensitive touchpads described in the following U.S. Pat. No.

6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
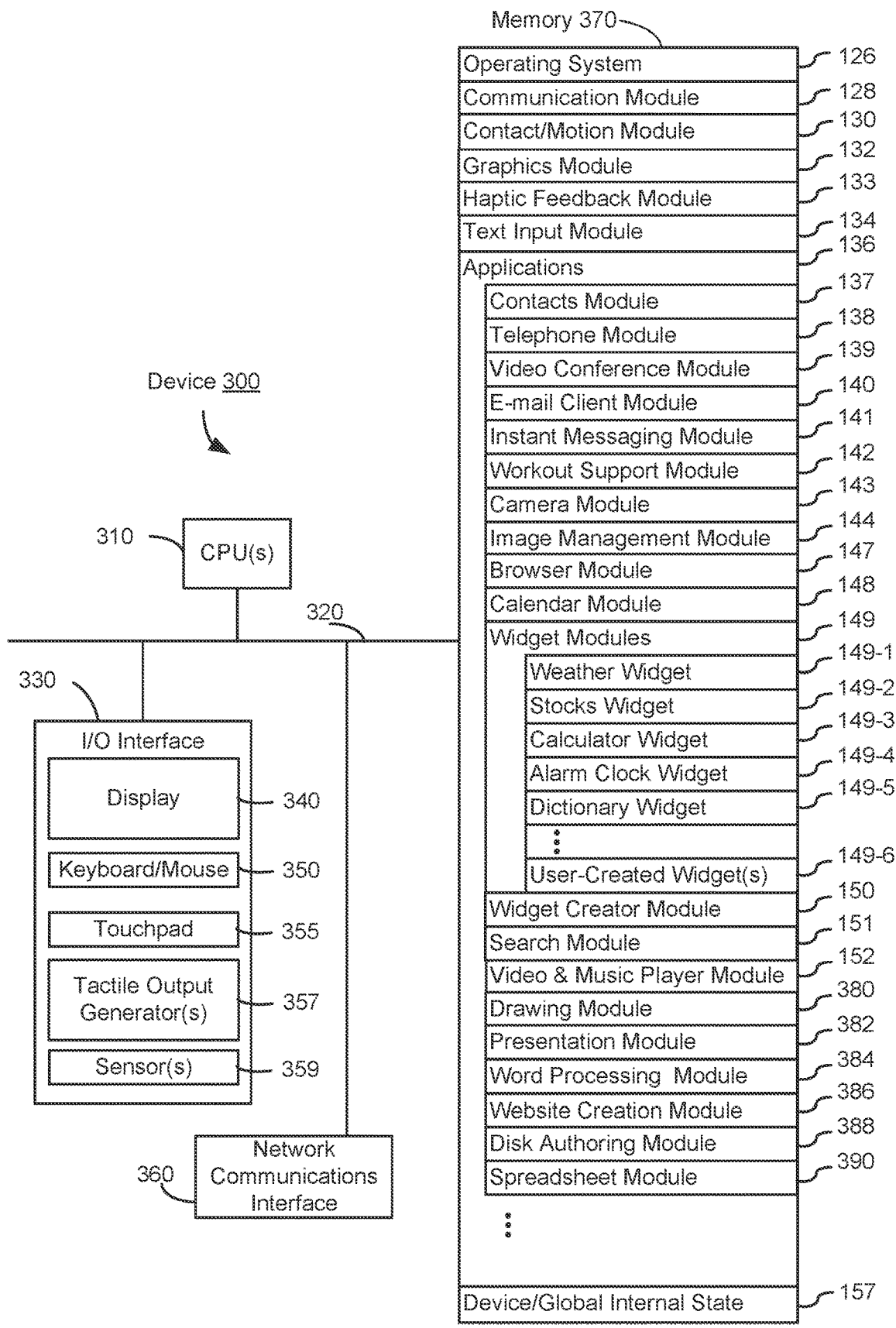
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
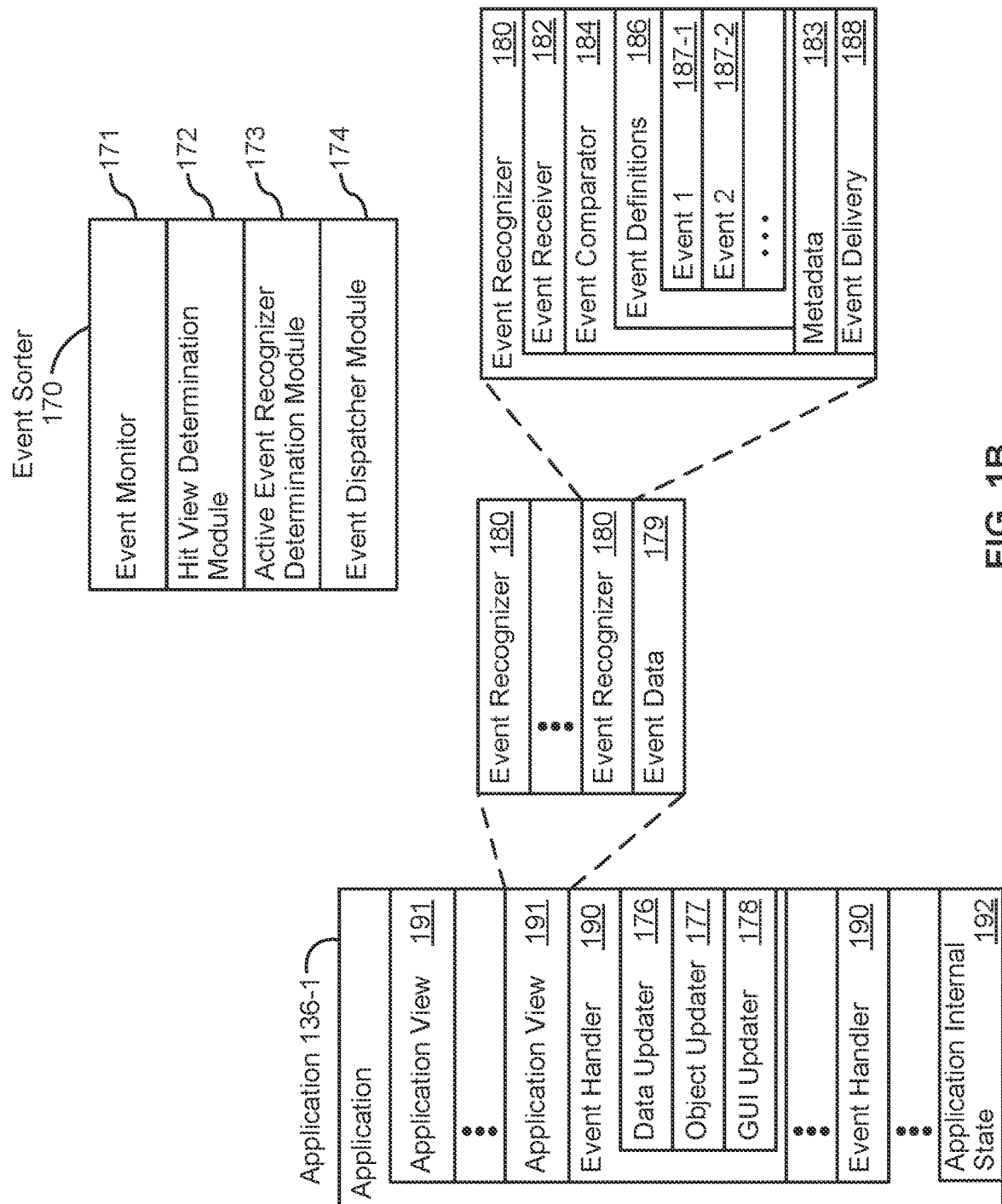
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG.

1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
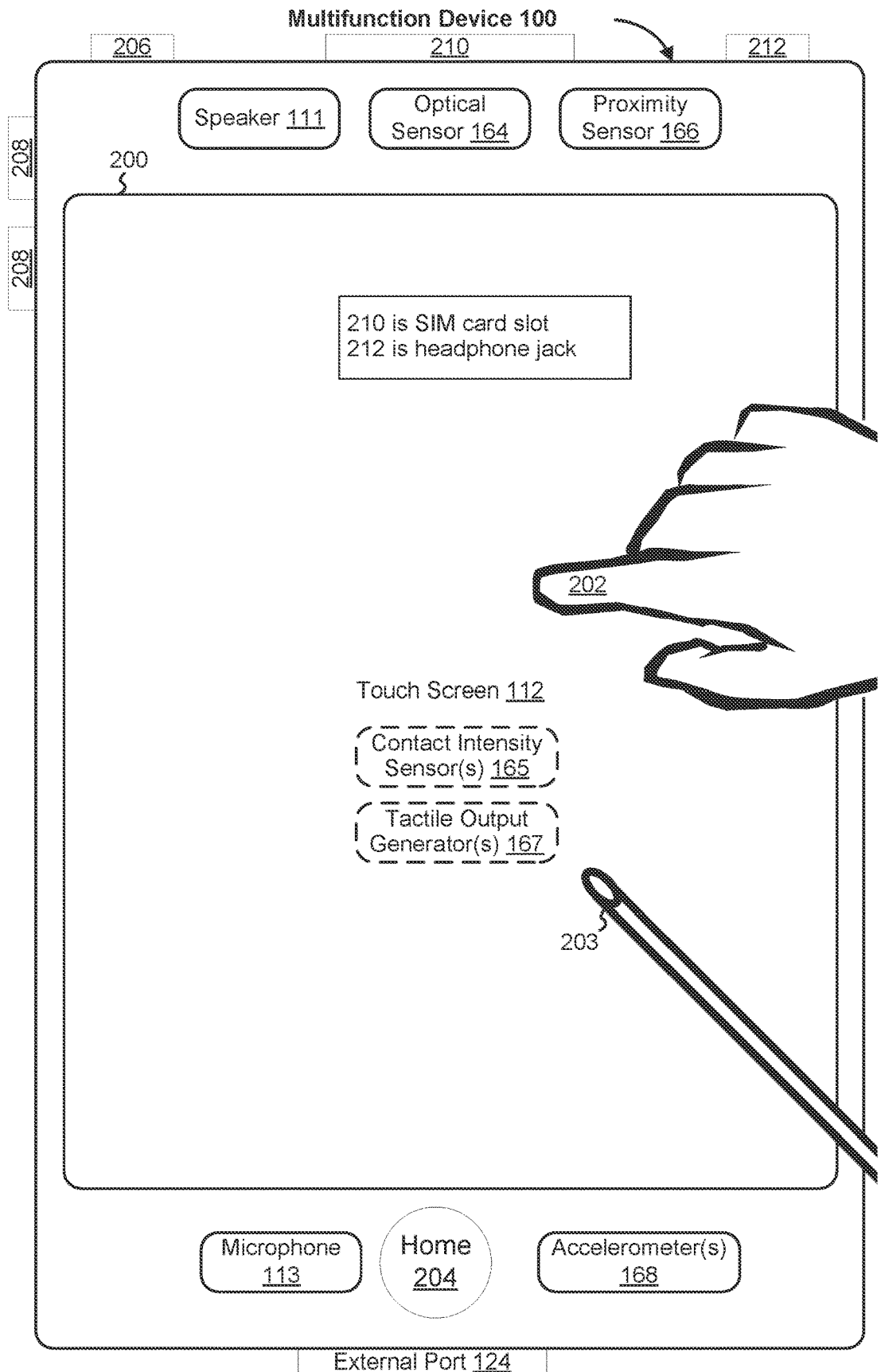
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 5A:
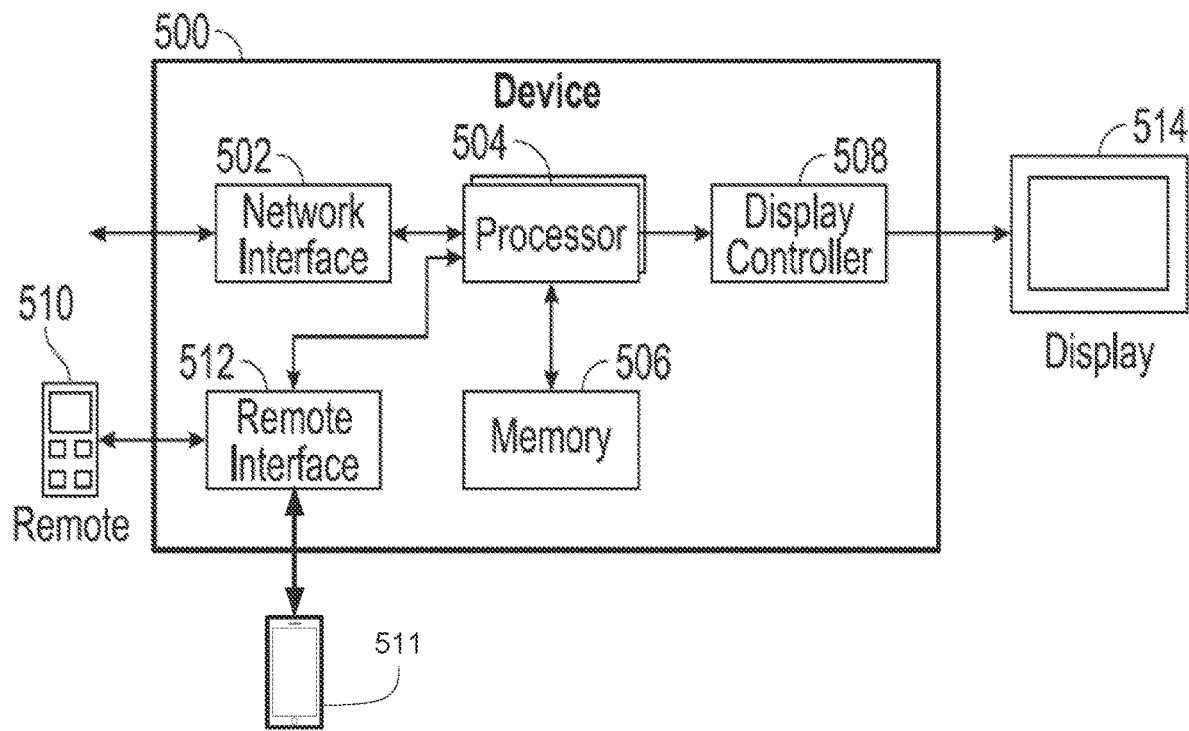
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700 and 800).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
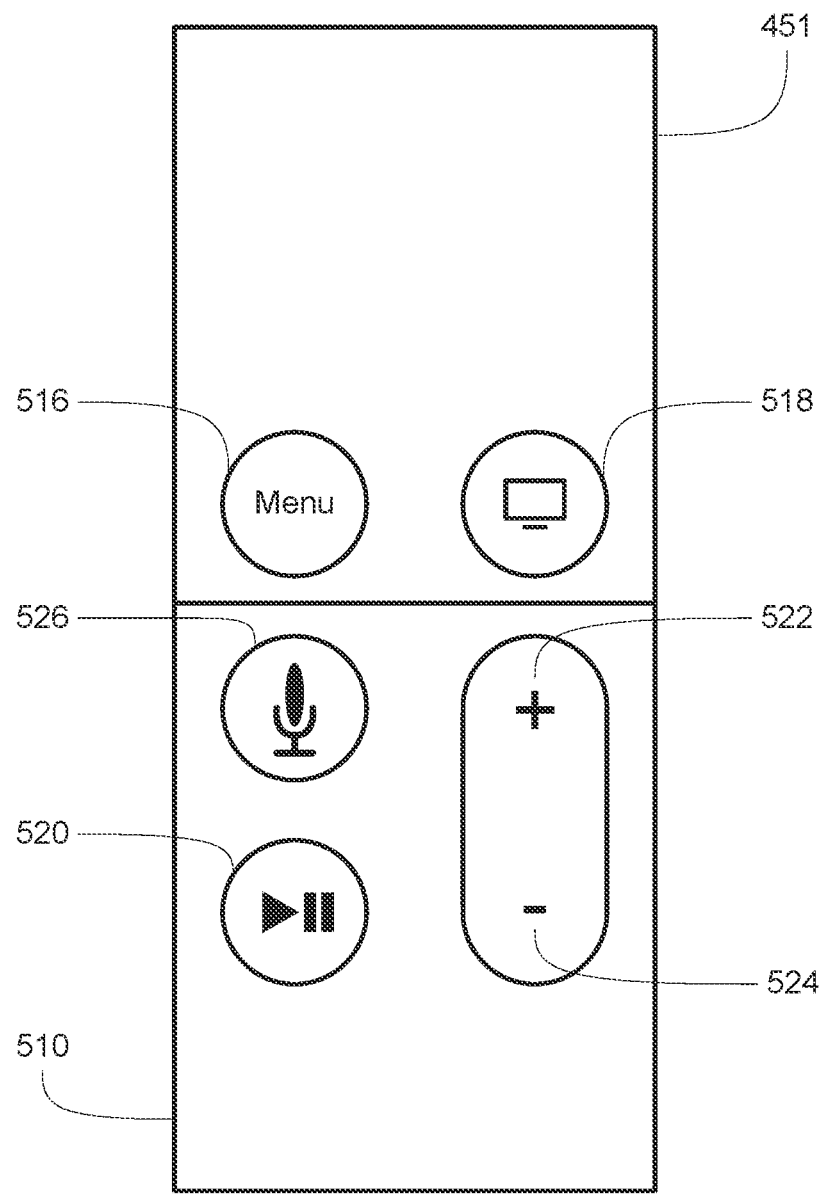

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of the "home" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

Figure 5C:
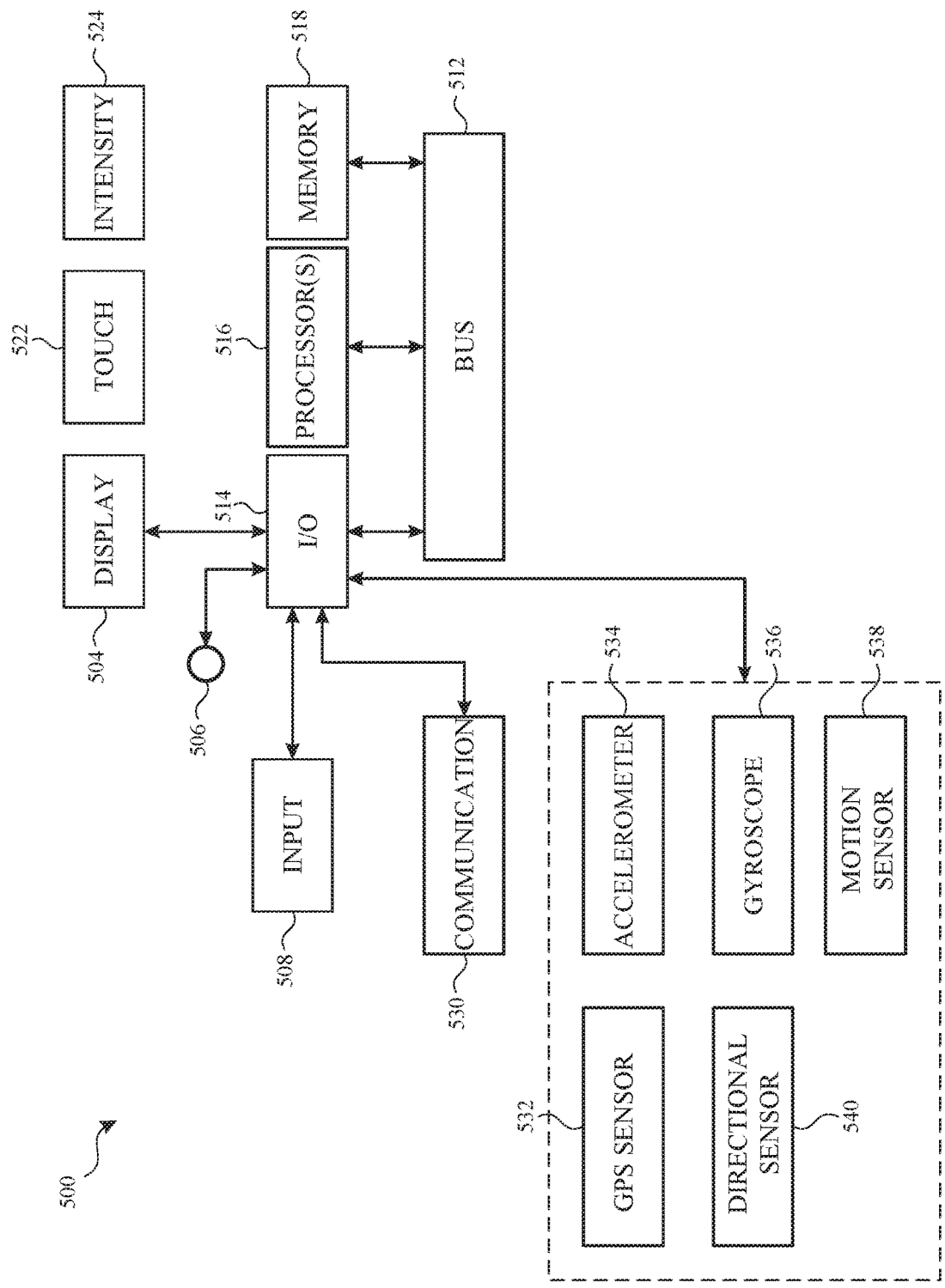
Figure 5D:
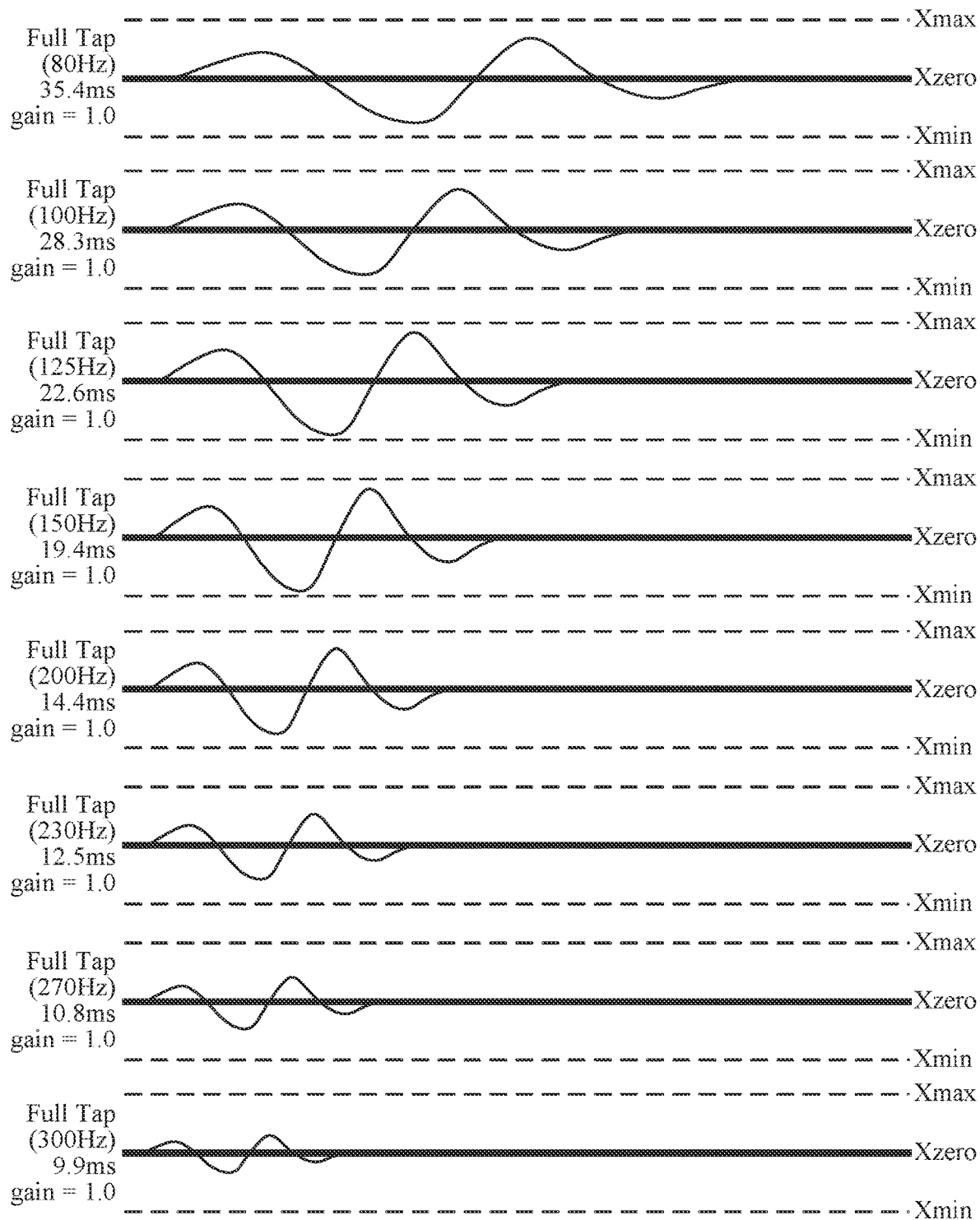
Figure 5E:
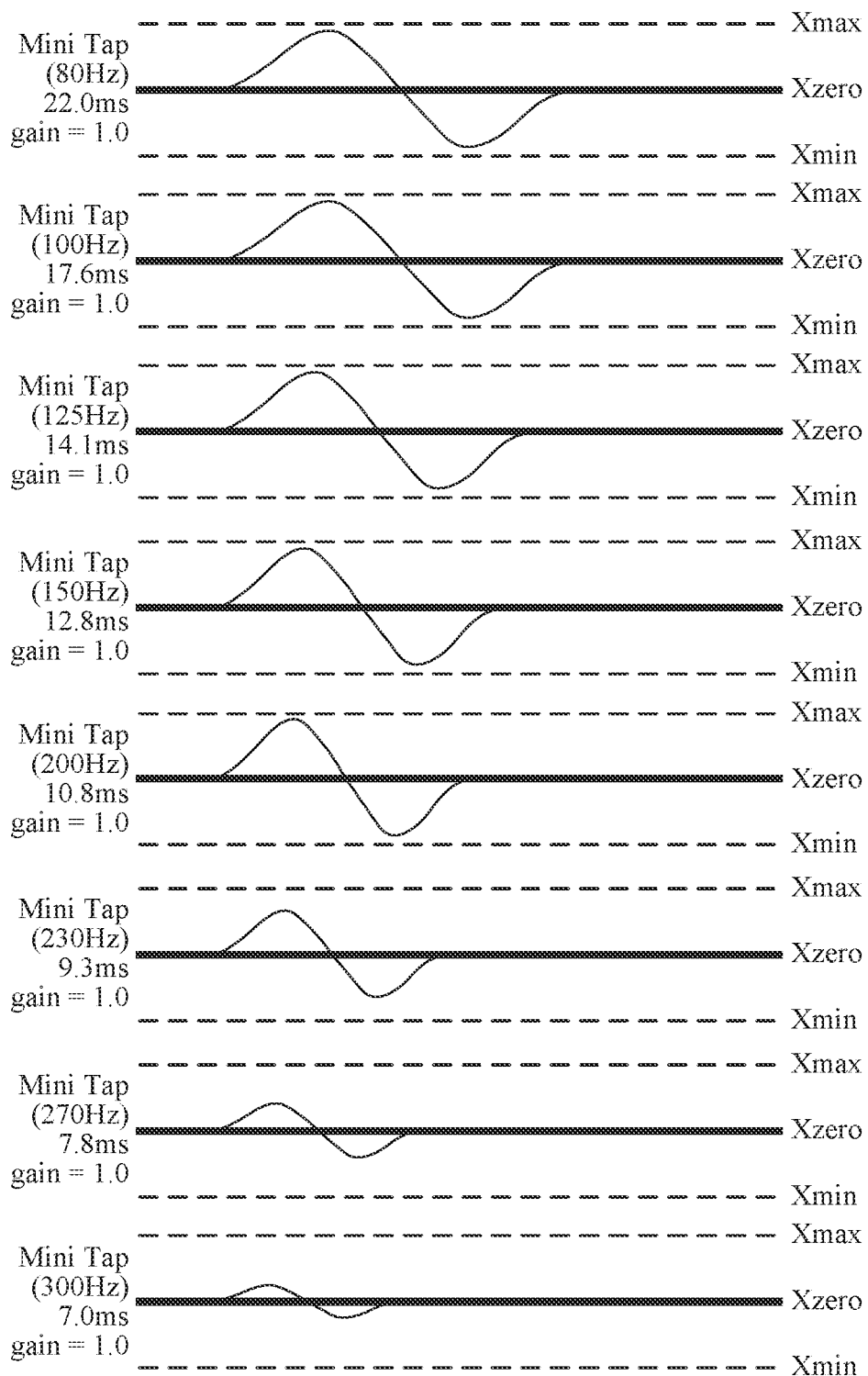
Figure 5F:
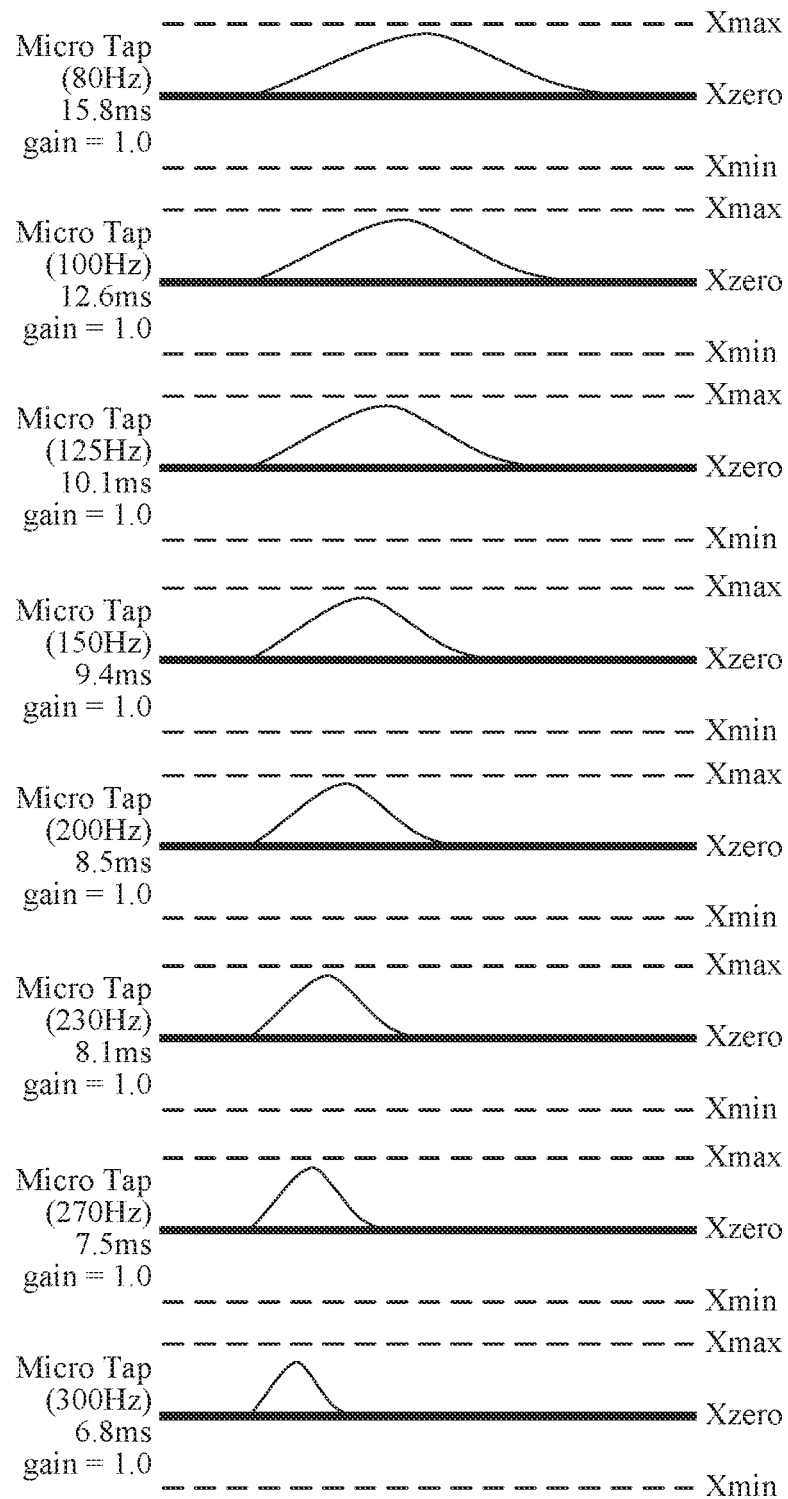

FIG. 5C depicts exemplary personal electronic device 500. In some embodiments, device 500 can include some or all of the components described with respect to FIGS. 1A, 1, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-11. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

Figure 5G:
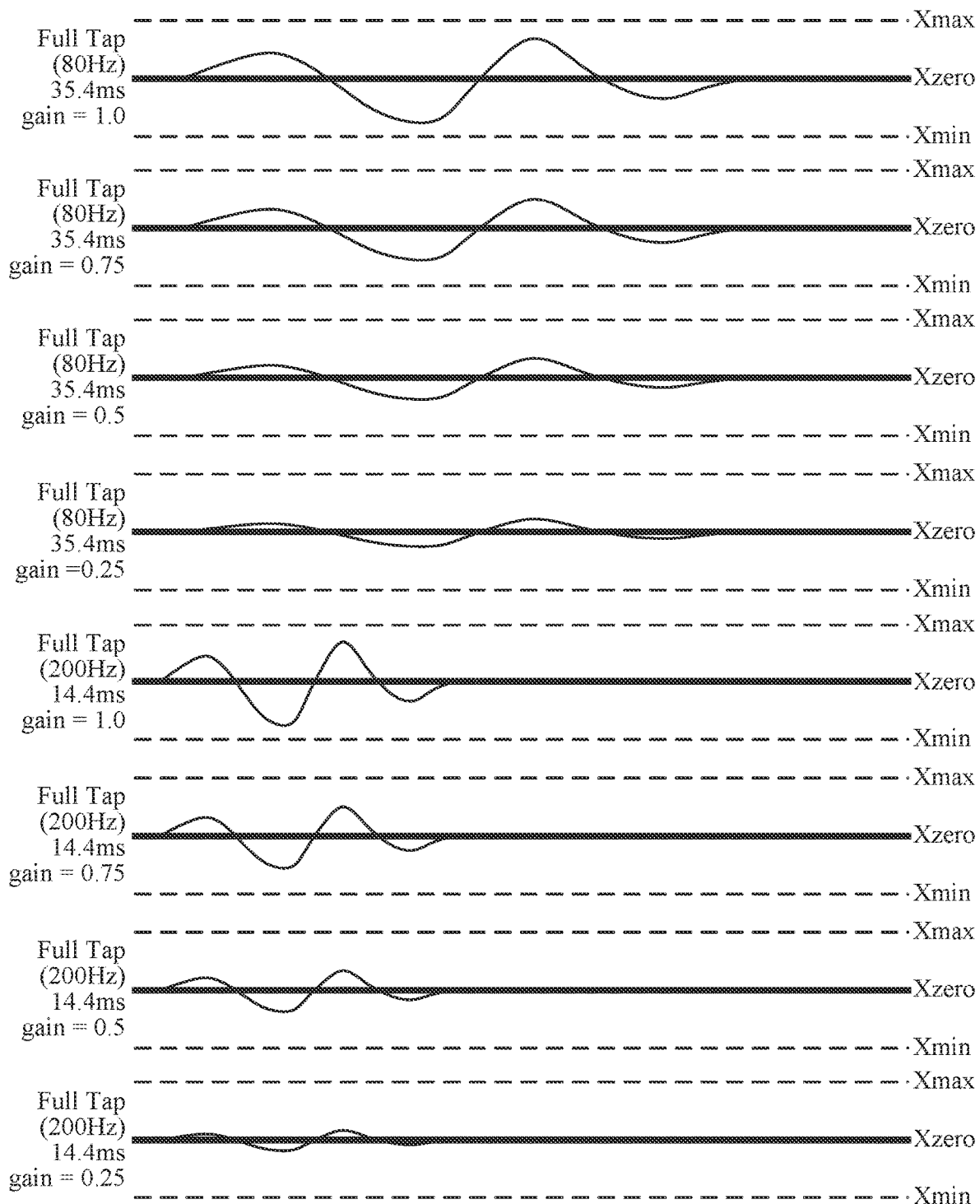
Figure 5H:
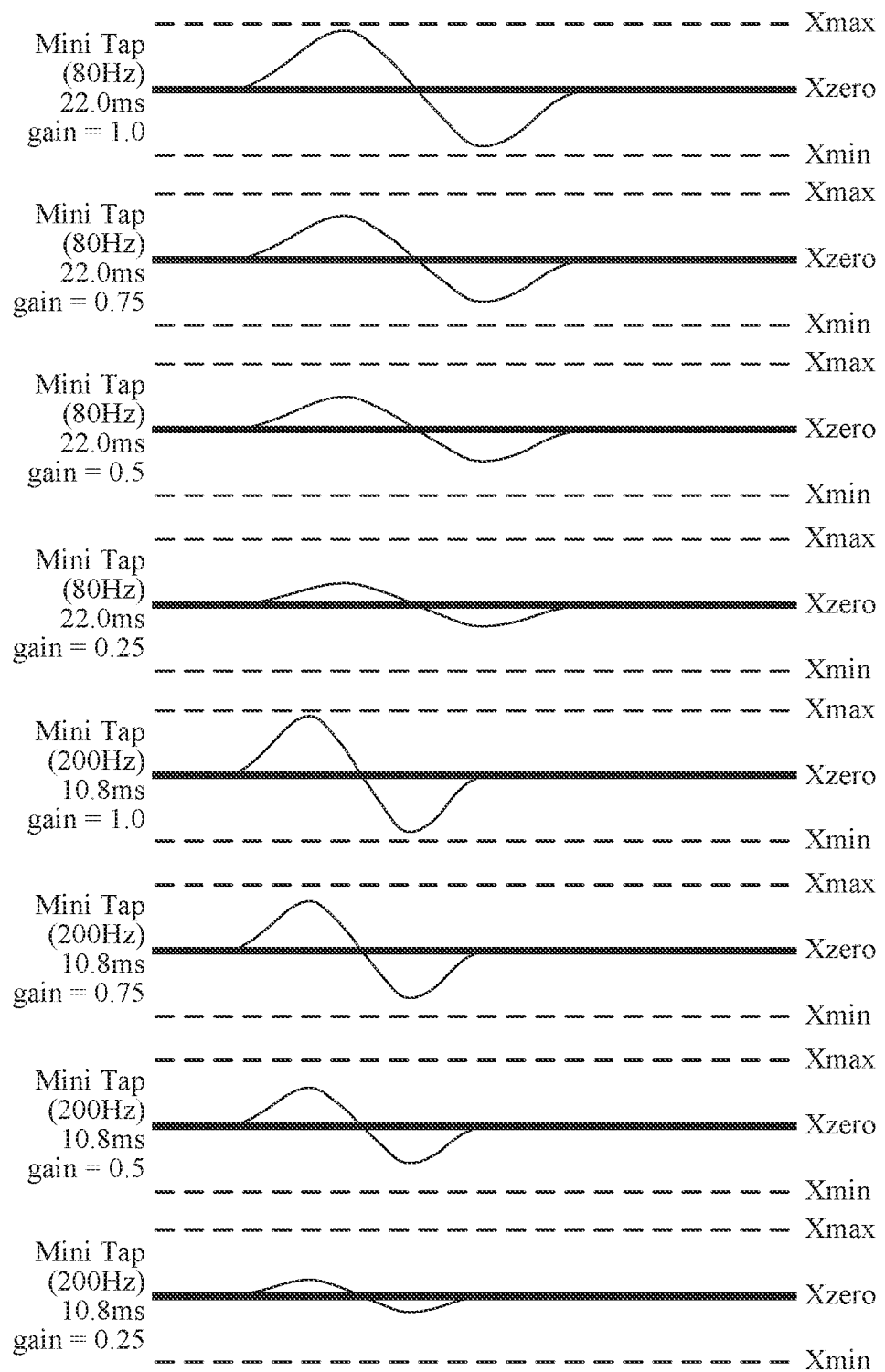
Figure 51:
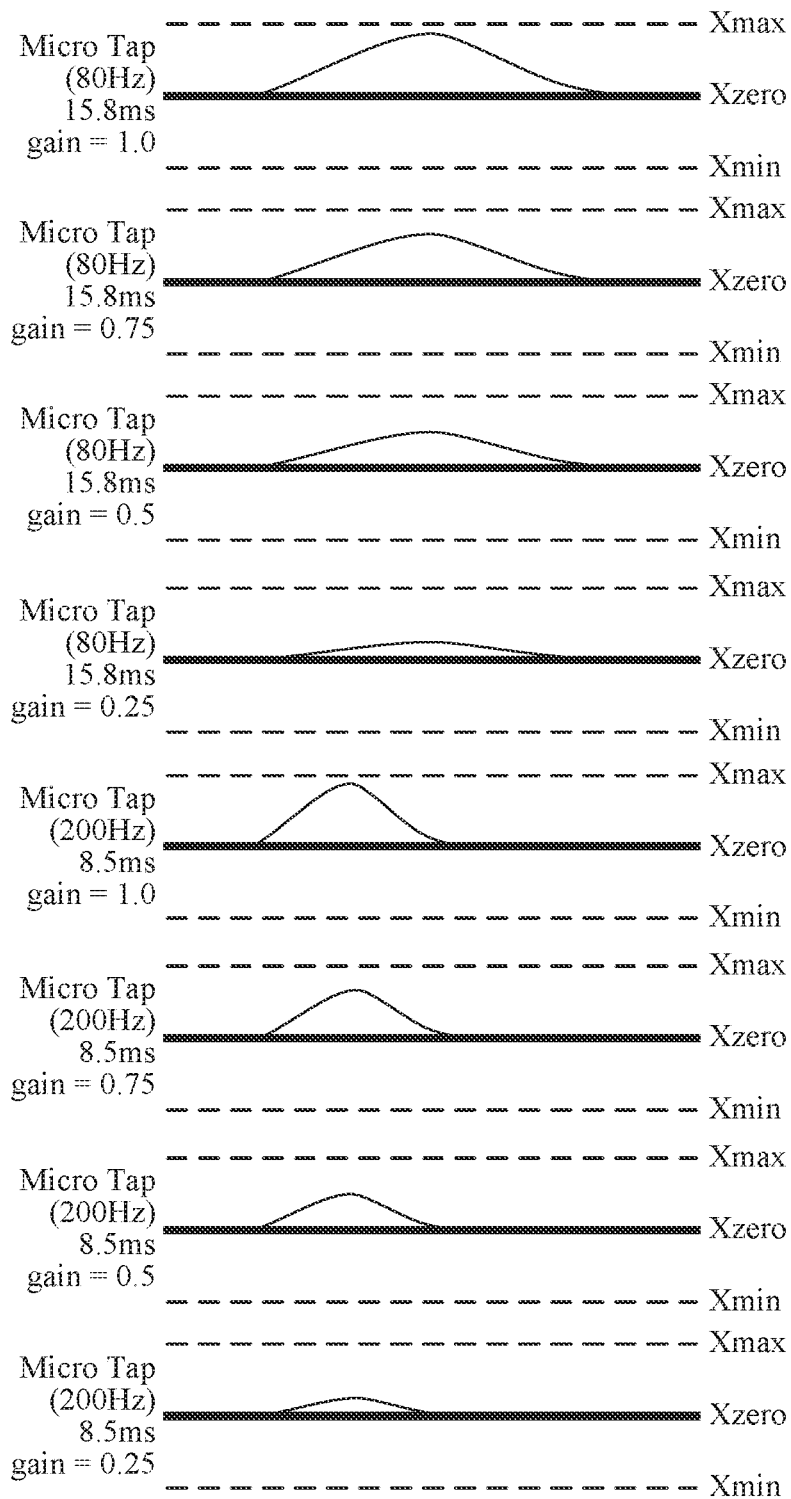

More specifically, FIGS. 5D-5I provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 5G-5I, which are each shown with variants having a gain of 1.0, 0.75, 0.5, and 0.25. As shown in FIGS. 5G-5I, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Nz, and 200 Hz).

FIGS. 5D-5I show tactile output patterns that have a particular waveform. The waveform of a tactile output pattern represents the pattern of physical displacements relative to a neutral position (e.g., Xzero) versus time that a moveable mass goes through to generate a tactile output with that tactile output pattern. For example, a first set of tactile output patterns shown in FIG. 5D (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 5E (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 5F (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 5D-5I include Xmin and Xmax values which represent the maximum and minimum extent of movement of the moveable mass. For larger electronic devices with larger moveable masses, there may be larger or smaller minimum and maximum extents of movement of the mass. The examples shown in FIGS. 5D-5I describe movement of a mass in one dimension, however similar principles would also apply to movement of a moveable mass in two or three dimensions.

As shown in FIGS. 5D-5I, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 5D-5I, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 5D). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 5D-5I, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For Interacting with Channels that Provide Content that Plays in a Media Browsing Application", filed Mar. 24, 2019), "User Interfaces For a Media Browsing Application", filed Mar. 24, 2019), and "User Interface Specific to Respective Content Items", filed Mar. 24, 2019), each of which is hereby incorporated by reference.

Attention is now directed towards embodiments of user interfaces ("UI") and associated processes that are implemented on an electronic device, such as portable multifunction device 100, device 300, or device 500.

User Interfaces and Associated Processes

Output Calibration and Synchronization

Users interact with electronic devices in many different manners, including using electronic devices to present video content, including images and sound. The embodiments described below provide ways in which a first electronic device (e.g., a set-top box) and a second electronic device (e.g., a mobile device such as a smartphone, media player, or tablet) calibrate the colors outputted by a display generation component (e.g., a display generation component in communication with or integrated with the set-top box) and synchronize the output of the display generation component and one or more speakers in communication with the first electronic device. Using the second electronic device to calibrate the output of the display generation component and synchronize the outputs of the display generation component and one or more speakers in communication with the first electronic device enhances interactions with the first and second electronic devices, thus reducing the amount of time a user needs to perform calibration and synchronization operations with the first electronic device and reducing the power usage of the first and second devices, which increases battery life for battery-powered devices. It is understood that people use devices. When a person uses a device, that person is optionally referred to as a user of the device.

In some embodiments, a user may wish to calibrate the color output of the display generation component, such as by "moving the white point" to improve the appearance of images displayed via the display generation component (e.g., displayed by first electronic device via the display generation component). In some embodiments, the calibration attempts to move the white point to match a predetermined white point, optionally within a predetermined threshold. In some embodiments, the user can use the second electronic device to sense images presented (e.g., by the first electronic device) via the display generation component. The second electronic device can optionally transmit the images or information about the images to the first electronic device. In some embodiments, the first electronic device calibrates the output of the first electronic device provided to the display generation component (e.g., by adjusting the display output settings of the first electronic device) and/or provides calibration data to the display generation component for adjusting display settings on the display generation component, thus enabling the display generation component to adjust the colors of the images produced via the display generation component.

In some embodiments, a user may wish to synchronize the timing of images presented via the display generation component in communication with or integrated with the first electronic device, and the sounds outputted by one or more speakers in communication with or integrated with the first electronic device. In some embodiments, the user can use the second electronic device to sense images presented via the display generation component and sounds produced by the one or more speakers. The second electronic device optionally transmits data, such as the time(s) at which the images and/or sounds were detected, to the first electronic device. In some embodiments, in response to the data received from the second electronic device, the first electronic device adjusts the timing of the audio outputs provided (e.g., by the first electronic device) to the speaker(s) and/or the timing of the video output provided (e.g., by the first electronic device) to the display generation component. This process can result in audio/video synchronization and color calibration between the two devices.

FIGS. 6A-6JJ illustrate exemplary ways in which a first electronic device and a second electronic device perform one or more color calibration and/or audio/video synchronization processes in accordance with some embodiments. The embodiments in these figures are used to illustrate the processes described below, including the processes described with reference to FIG. 7. Although FIGS. 6A-6JJ illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6JJ.

As describe above, in some embodiments, the first electronic device is a set-top box (e.g., 500a in FIGS. 6A-6JJ), the second electronic device is a smartphone (e.g., 500b in FIGS. 6A-6JJ), and the display generation component (e.g., 504a in FIGS. 6A-6JJ) is a television in communication with the set-top box. In some embodiments, the second electronic device 500b includes a number of sensors that can be used during the calibration process. One or more of these sensors optionally have other uses not necessarily related to facilitating calibration processes. In some embodiments, the second electronic device 500b includes a color temperature sensor 670 (e.g., optical sensor 164 illustrated in FIGS. 1A and 2) that, in some embodiments, is used to sense the color temperature of ambient light to adjust the colors output by a display, e.g., display 504b. of second electronic device 500b. In some embodiments, the color temperature sensor 670 can be used to detect the colors of one or more images output via display generation component 504a to facilitate one or more of the calibration processes of this disclosure, as will be described in more detail below. In some embodiments, the second electronic device 500b includes one or more microphones 676a and 676b (e.g., including microphone 113 illustrated in FIGS. 1A and 2) that can be used to capture audio content in a variety of contexts, such as during telephone calls, videoconferences, while capturing video, voice memos, etc. As will be described in more detail below, the one or more microphones 676a and 676b of second electronic device 500b can be used to detect sounds produced by one or more speakers in communication with first electronic device 500a to facilitate the calibration processes of this disclosure. In some embodiments, the second electronic device 500b includes one or more proximity sensors 672 (e.g., including proximity sensor 166 illustrated in FIGS. 1A and 2) that can be used to detect the face of a user using device 500b during a phone call to deactivate the touch sensing capabilities of touch-sensitive display 504b. As will be described in more detail below, in some embodiments, the one or more proximity sensors 672 of second electronic device 500b can be used to detect the proximity of a respective side of the second electronic device 500b to the surface of display generation component 504a to facilitate one or more of the calibration processes of this disclosure. In some embodiments, the second electronic device 500b includes one or more cameras (e.g., including camera 674 and/or optical sensor 164 illustrated in FIGS. 1A and 2) that can be used to take one or more photos, capture video, and during videoconferencing. As will be described in more detail below, in some embodiments, the one or more cameras 674 can be used to detect whether the second electronic device 500b is aligned with a visual indication presented via display generation component 504a to facilitate one or more of the calibration processes of this disclosure. In some embodiments, electronic device 500b can include one or more gyroscopes and/or accelerometers (e.g., accelerometer 168 illustrated in FIGS. 1A and 2) that can be used to perform operations in response to detecting movement of the second electronic device 500b that matches one or more criteria (e.g., activating display 504b in response to detecting movement of the second electronic device 500b consistent with a user picking up the second electronic device 500b), performing activity tracking, and the like. As will be described in more detail below, the one or more accelerometers and/or gyroscopes can be used to detect the angle of second electronic device 500b (e.g., relative to gravity) to facilitate one or more of the calibration processes of this disclosure.

In some embodiments, the first electronic device 500a (e.g, a set-top box) is in communication with display generation component 504a (e.g., a television display) to turn source signals from one or more sources into content that can be displayed via display generation component 504a. In some embodiments, the first electronic device 500a is in communication with a remote control device (e.g., 510 in FIGS. 6A-6JJ), which enables remote control device 510 to act as an input device of first electronic device 500a. In some embodiments, the remote control device 510 includes a touch-sensitive surface (e.g., 451 in FIGS. 6A-6JJ) and a plurality of buttons.

FIGS. 6A-6M illustrate exemplary ways in which the first electronic device 500a and the second electronic device 500b perform a color calibration process in accordance with some embodiments.

Figure 6A:
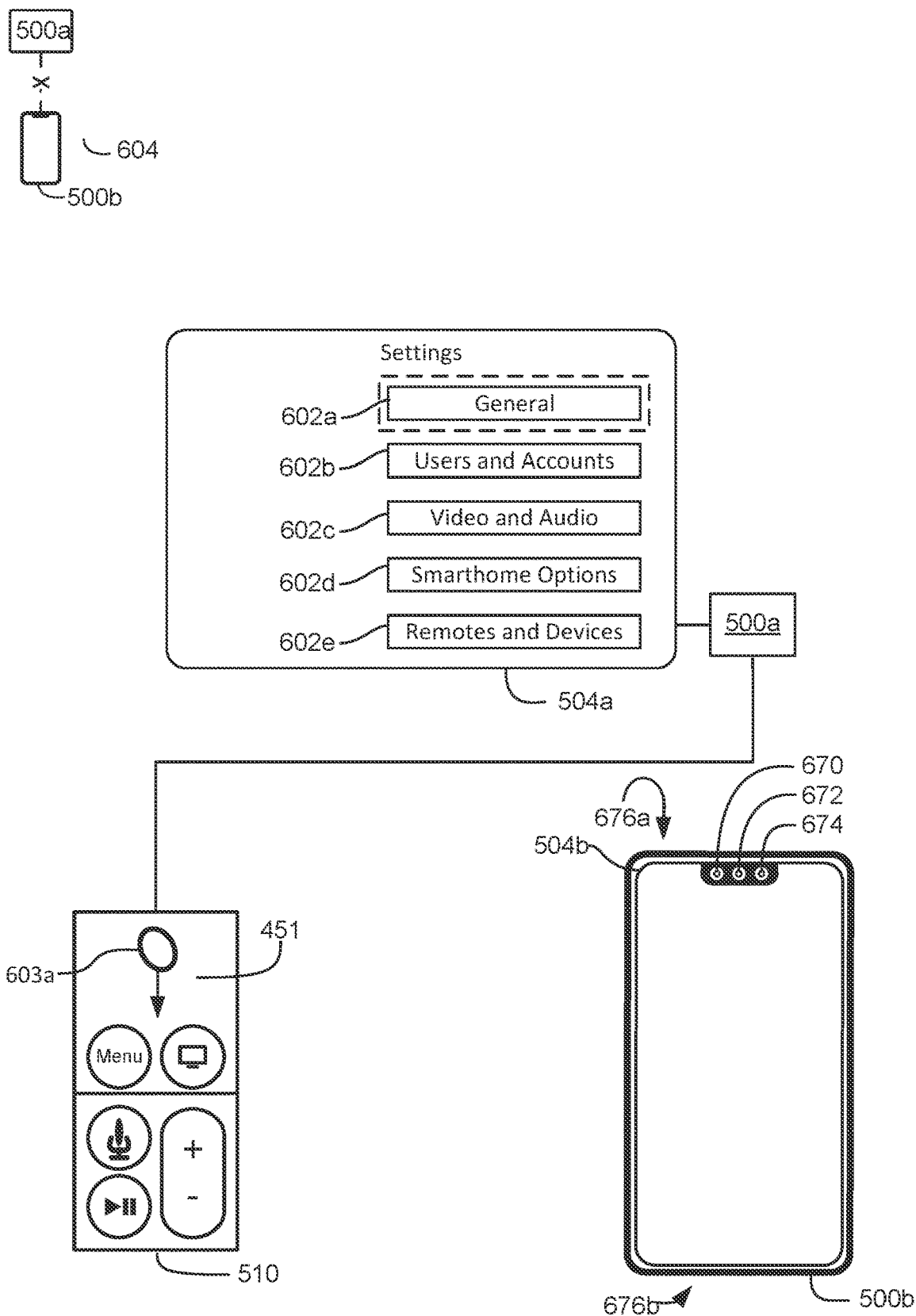
FIGS. 6A-6JJ illustrate exemplary ways in which a first electronic device and a second electronic device perform one or more calibration and/or synchronization processes in accordance with some embodiments.

In FIG. 6A, the first electronic device 500a provides a settings user interface for display via display generation component 504a. In some embodiments, the settings user interface is accessible from a main menu of the electronic device 500a. For example, the main menu includes a plurality of selectable options that, when selected, causes the electronic device 500a to display the user interface of the application associated with the selected option. In some embodiments, in response to detecting selection of a settings option, the electronic device 500a displays the settings user interface illustrated in FIG. 6A. In some embodiments, the settings user interface optionally includes a plurality of selectable options 602a-e that, when selected, causes the electronic device 500a to display one or more settings associated with the selected option. In some embodiments, additional or alternative options are displayed.

As indicated by legend 604 of FIG. 6A, while the first electronic device 500a displays the settings user interface, in the example of FIG. 6A, the second electronic device 500b and the first electronic device 500a are not paired (though in some embodiments, they may already be paired). In some embodiments, "pairing" the second electronic device 500b and the first electronic device 500a includes creating a wireless (e.g., network) connection between the two devices to enable the devices to exchange data (e.g., via Wi-Fi or Bluetooth), such as color calibration and audio/visual synchronization data. In some embodiments, while the first electronic device 500a displays the settings user interface, the second electronic device 500b displays a different user interface unrelated to the first electronic device 500a, such as a system user interface or an application user interface. In some embodiments, while the first electronic device 500a displays the settings user interface illustrated in FIG. 6A, the display 504b of the second electronic device 500b does not output an image (e.g., the display is powered down, in sleep or standby mode, etc.).

As shown in FIG. 6A, the user optionally swipes (e.g., with contact 603a) down to move the input focus on the display of the display generation component 504a down from option 602a, "General," to another option in the settings user interface. By swiping down, the display of display generation component 504a can change which option is highlighted. In some embodiments, as illustrated in FIG. 6B, in response to one or more swipe inputs, the display generation component 504 moves the current focus from option 602a to option 602c. The user optionally then selects (e.g., with a click of contact 603b on touch-sensitive surface 451) option 602c. In some embodiments, option 602c is associated with "Video and Audio" options of the first electronic device 500a. In some embodiments, the "Video and Audio" options include various settings related to the presentation of video and audio outputs of the electronic device 500a, such as options to change the format of the audio and video outputs, an option to change the speakers via which the audio outputs should be presented, one or more options to change which sound effects are presented while navigating menus presented by electronic device 500a, and one or more settings related to synchronizations and/or calibrations of the outputs of electronic device 500a.

Figure 6C:
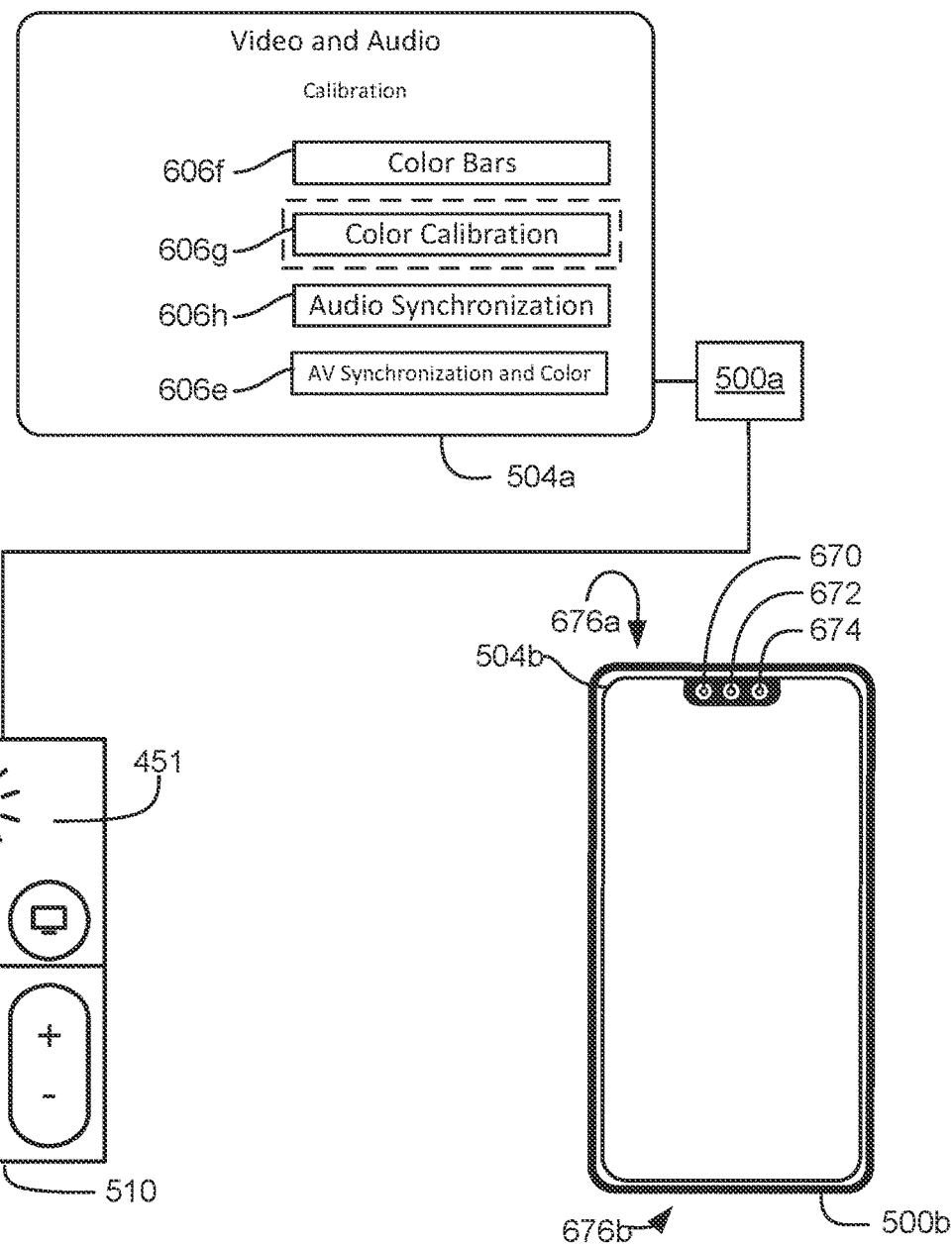

In some embodiments, as shown in FIG. 6C, the electronic device 500a displays the "Video and Audio" settings in response to the input, e.g., selection of "Video and Audio" option 602c by input 603b, illustrated in FIG. 6B. The "Video and Audio" settings optionally include a number of settings related to calibration, such as a "Color Bars" option 606f that, when selected, causes the electronic device 500a to display, via display generation component 504a, one or more colored bars for calibration and diagnostic purposes; a "Color Calibration" option 606g that, when selected, causes the electronic device 500a to initiate a process for color calibration; an "Audio Synchronization" option 606h that, when selected, causes the electronic device 500a to initiate an audio-video synchronization process; and an "AV Synchronization and Color" option that, when selected, causes the electronic device 500a to initiate a process to simultaneously perform an audio-video synchronization and a color calibration process. In some embodiments, the Video and Audio settings include additional or alternative options.

Figure 6D:
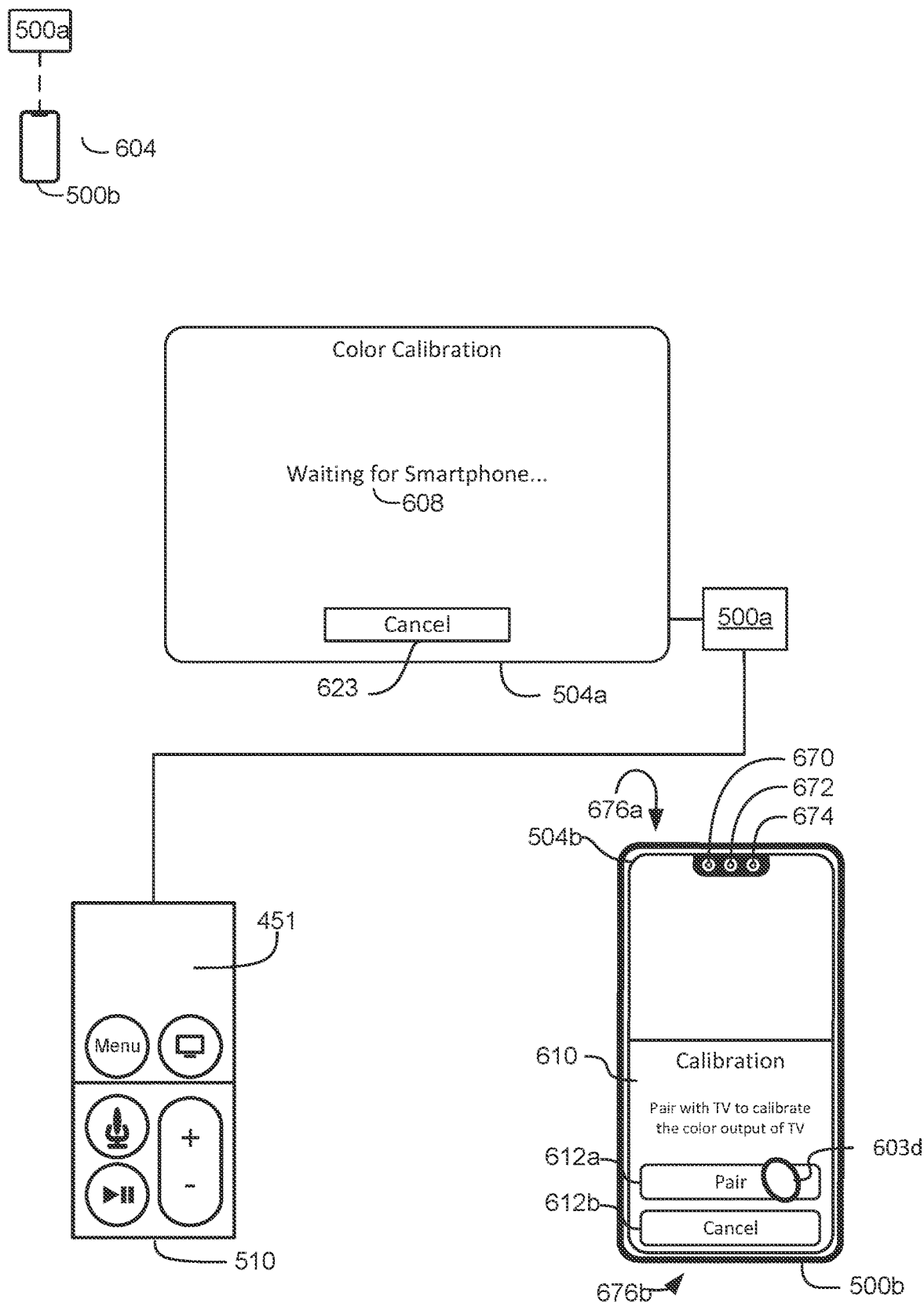

As shown in FIG. 6C, in some embodiments, the user selects (e.g., with a click of contact 603c on touch-sensitive surface 451) the "Color Calibration" option 606g. In some embodiments, as shown in FIG. 6D, in response to the user's selection in FIG. 6C, the first electronic device 500a initiates a color calibration process. In some embodiments, performing the color calibration process includes pairing the first electronic device 500a with the second electronic device 500b. To pair the devices, the first electronic device 500a optionally displays, via display generation component 504a an indication 608 that pairing of the first electronic device 500a and second electronic device 500b is underway. In some embodiments, the first electronic device 500a and 500b are on a shared network (e.g., a Wi-Fi network, a Bluetooth connection, or a wired connection) and the first electronic device 500a optionally transmits, via the shared network, an indication to the second electronic device 500b to pair the devices. As shown in legend 604d, a paired connection between the first electronic device 500a and the second electronic device 500b is being established, for example (e.g., indicated by the dashed lines between 500a and 500b).

In response to the indication from the first electronic device 500a to pair the first and second electronic devices 500b, the second electronic device 500b optionally displays an indication 610 of the pairing process, an option 612a to pair the first and second electronic devices, and an option 612b to cancel the pairing process. In some embodiments, as shown in FIG. 6D, the user selects (e.g., with contact 603d) the option 612a to pair the electronic devices. In response to detecting selection of the option 612a to pair the electronic devices, the second electronic device 500b optionally transmits a pairing indication to the first electronic device 500a.

In some embodiments, if multiple mobile devices other than the second electronic device 500b are in the vicinity (e.g., within a threshold distance, such as 5, 10 20 feet) of the first electronic device 500a and/or are connected to a shared network with the first electronic device 500a, each of the mobile devices can optionally present the user interface presented by the second electronic device 500b in FIG. 6D. The first electronic device 500a can optionally pair with the mobile device from which the pairing indication was received first, e.g., electronic device 500b. In response to receiving the pairing indication, in some embodiments, the first electronic device 500a pairs with the second electronic device 500b and ceases to initiate pairing with the other electronic devices.

In some embodiments, if the user selects the option, e.g., option 612b, to cancel the pairing operation, the color calibration does not proceed. For example, when the user cancels pairing, the electronic device 500a presents the user interface illustrated in FIG. 6C. In response to the user's selection in FIG. 6D and successful pairing, the first electronic device 500a optionally displays the user interface illustrated in FIG. 6E. In some embodiments, the first electronic device 500a and the second electronic device 500b are already paired (e.g., while the electronic device 500a displays the user interface illustrated in FIGS. 6A-6C) so the first electronic device 500a displays the user interface described below with reference to FIG. 6E in response to the user's selection in FIG. 6C.

Figure 6H:
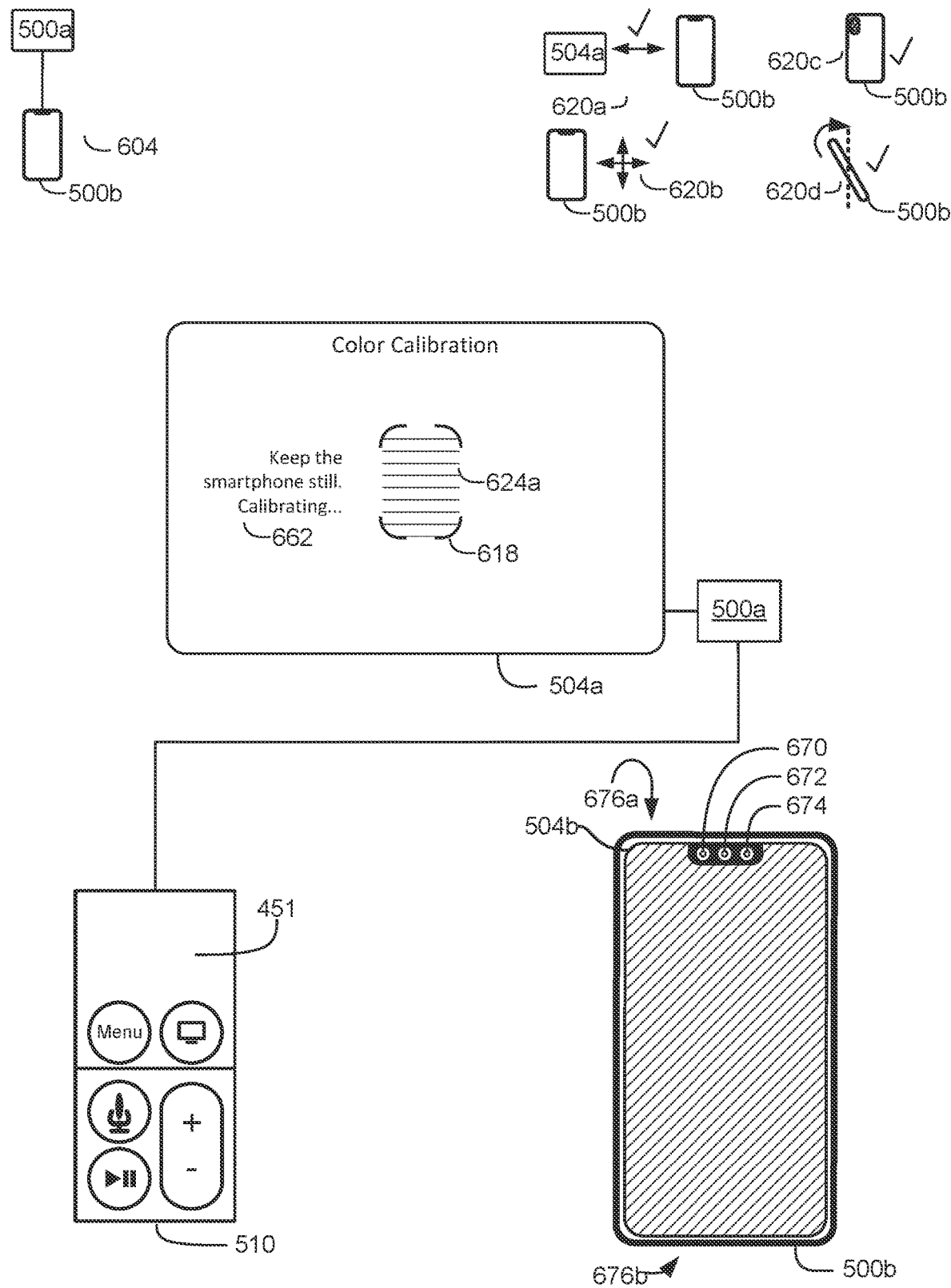
Figure 6K:
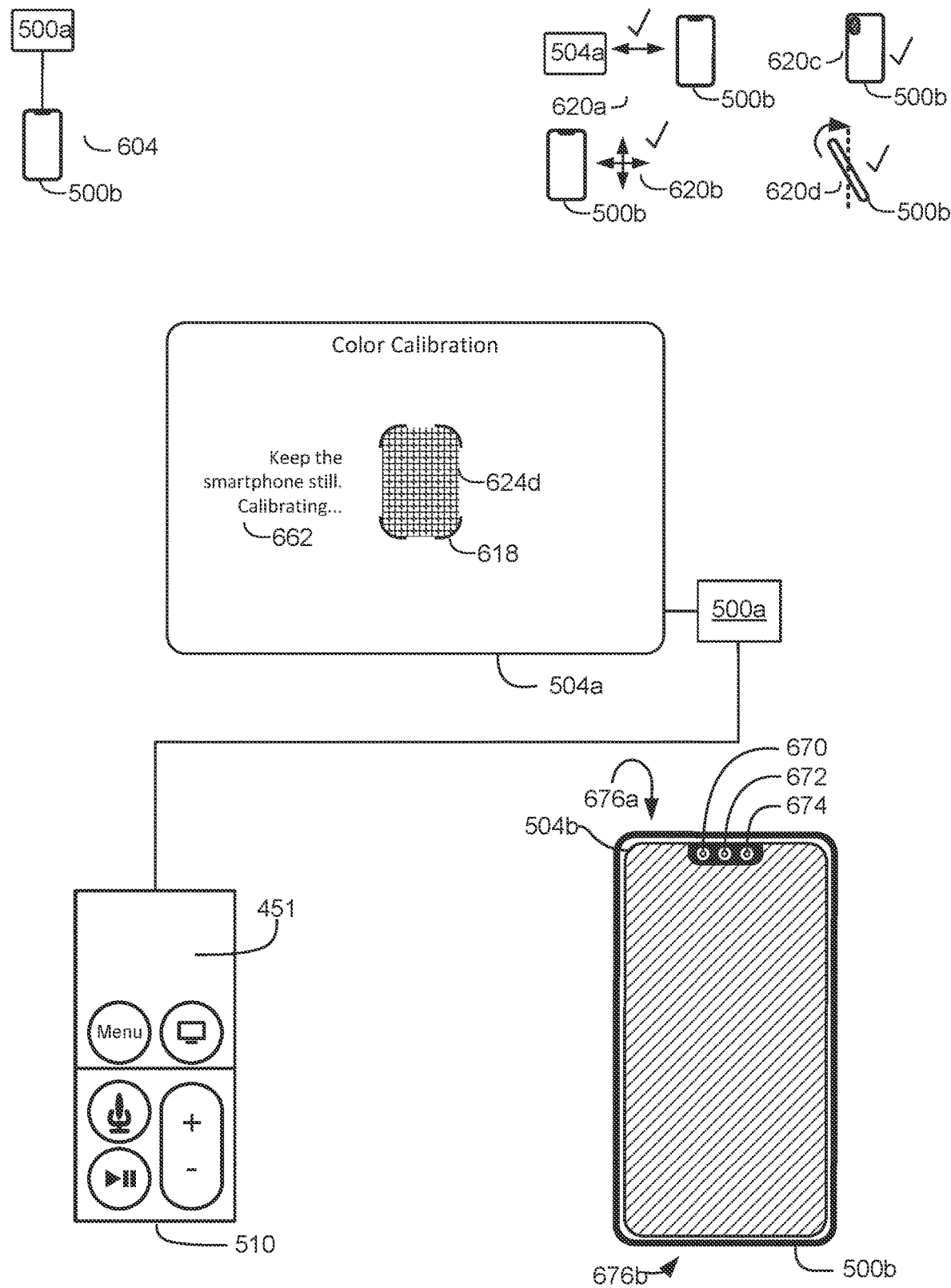
Figure 6M:
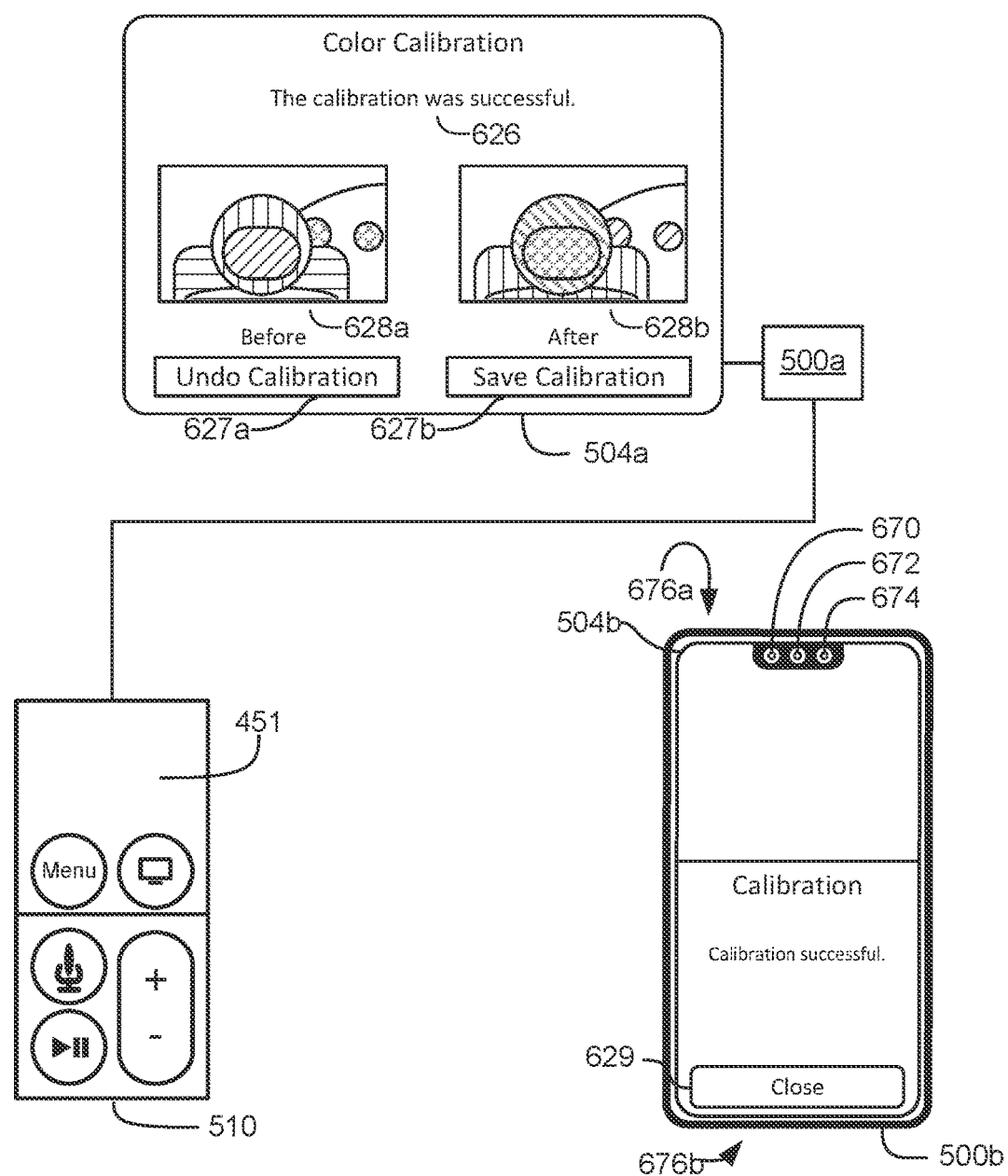
Figure 6X:
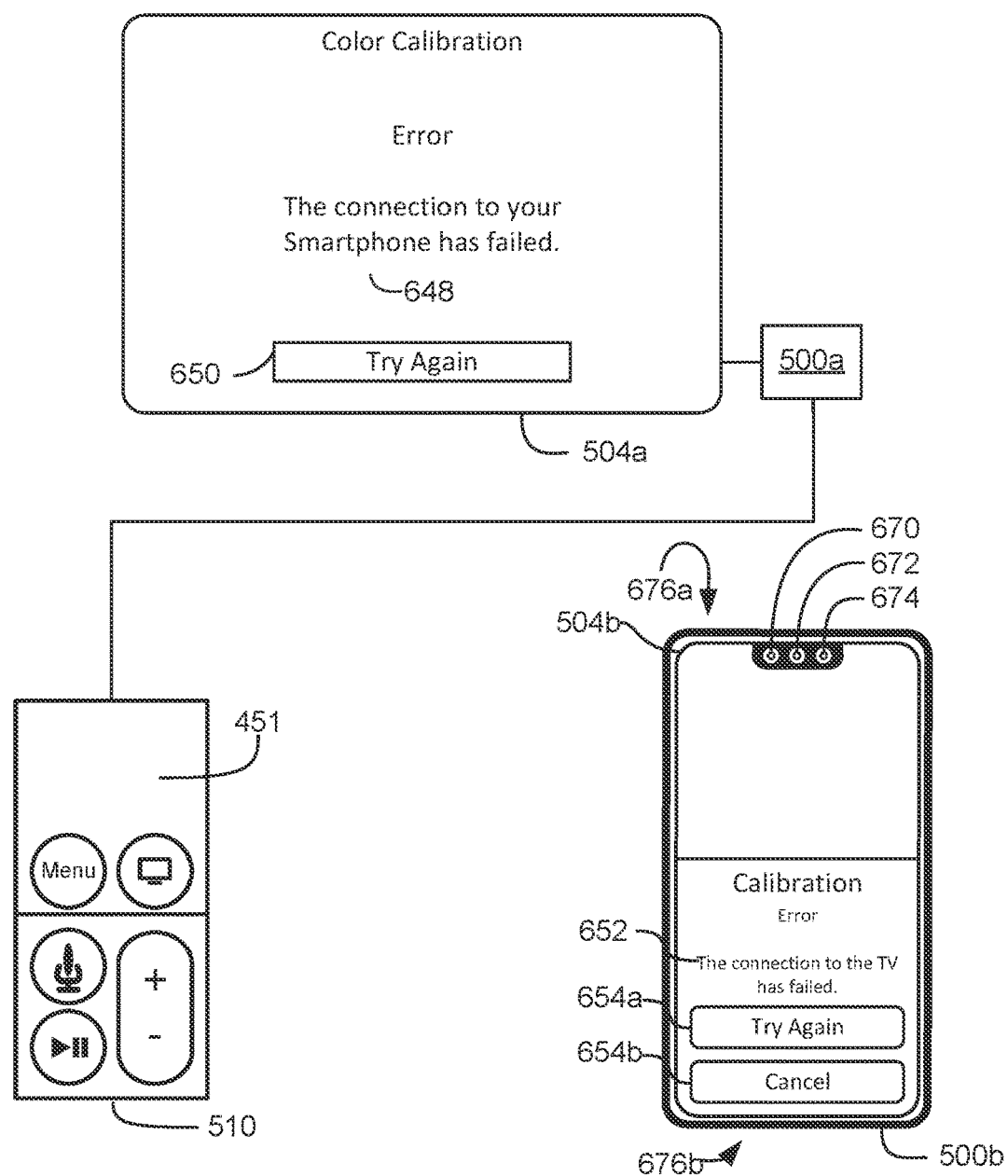
Figure 6Y:
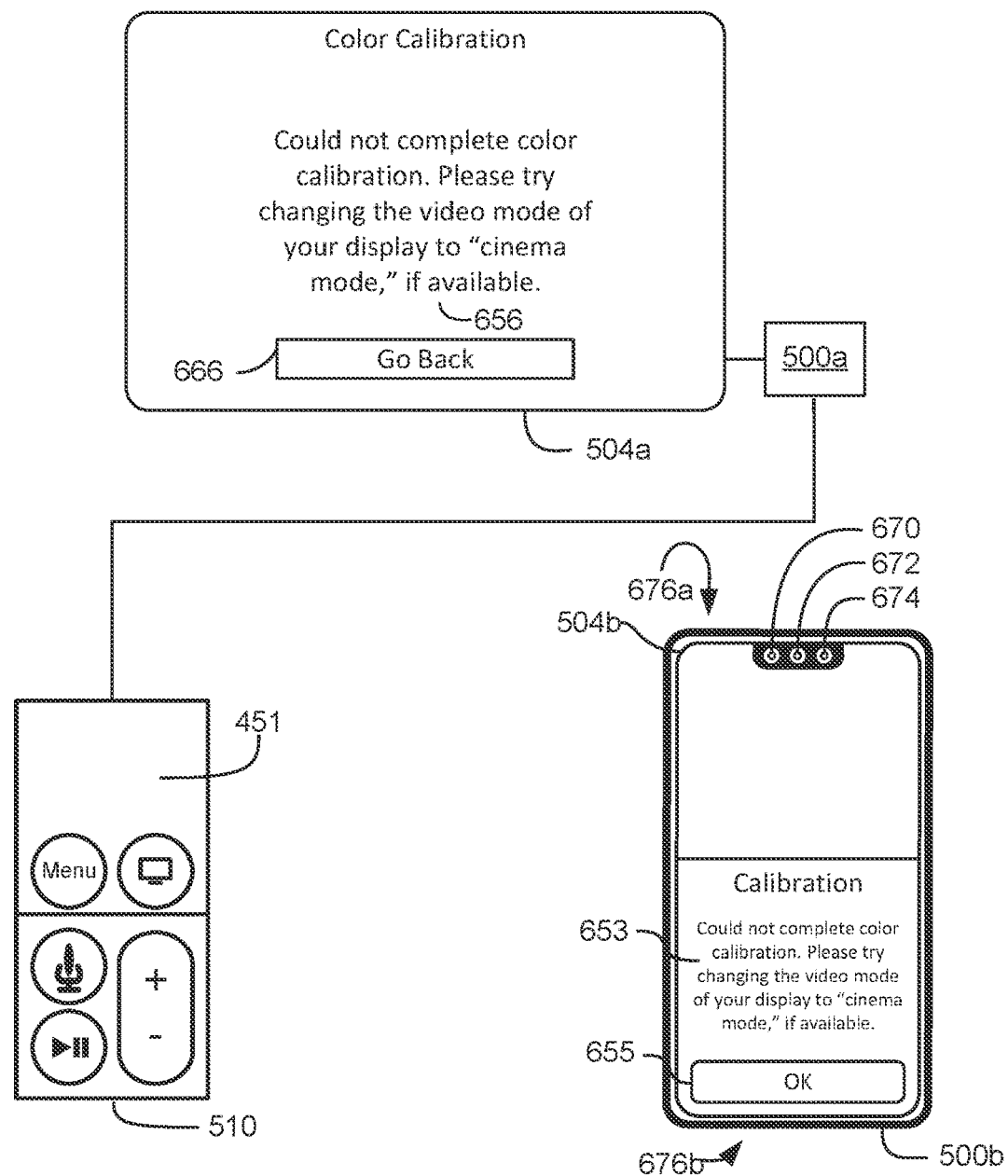
Figure 6E:
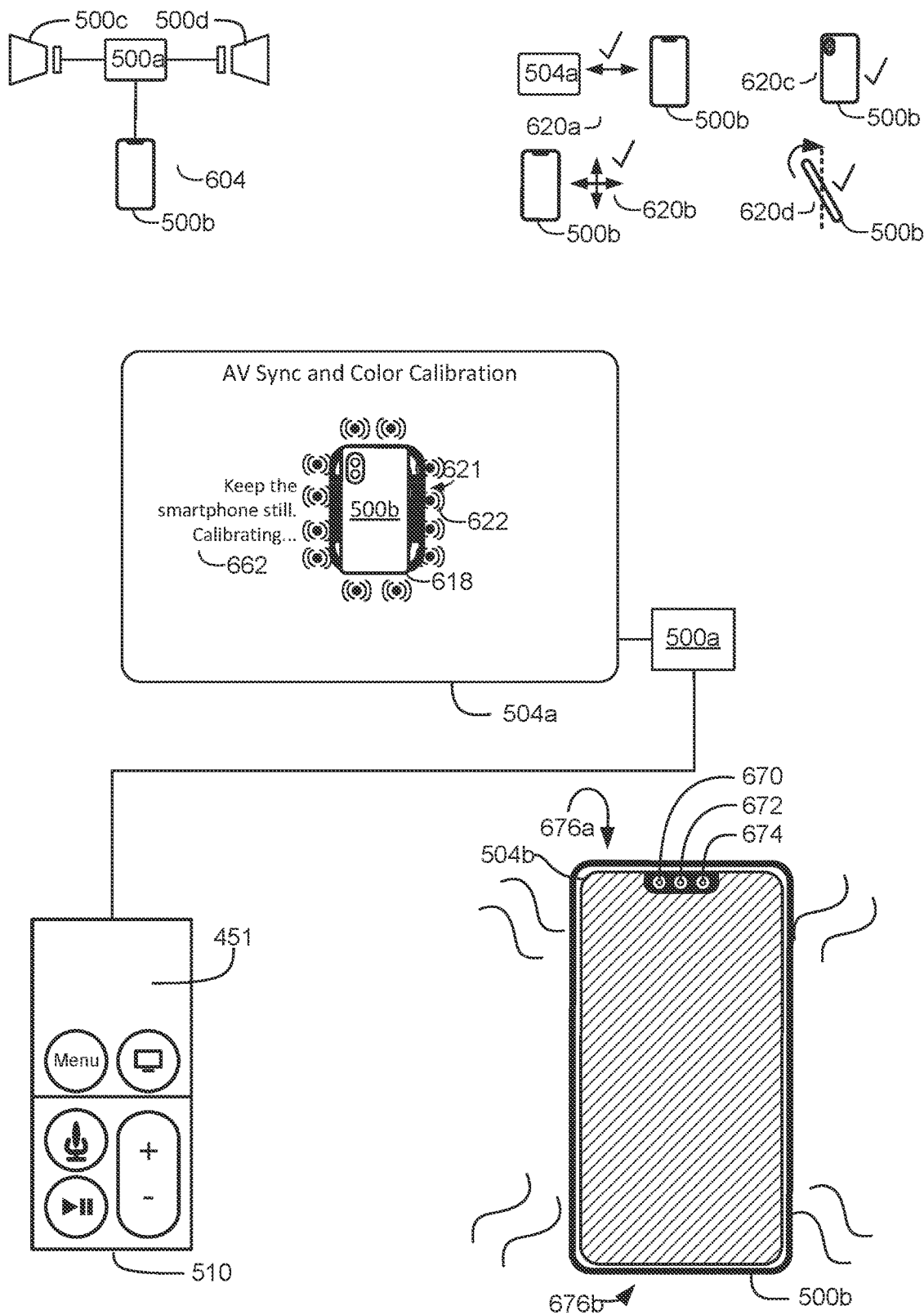
Figure 6H:
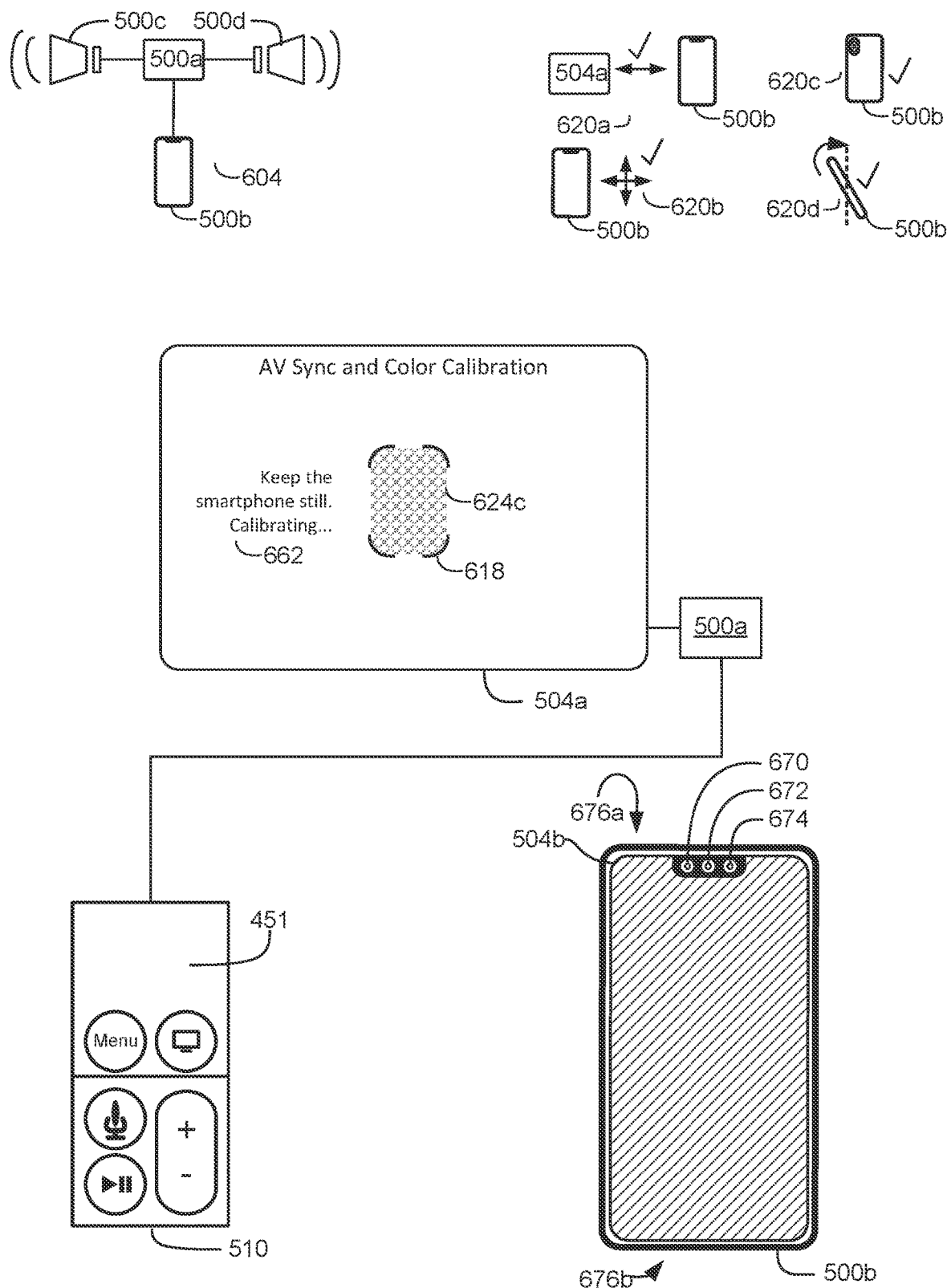
Figure 6J:
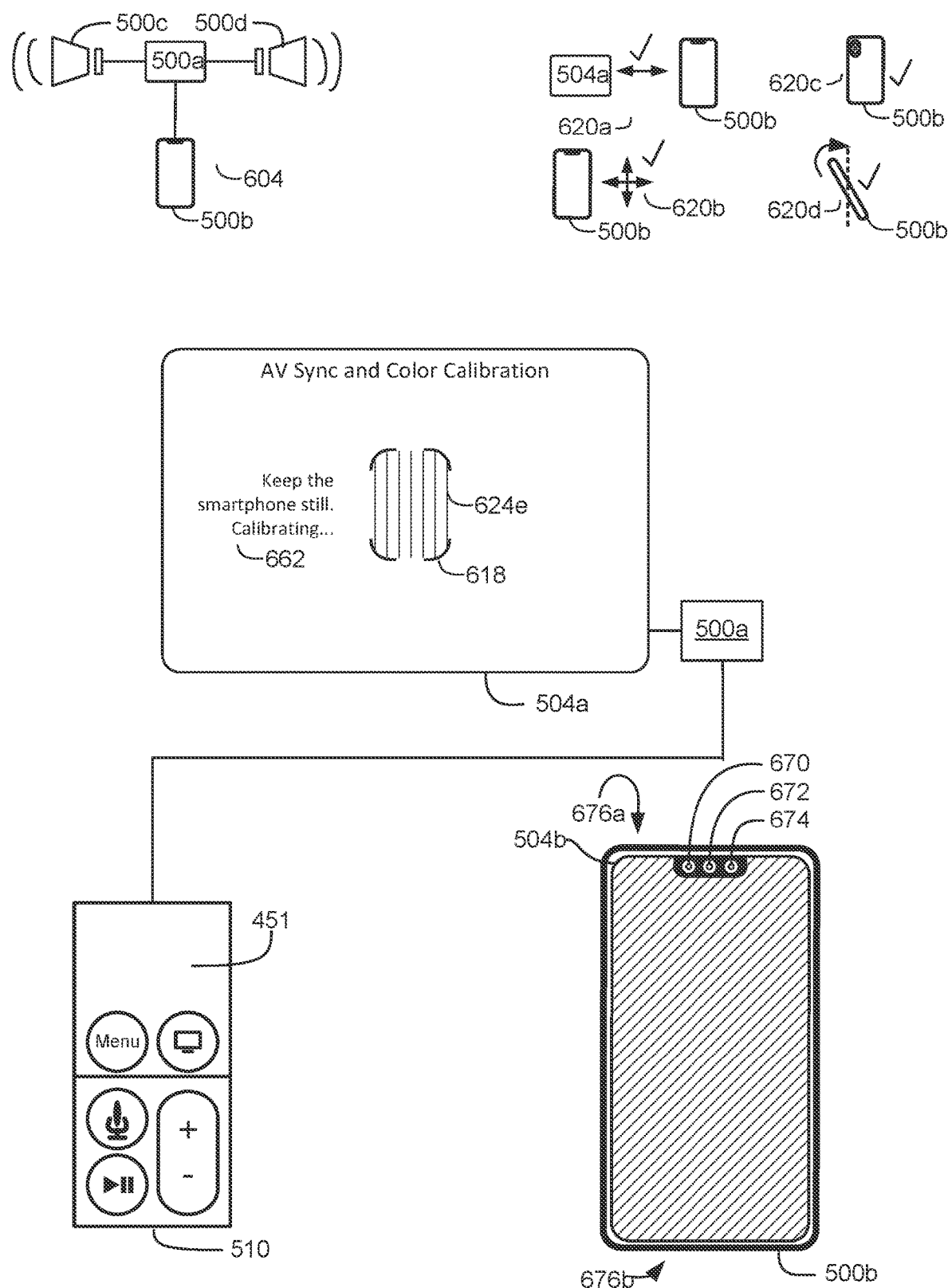

FIG. 6E illustrates an exemplary color calibration user interface displayed by the first electronic device 500a via display generation component 504a. In some embodiments, to perform the calibration, the second electronic device 500b must be placed with the front side (e.g., the side with display 504b) facing display generation component 504a at a position shown (e.g., is parallel with) by indication 618. In some implementations, the front side of the second electronic device 500b should be in a position and orientation (e.g., a portrait orientation or a landscape orientation) shown on the display of display generation component 500a. In some embodiments, during the calibration process the second electronic device 500b uses one or more image sensors (e.g., camera 674, color temperature sensor 670, etc.) to capture a series of images displayed via display generation component 504a. Thus, the first electronic device 500a can display, via display generation component 504a, a user interface directing placement of the second electronic device 500b to perform the calibration. The second electronic device 500b can be a threshold distance from the display generation component 504a, but device 500b should maintain the position and orientation shown by the display on the display generation component 504a.

FIG. 6E also illustrates an exemplary user interface displayed by the second electronic device 500b at this stage of the calibration process. For example, the user interface includes text 614 that indicates that the first and second electronic devices are paired and that the user should follow the directions presented by the first electronic device 500a via display generation component 504a. The user interface may further include a selectable option 625 that is selectable to cancel the calibration. It should be understood that the user interface presented by the second electronic device 500b is merely exemplary. In some embodiments, a different user interface is displayed by the second electronic device 500b or the second electronic device 500b does not display a user interface. For example, display generation component 504b is optionally off, in a sleep or standby mode, or otherwise not displaying an image.

In some embodiments, one or more position criteria of the second electronic device 500b should be satisfied for the calibration to proceed. These criteria optionally ensure that the second electronic device 500b will be able to accurately capture the colors produced by display generation component 504a during the calibration process. Exemplary criteria are represented by legends 620a-620d.

Legend 620a can represent the distance between the second electronic device 500b and the display generation component 504a. An exemplary distance criterion is optionally satisfied when the distance between the second electronic device 500b and the display generation component 504a is less than a threshold (e.g., 3 cm, 2 cm, 1cm, 0.5 cm). The second electronic device 500b can detect that the distance-based criterion is satisfied using a proximity sensor 672 included in the second electronic device 500*b* described above (e.g., located on the display 504*b*-side of device 500*b*).

Legend 620*b* can represent the (x, y) position of the second electronic device 500*b* (and/or the (x,y) position of a camera or image sensor located on the display 504*b*-side of device 500*b*) relative to the indication 618 presented via display generation component 504*a*. An exemplary (x, y) position criterion is optionally satisfied when the second electronic device 500*b* is at a location that corresponds to the perimeter of the second electronic device 500*b* being within the area corresponding to indication 618 and/or when one or more image sensors of the second electronic device 500*b* being within the area corresponding to indication 618. In some embodiments, the second electronic device 500*b* detects that the (x, y) position criterion is satisfied using one or more image sensors (e.g., color temperature sensor 670, cameras) located on the display 504*b*-side of device 500*b* described above. In some embodiments, indication 618 is displayed in a color (or with another distinguishing feature such as a pattern or animation) different from the background of the user interface displayed by the first electronic device 500*a*, which can enable the second electronic device to determine, using the one or more image sensors, whether the device's (x, y) position and orientation satisfies the predetermined (x, y) position and orientation criterion. Although FIG. 6E illustrates indication 618 as being oriented in a way that corresponds to a portrait orientation of electronic device 500*b*, in some embodiments, the electronic device 500*a* displays an indication that is oriented in a way that corresponds to a landscape orientation of the electronic device 500*b*.

Legend 620*c* can represent which side of the second electronic device 500*b* is facing the display generation component 504*a*. This criterion is optionally satisfied when the front side (e.g., the side with display 504*b* and one or more image sensors) is facing the display generation component 504*a*. In some embodiments, when the front of the second electronic device 500*b* is facing the display generation component 504, the back of the second electronic device 500*b* is facing the user. In some embodiments, the second electronic device 500*b* can detect that this criterion is satisfied using one or more image sensors (e.g., color temperature sensor 670, cameras) located on the display 504*b*-side of device 500*b* described above. In some embodiments, the same sensors that determine whether or not the position of the second electronic device 500*b* satisfies the (x, y) position criterion represented by legend 620*b* can be used to determine whether the position of the electronic device 500*b* satisfies the criterion represented by legend 620*c*.

Legend 620*d* can represent the vertical angle/orientation of the second electronic device 500*b*. In some embodiments, the vertical angle criterion is optionally satisfied when the second electronic device 500*b* is within a degree threshold (e.g., 10 or 5 or 4 or 3 or 2 or 1 degree(s)) of being aligned with the direction of gravity. The electronic device 500*b* optionally detects that this criterion is satisfied using one or more accelerometers and/or gyroscopes included in device 500*b* described above. In some embodiments, the vertical angle criterion is optionally satisfied when the second electronic device 500*b* is within a degree threshold (e.g., 10 or 5 or 4 or 3 or 2 or 1 degree(s)) of being parallel to a surface of display generation component 504*a*. The electronic device 500*b* optionally detects that this criterion is satisfied using one or more proximity sensors 672 included in device 500*b* described above. In some embodiments, the electronic device 500*b* uses the same sensor(s) to evaluate whether the position of the second electronic device 500*b* satisfies the vertical angle criterion represented by legend 620*d* as the sensor(s) used to evaluate whether the position of the second electronic device 500*b* satisfies the distance-based criterion represented by legend 620*a*.

As an example, FIG. 6E illustrates that none of the criteria indicated in legends 620*a-d* are met. As a result, the first electronic device 500*a* can present a user interface directing placement of the second electronic device 500*b* proximate to the display generation component 504*a*. The user interface optionally includes instructions 616 for how second electronic device 500*b* should be placed, an indication 618 of a location of the display generation component 504*a* over which the second electronic device 500*b* should be placed, animated particles 622 (e.g., surrounding indication 618), and an option 623 to cancel the calibration. In some embodiments, indication 618 is shaped similarly to the second electronic device 500*b* and may have a color that is different from the background on which it is displayed. Animated particles 621, which can have different color, size, translucency, or movement pattern from animated particles 622, can move around inside of indication 621 while the one or more calibration criteria represented by legends 620*a-d* are not met. In some embodiments, the animated particles 622 move around the user interface, which can indicate to the user that the user interface is not frozen. As will be described in more detail below, such as with reference to FIG. 6G, in some embodiments, in response to receiving an indication from the second electronic device 500*b* that the criteria indicated by legends 620*a-d* have been satisfied, the animated particles 622 move towards indication 618.

FIG. 6F illustrates an example of the second electronic device 500*b* being placed proximate to display generation component 504*a*. For example, the second electronic device 500*b* is positioned so the front side (e.g., a side with display generation component 504*b* and one or more image sensors (e.g., one or more cameras and/or color temperature sensor 670)) faces the display generation component 504*a*.

As indicated by legend 620*a*, the distance between the second electronic device 500*b* and the display generation component 504*a* can satisfy a distance-based criterion. As indicated by legend 620*c*, a criterion that is satisfied when the correct side of the electronic device 500*b* is facing the display generation component 504*a* can also be satisfied. In some embodiments, in response to detecting that the criteria indicated by legends 620*a* and 620*c* are satisfied, the second electronic device 500*b* ceases displaying an image via display generation component 504*b*. In some embodiments, ceasing displaying an image via display generation component 504*b* can enable the second electronic device 500*b* to sense images displayed via display generation component 504*a* (e.g., using one or more image sensors, such as camera(s) and color temperature sensor 670) without interference from the display generation component 504*b*. In some embodiments, in response to detecting that the criteria indicated by legends 620*a* and 620*c* are satisfied, the second electronic device 500*b* generates a tactile response.

FIG. 6F illustrates that the criterions indicated by legends 620*b* and 620*d* are not satisfied. In some embodiments, one or more of these criteria are satisfied while the second electronic device 500*b* transitions from displaying an image via display generation component 504*b* to no longer displaying an image via the display generation component 504*b*. While at least one criterion indicated by legends 620*a-d* is not satisfied, the first electronic device 500*a* may continue to display the user interface described above with reference to FIG. 6E. In some embodiments, animated particles 622 can move while this user interface is being displayed.

In FIG. 6G, in some embodiments, the criteria indicated by legends 620a-d are all satisfied (e.g., because a user has properly placed/oriented device 500b with respect to display generation component 504a). In some embodiments, the second electronic device 500b detects, via the one or more sensors described above, that the criteria are satisfied and transmits an indication to the first electronic device 500a that the criteria are satisfied. In some embodiments, the first electronic device 500a determines whether one or more of the criteria represented by legends 620a-d are satisfied, such as by detecting the position of the second electronic device 500b with one or more sensors of the first electronic device 500a. In response to the indication that the criteria are all satisfied, the first electronic device 500a optionally updates the user interface displayed on display generation component 504a to display the animated particles 622 proximate to and surrounding (or internal to) the indication 618 of the desired placement of the second electronic device 500b (e.g., particles 622 are animated to move from their current positions in the user interface to locations proximate to and surrounding the indication 618), and displays a message 662 instructing the user to continue holding the second electronic device 500b in place for the calibration to proceed. In some embodiments, the animated particles 621 illustrated in FIG. 6E that are internal to indication 618 can continue to be displayed in an animated or stationary manner or can cease to be displayed in response to an indication from the second electronic device 500b that the calibration criteria represented by legends 620a-d have been satisfied. In some embodiments, the second electronic device 500b continues to forgo displaying an image via display generation component 504b and generates a tactile response in response to all of the criteria being satisfied.

In response to the indication that all of the criteria are satisfied, the second electronic device 500b optionally proceeds to display one or more images via display generation component 504a (e.g., the images at least partially located within the area of indication 618, and in some embodiments only within indication 618 and not outside of indication 618). Exemplary images are illustrated in FIGS. 6H-6L. Although FIGS. 6H-6L do not illustrate the placement of second electronic device 500b, it should be understood that the second electronic device 500b remains positioned as illustrated in FIG. 6G while the images illustrated in FIGS. 6H-6L are displayed. The placement of second electronic device 500b is omitted from FIGS. 6H-6L to clearly illustrate the images displayed via display generation component 504a.

As shown in FIGS. 6H-6L, the first electronic device 500a can display a (e.g., sequential) series of images 624a-e at the location of indication 618. In some embodiments, each image 624a-e is a solid color (or other distinguishing feature e.g., pattern or animation) in the shape of or at least partially overlapping indication 618. In some embodiments, the images 624a-e are displayed at a predetermined size (e.g., a predetermined percentage of display generation component 504a area, such as 6%, 7%, 8%, 9%, 10%, 12%, or 25%). In some embodiments, limiting the size of the images 624a-e can ensure that the power consumption and/or output of the display generation component 504a remain constant while all images 624a-e are displayed. As an example, the first electronic device 500a displays a red image, a green image, a blue image, and two white images. While displaying the images 624a-e, the first electronic device 500a optionally displays a message 662 instructing the user to continue holding the second electronic device 500a at the location illustrated in FIG. 6G. In some embodiments, while the images 624a-e are displayed via display generation component 504a, the second electronic device 500b senses the colors of the images using an image sensor, such as one or more of a camera and/or color temperature sensor 670 described above.

In some embodiments, the second electronic device 500b transmits calibration data (and/or sensed color data) to the first electronic device 500a after detecting the colors of images 624a-e. The calibration data can include one or more of the colors detected by the second electronic device 500b, calibration values for the first electronic device 500a to apply to its output or to send to the display generation component 504a to be applied to the display generation component 504a, or other data communicating one or more of the colors sensed by the second electronic device 500b or how the output of display generation component 504a should be calibrated.

FIG. 6M illustrates exemplary user interfaces displayed by the electronic devices 500a and 500b after the calibration data has been collected and/or the calibration has been successfully completed. In some embodiments, the first electronic device 500a concurrently displays a message 626 indicating that the color calibration was successful, an example image 628a illustrating the color settings prior to calibration, an example image 628b illustrating the calibrated color settings, an option 627a to undo the calibration, and an option 627b to save the calibrated color settings. Thus, in some embodiments, the colors output by display generation component 504a are adjusted in accordance with the color information collected by the second electronic device 500b during the color calibration process. In some embodiments, the colors output by the display generation component 504a are adjusted by adjusting the video signals output by the first electronic device 500a. In some embodiments, the colors output by the display generation component 504a are adjusted by adjusting the display generation component's 504a response to video signals output by the first electronic device 500a. Images 628a and 628b can be the same image presented using different color settings. For example, image 628a can be displayed using the color settings in place before the calibration and image 628b can be displayed using the calibrated color settings. In some embodiments, images 628a and 628b are displayed one at a time. For example, the first electronic device 500a displays an animation that alternates between image 628a and image 628b. Displaying images 628a and 628b can help the user decide whether or not to accept the calibrated settings. The second electronic device 500b can display a message indicating that the calibration was successful and an option 629 to dismiss the message that the calibration was successful. In some embodiments, after completing the color calibration process, the first electronic device 500a can adjust the video signals output to display generation component 504a or instruct display generation component 504a to adjust the way it responds to video signals to move the white point of the colors output by display generation component 504a to correspond to the colors determined by the color calibration process. For example, if the color calibration process revealed that the current white point of the display generation component 504a is overly blue (e.g., or red or green), the second electronic device 500a adjusts its video signals to reduce the magnitude of blue (or red or green) being sent to display generation component 504a or instructs the display generation component 504a to reduce the level of blue (e.g., or red or green) light output in response to receiving video signals.

As described, FIGS. 6A-6M illustrate exemplary ways in which the first electronic device 500a and the second electronic device 500b perform a color calibration process in accordance with some embodiments.

In some embodiments, one or more errors can occur during the calibration process described above with reference to FIGS. 6A-6M. Examples of these errors and example responses of electronic devices 500a and 500b to these errors are illustrated in FIGS. 6N-6Y. In some embodiments, one or more of these errors can occur while performing audio-visual synchronization, or simultaneously performing audio-visual synchronization and color calibration in accordance with some embodiments.

In some embodiments, the first and second electronic devices 500a and 500b can fail to pair, as will be described with reference to FIGS. 6N-6O. FIG. 6N illustrates the exemplary user interface presented by the first electronic device 500a described above with reference to FIG. 6D. Unlike FIG. 6D, in FIG. 6N, the second electronic device 500b optionally does not present the indication to pair the two electronic devices 500a and 500b if the first electronic device 500a is unable to communicate with the second electronic device 500b. FIG. 6N includes an exemplary indication, e.g., indication 630a, of the time that has passed since the first electronic device 500a attempted to initiate the pairing process with the second electronic device 500b. In some embodiments, in the example of FIG. 6N, the time that has passed since the first electronic device 500a initiated the pairing process, as indicated by indicator 630a, is less than a predetermined time threshold 632 (e.g., 5 seconds, 10 seconds, 15 seconds, 30 seconds, etc.).

As shown in FIG. 6O, in some embodiments, once the time since the first electronic device 500a initiated the pairing process has exceeded the predetermined time threshold 632 (e.g., as indicated by 630b), the first electronic device 500a displays a message 633 indicating that the pairing was unsuccessful (e.g., because the first electronic device 500a was not able to communicate with the second electronic device 500b). The first electronic device 500a can also display an option to try the pairing process again, e.g., option 664, and an option to cancel the calibration, e.g., option 665. In some embodiments, a similar error message can be displayed if the pairing is unsuccessful for a different reason. For example, a similar error message can be displayed if the first electronic device 500a is able to communicate with the second electronic device 500b, but the first electronic device 500a does not receive a pairing indication from the second electronic device 500b (e.g., within a time threshold, such as 5 seconds, 10 seconds, 15 seconds). The first electronic device 500a may not receive a pairing indication from the second electronic device 500b because the second electronic device 500b may be unable to transmit the pairing indication, the connection between the first and second electronic devices 500a and 500b is poor or ceases to be connected, or because the user using device 500b does not select the option (e.g., option 612a illustrated in FIG. 6D) to pair the devices. In some implementations, after successfully pairing the two electronic devices as described above with reference to FIG. 6D, during the calibration process, the devices, e.g., 500a and 500b, may lose connection with each other. If connection is lost during calibration, an error message, e.g., error message 648 illustrated in FIG. 6X, may be displayed and the calibration process may either be restarted or resumed from the step on which connection was lost once the devices are paired again, as will be described in more detail below with reference to FIG. 6X.

In some embodiments, the user may have difficulty placing the second electronic device 500b in the correct position and/or orientation for the calibration process, which can result in the placement criteria for the calibration not being satisfied. FIGS. 6P-6W illustrate examples of the position of the second electronic device 500b not satisfying the plurality of placement criteria for the calibration.

FIG. 6P illustrates an example where the (x, y) position of the second electronic device 500b does not satisfy a criterion. The criteria associated with legends 620a, 620c, and 620d can be satisfied, while the (x, y) position criterion is not satisfied as shown by legend 620b. FIG. 6P includes an indication of the time 630c that has passed since the first electronic device 500a began displaying the user interface directing placement of the second electronic device for the calibration process. For example, the time 630c is less than a first predetermined threshold 634 (e.g., 5 seconds, 10 seconds, 15 seconds, 30 seconds, etc.). In some embodiments, while the first electronic device 500a displays the user interface illustrated in FIG. 6P and the criterion represented by legend 620b is not satisfied, and the criteria represented by legends 620a, 620c, and 620d are satisfied, the second electronic device 500b may be positioned against the display generation component 504a but not aligned with indication 618, such as being positioned in the way illustrated in FIG. 6T.

In some embodiments, if the predetermined time has passed since the first electronic device 500a began displaying the user interface directing placement of the second electronic device 500b for the calibration process and the (x, y) position criterion has not been satisfied, the first electronic device 500a updates the user interface to move and/or enlarge the indication of a location at which the second electronic device 500b is to be placed. In some embodiments, the first electronic device 500a only moves/enlarges indication 618 if the distance-based criteria represented by legend 620a, the criterion represented by legend 620c that is satisfied when the correct side of the second electronic device 500b is facing display generation component 504a, and the vertical angle criterion represented by legend 620d are all satisfied. FIG. 6Q illustrates an example of the user interface on display generation component 504a directing placement of the second electronic device 500b for calibration after the first electronic device 500a has updated the user interface to move and/or enlarge indication 636. Although FIG. 6Q illustrates indication 636 as being moved and enlarged relative to indication 618 illustrated, for example, in FIG. 6P, in some embodiments, the first electronic device 500a enlarges the indication 636 rather than moves the indication 636, and/or does both.

In some embodiments, moving and/or enlarging indication 636 can make it easier for the user to reach indication 636 to place the second electronic device 500b over the indication 636, such as in situations where the display generation component 504a is in a hard-to-reach place, such as mounted high up on a wall. In some embodiments, enlarging the indication 636 can be necessary for the indication 636 to be large enough for the calibration to be completed. In some embodiments, the initial size of indication 618 (e.g., indication 618 illustrated in FIG. 6P) can be a predetermined percentage (e.g., 6 or 7 or 8 or 9 or 10 or 11 or 12 percent) of the total display area of display generation component 504a. Therefore, if the display generation component 504a is a size that is too small for the predetermined area percentage to be large enough to perform the calibration, the size of the indication 636 can be increased, as shown in FIG. 6Q, to perform the calibration. In some embodiments, while performing the calibration, the first electronic device 500*a* displays a series of images 624*a-e* at the size and location of indication 618 (as described above with reference to FIGS. 6H-6L). Thus, the size and location of indication 618 may need to be sufficient to enable the second electronic device 500*b* to capture an accurate color measurement of the images 624*a-e* in order for the color calibration to be successful. In some embodiments, the position of the second electronic device 500*b* may be close to satisfying the (x, y) criterion, and moving and/or increasing the size of the indication 618 can cause the criterion to be satisfied.

In some embodiments, if the one or more criteria are not satisfied after a second threshold time has passed since the first electronic device 500*a* began displaying the user interface directing placement of the second electronic device 500*b* for performing the calibration, the first electronic device 500*a* displays an error message, such as exemplary error message 640 illustrated in FIG. 6R. In some embodiments, the second time threshold 638 (e.g., 30 seconds, 45 seconds, 1 minute, 2 minutes) is after the first time threshold 634 (e.g., 5 seconds, 10 seconds, 15 seconds, 30 seconds, etc.) described above with reference to FIG. 6Q. Although FIG. 6R illustrates the criteria indicated by legends 620*a*, 620*c*, and 620*d* as being satisfied and the criterion indicated by legend 620*b* as not being satisfied, the first electronic device 500*a* may display the user interface illustrated in FIG. 6R in response to one or more of any of the criteria illustrated in the legends 620*a-d* not being satisfied. In some embodiments, the first electronic device 500*a* determines which criteria are satisfied and which criteria are not satisfied based on receiving information from the second electronic device 500*b* about which criteria are satisfied or not satisfied. The exemplary user interface illustrated in FIG. 6R includes a message 640 that the calibration cannot be started because the position of the second electronic device 500*b* does not satisfy the one or more criteria and an option 642 to try the calibration again. In some embodiments, the second electronic device 500*b* also displays a message 644 that the calibration could not be presented, an option 646*a* to try the calibration again, and an option 646*b* to cancel the calibration. In some embodiments, in response to detecting selection of option 642 or option 646*a*, the electronic devices 500*a* and 500*b* display the user interfaces illustrated in FIG. 6P.

In some embodiments, the second electronic device 500*b* generates one or more tactile indications to direct placement of the second electronic device 500*b* for the calibration, as will be shown in FIGS. 6S-6W. As described above with reference to FIG. 6G and as shown again in FIG. 6S, in response to determining that all of the criteria indicated by legends 620*a-d* are satisfied, the second electronic device 500*b* optionally produces a tactile indication.

FIG. 6T illustrates an example of the behavior of the first and second electronic devices 500*a* and 500*b* in response to the position of the second electronic device 500*b* changing from satisfying the one or more criteria to not satisfying the (x, y) position criterion represented by legend 620*b* (e.g., after the calibration process was initiated, but before it was completed). The first electronic device 500*a* optionally updates the user interface to move the animated particles 622 away from indication 618 and re-displays message 616 directing placement of the second electronic device 500*b* for the calibration. The second electronic device 500*b* optionally generates a tactile response that is different from the tactile response illustrated in FIG. 6S. For example, the tactile responses illustrated in FIGS. 6S and 6T can have different frequencies, intensities, burst patterns, durations, or other differences. In some embodiments, the tactile response illustrated in FIG. 6T can be a directional tactile response. For example, because the second electronic device 500*b* is to the right of the correct position for the calibration process, the second electronic device 500*b* optionally produces the tactile response on the left side of the second electronic device 500*b* (e.g., to direct the user to move device 500*b* leftward, back towards indication 618). Likewise, if the electronic device 500*b* were positioned to the left of the correct position for the calibration process, the electronic device 500*b* could produce a tactile response on the right side of the device 500*b* (e.g., to direct the user to move device 500*b* rightward, back towards indication 618).

In some embodiments, the second electronic device 500*b* generates tactile outputs that change (e.g., in one or more characteristics) to indicate the degree to which the second electronic device 500*b* does not satisfy one of the criteria. For example, as described with reference to FIGS. 6U-6W, the electronic device 500*b* produces a tactile output that changes (e.g., the intensity, frequency, burst pattern, or other characteristic changes) the further the electronic device 500*b* gets from satisfying the distance-based criterion represented by legend 620*a*.

For example, in FIG. 6U, the distance-based criterion indicated by legend 620*a* is satisfied (as are the other criteria indicated by legends 620*b-d*). In response to determining that the distance-based criterion is satisfied, the second electronic device 500*b* generates a tactile output.

FIG. 6V illustrates an example of the second electronic device 500*b* moving a distance away from the display generation component 504*a* such that the distance-based criterion indicated by legend 620*a* is no longer satisfied. In some embodiments, in response to detecting movement of the second electronic device 500*b* away from the distance at which the distance-based criterion is satisfied, the second electronic device 500*b* generates a tactile output that is different from the tactile output illustrated in FIG. 6U. In some embodiments, one or more of the intensity, frequency, burst pattern, or another characteristic changes in response to the movement of the second electronic device 500*b* from the position illustrated in FIG. 6U to the position illustrated in FIG. 6V. For example, while at the position illustrated in FIG. 6U, the second electronic device 500*b* generates a tactile output with a first intensity and while at the position illustrated in FIG. 6V, the electronic device 500*b* generates a tactile output with a second intensity lower than the first intensity. As another example, the electronic device 500*b* generates a discrete tactile output in FIG. 6U and generates a haptic pulse in FIG. 6V with a period between pulses that changes as the distance between the second electronic device 500*b* and the display generation component 504*a* changes.

FIG. 6W illustrates an example of the second electronic device 500*b* moving further away from the display generation component 504*a* than the distance between the second electronic device 500*b* and the display generation component 504*a* in FIG. 6V. The distance-based criterion represented by legend 620*a* is still not satisfied and the distance between the second electronic device 500*b* and the display generation component 504*a* can be greater in FIG. 6W than it was in FIG. 6V. In some embodiments, in response to the increase in distance between the second electronic device 500*b* and the display generation component 504*a*, the second electronic device 500*b* can generate a tactile output different from the tactile output generated in FIG. 6V. In some embodiments, one or more of the intensity, frequency, burst pattern, or another characteristic changes in response to the movement of the second electronic device 500b from the position illustrated in FIG. 6V to the position illustrated in FIG. 6W. For example, while at the position illustrated in FIG. 6V, the second electronic device 500b generates a tactile output with a first intensity and while at the position illustrated in FIG. 6W, the electronic device 500b generates a tactile output with a second intensity lower than the first intensity. As another example, the electronic device 500b generates a discrete tactile output in FIG. 6U and generates a haptic pulse in FIGS. 6V and 6W with a period between pulses that changes as the distance between the second electronic device 500b and the display generation component 504a changes. For example, the period between haptic pulses in FIG. 6V is different from the period between haptic pulses in FIG. 6W. In some embodiments, the second electronic device 500b is able to present tactile outputs similar to the tactile outputs illustrated in FIGS. 6U-6W in response to determining that the position of the second electronic device 500b moves further away from a position that satisfies one or more of the other criteria represented by legends 620b-d.

In some embodiments, if the connection between the first and second electronic devices 500a and 500b fails at any point during the calibration process, one or both of the electronic devices 500a and 500b displays an error message. Example error messages are illustrated in FIG. 6X. The first electronic device 500a optionally displays error message 648 and an option 650 to try to calibration again. In some embodiments, in response to detecting selection of option 650, the electronic devices 500a and 500b can display the user interfaces illustrated in FIG. 6P. The second electronic device 500b displays error message 652, an option 654a to try the calibration again, and an option 654b to cancel. In some embodiments, in response to detecting selection of option 654a, the electronic devices 500a and 500b can display the user interfaces illustrated in FIG. 6P. In some embodiments, the first electronic device 500a also displays an option to cancel the calibration process and/or in response to detecting the user pressing the "Menu" button or the home button next to the "Menu" button on the remote 510, the electronic device 500a exits the calibration user interface.

In some embodiments, successful calibration of the output of the display generation component 504a is not possible. For example, the color output of the display generation component 504a may be so far from the target calibrated values that it may not be possible to properly calibrate the output of the display generation component 504a. as described above, in some embodiments, the calibration can attempt to move the white point of the colors output by display generation component 504a to a predetermined white point or within a predetermined threshold of the predetermined white point. In some situations, after performing the calibration, the white point may still not be within the predetermined threshold of the predetermined white point and, therefore, calibration may be unsuccessful. In some embodiments, when the output of the display generation component 504a cannot be successfully calibrated, one or more of the first and second electronic devices 500a and 500b can display an error message.

FIG. 6Y illustrates exemplary error messages that can be displayed when successful calibration of the display generation component 504a output is not possible. In some embodiments, the user interfaces illustrated in FIG. 6Y are displayed after undergoing the process described above with reference to FIGS. 6E-6L and the user interfaces illustrated in FIG. 6Y are displayed instead of the user interfaces illustrated in FIG. 6M. The first electronic device 500a can display error message 656 and an option 666 to exit the calibration user interface. The second electronic device 500b can display error message 653 and an option 655 to cease display of the error message 653. In some embodiments, the error messages 656 and 653 can make the use aware of a possible setting of the display generation component 504a that the user may be able to use to complete a successful calibration.

Therefore, FIGS. 6N-6Y illustrate examples of errors that can occur during calibration and/or synchronization and exemplary responses of electronic devices 500a and 500b to the errors. Although the errors illustrated in FIGS. 6N-6Y are described above as occurring during the color calibration described with reference to FIGS. 6E-6M, in some embodiments, one or more of the errors described with reference to FIGS. 6N-6Y can occur while performing the audio-video synchronization described below with reference to FIGS. 6Z-6BB or while simultaneously performing the color calibration and audio-video synchronization described below with reference to FIGS. 6CC-6JJ.

In some embodiments, the first and second electronic devices 500a and 500b can perform a synchronization process of the audio and video output by the first electronic device 500a, including synchronization of one or more speakers in communication with the first electronic device 500a. In some embodiments, the first electronic device 500a is in communication with speakers (e.g., 500c and 500d in FIGS. 6Z-6JJ). In some embodiments, the connections between the first electronic device 500a and speakers 500c and 500d is a wireless connection or a wired connection. In some embodiments, one or more of the speakers 500c and 500d are integrated with electronic device 500a or display generation component 504a. Although FIGS. 6Z-6JJ illustrate electronic device 500a as being in communication with two speakers, in some embodiments, electronic device 500a is in communication with a different number of speakers, such as one speaker or more than two speakers. In some embodiments, first electronic device 500a is in communication with one speaker and the first and second electronic devices 500a and 500b can synchronize the audio output to that speaker and the video output by the first electronic device 500a (e.g., via display generation component 504a). FIGS. 6Z-6BB illustrate an exemplary audio-video synchronization process performed by the first and second electronic devices 500a and 500b.

In FIG. 6Z, the first electronic device 500a displays the video and audio settings user interface described above with reference to FIG. 6C. While the first electronic device 500a displays the user interface illustrated in FIG. 6Z, the first electronic device 500a is connected to speakers 500c and 500d. Instead of selecting the option 606g to perform the color calibration, the user selects (e.g., with contact 603z) the option 606h to perform the audio-video synchronization. In response to the user's selection in FIG. 6Z, the electronic devices 500a and 500b can perform the pairing process described above with reference to FIG. 6D.

In some embodiments, after the first and second electronic devices 500a and 500b have been paired, the synchronization process can proceed. FIG. 6AA illustrates an example of the synchronization process. As shown in FIG. 6AA, the first electronic device 500a can display instructions 658 directing the user to capture image 624a displayed via display generation component 504a using a camera of the second electronic device 500a. In some embodiments, in accordance with a determination that the position of the second electronic device 500a is correct, such as in accordance with a determination that the second electronic device 500b is capturing an image of the display generation component 504a, the first electronic device 500a optionally generates one or more images(s) and sounds. In some embodiments, the camera of the second electronic device 500b that is used in FIG. 6AA may be the same as the camera used in FIGS. 6E-6L or may be a different camera. For example, the first electronic device 500a generates image 624a which can be one of the images used for the color calibration process described above with reference to FIGS. 6E-6M (though need not be) and generates one or more sounds to be played by speakers 500c and 500b in communication with the first electronic device 500a.

In some embodiments, the image 624a and the sounds are provided to the display generation component 504a and speakers 500c and 500d, respectively, with known timing. For example, image 624a is optionally displayed at the same time as sound is provided to one or more of speakers 500c and 500d. The second electronic device 500b can detect the image 624a displayed via display generation component 504a with a camera of the electronic device 500b and can detect the sounds generated by speakers 500c and/or 500d with one or more microphones. In some embodiments, the second electronic device 500b transmits synchronization information to the first electronic device 500a, such as indications of the time delay between detection of each of the image and the sounds or the way in which the audio and/or video signals should be advanced or delayed in order to synchronize the audio and video signals (if the second electronic device 500b has access to the timing with which the audio and video signals were sent by the first electronic device 500a).

In some embodiments, after the audio-video synchronization has been performed, one or more of the first and second electronic devices 500a and 500b can display a message indicating that the synchronization was successful. In some embodiments, after performing the audio-video synchronization, the first electronic device 500a adjusts the timing with which it provides audio signals to speakers 500c and 500d and video signals to display generation component 504a. For example, if the synchronization process reveals that the video was detected 100 ms earlier than the audio signals, the first electronic device 500a would adjust the timing with which audio and video signals were output to provide video signals 100 ms later to synchronize the video and audio. As another example, if speaker 500c (or 500d) has a delay of 200 ms compared to the other speaker 500d (or 500c), the electronic device 500a can adjust the audio output signals to provide signals to speaker 500c (or 500d) 200 ms before providing the same audio to speaker 500d (or 500c). FIG. 6BB illustrates exemplary messages displayed by the first and second electronic devices 500a and 500b after the audio-video synchronization is complete. For example, the first electronic device 500a displays message 660 and an option 668 to exit the synchronization user interface. The second electronic device 500b can display message 661 and option 669 to cease displaying message 661. In some embodiments, in response to detecting selection of option 668, the first electronic device 500a saves the synchronization results and uses the newly adjusted synchronized timing when providing audio and video outputs in the future.

Thus, FIGS. 6Z-6BB illustrate an exemplary audio-video synchronization process performed by the first and second electronic devices 500a and 500b.

In some embodiments, the electronic devices 500a and 500b can perform the color calibration procedure described above with reference to FIGS. 6E-6M and the audio-video synchronization described above with reference to FIGS. 6Z-6BB simultaneously (e.g., by sharing at least one aspect of the generated images and/or sounds for use in both color calibration and audio-video synchronization). FIGS. 6CC-6JJ illustrate exemplary ways the first electronic device 500a and the second electronic device 500b perform the color calibration and audio-video synchronization simultaneously.

FIG. 6CC illustrates the settings user interface described above with reference to FIGS. 6C and 6Z. While the first electronic device 500a displays the user interface illustrated in FIG. 6CC, the first electronic device 500a is connected to one or more speakers 500c and 500d. In the example illustrated in FIG. 6CC, the user selects (e.g., with contact 603cc) the option 606e to simultaneously perform the color calibration and the audio-video synchronization.

In some embodiments, in response to the user's selection in FIG. 6CC, the first and second electronic devices 500a and 500b undergo a pairing operation similar to the pairing operation described above with reference to FIG. 6D. In some embodiments, after the pairing operation is successful, the electronic devices 500a and 500b begin the calibration and synchronization operations, as shown in FIG. 6DD. FIG. 6DD illustrates exemplary user interfaces presented by the first electronic device 500a and the second electronic device 500b after pairing the devices 500a and 500b and before the first electronic device 500a provides audio and video outputs for the synchronization and calibration.

The user interfaces illustrated in FIG. 6DD can be similar to the user interfaces described above with reference to FIG. 6E. While performing the audio-video synchronization and the color calibration simultaneously, the position of the second electronic device can be evaluated using the criteria represented by legends 620a-d described above with reference to FIGS. 6E-6M. In the example of FIG. 6DD, the criteria indicated by legends 620a-d are not satisfied. While the criteria are not satisfied, the first electronic device 500a can continue displaying the user interface directing placement of the second electronic device 500b for the calibration and synchronization.

FIG. 6EE illustrates an example of the second electronic device 500b being placed in a way the satisfies the criteria represented by legends 620a-d. The first and second electronic devices can respond in a manner similar to the manner described above with reference to FIG. 6G.

FIGS. 6FF-6JJ illustrate an exemplary color calibration and synchronization process performed by the first electronic device 500a and second electronic device 500b. In some embodiments, in response to the proper placement shown in FIG. 6EE, the electronic device 500a displays the same images displayed during the color calibration process previously described, such as the images described above with reference to FIGS. 6H-6L. Although FIGS. 6FF-6JJ do not illustrate the placement of the second electronic device 500b relative to display generation component 504a, it should be understood that the second electronic device 500b can remain positioned as illustrated in FIG. 6EE while images 624a-625e are displayed by the first electronic device 500a via display generation component 504a.

As shown in FIGS. 6FF-6JJ, while presenting the images 624a-624e, the second electronic device 500a optionally outputs sound to one or more speakers 500c and 500d. Although both speakers 500c and 500d are illustrated as generating sound while all of the images 624a-e are displayed, it should be understood that the audio can be generated at any point before, after, or while images 624a-e are displayed. In some embodiments, speakers 500c and 500d sound at different times with a known delay. Causing the speakers 500c and 500d to generate sound at different times can make it easier for the electronic devices 500a and 500b to distinguish which speaker is generating the received sound (e.g., based on the known relative timing of the audio signal being provided to speaker 500c and the audio signal being provided to speaker 500d).

In some embodiments, during the combined audio synchronization and color calibration process, the first electronic device 500a causes the speakers 500c and 500b to play sounds (e.g., either simultaneously or at different times) with known timing relative to the timing at which one or more of images 624a-e are displayed. For example, the first electronic device 500a plays a sound via speaker 500c at the same time as initiating display of image 624a illustrated in FIG. 6FF and plays a sound via speaker 500d at the same time as initiating display of image 624b in FIG. 6GG. In some embodiments, the second electronic device 500b can sense the timing with which the sounds and images are detected, enabling the first and/or second electronic device 500a or 500b to determine delays in audio and video timing to synchronize the audio and video timing as described above with reference to FIGS. 6Z-6BB.

In some embodiments, during the combined audio synchronization and color calibration process, the first electronic device 500a displays the series of images 624a-624e described in more detail above with reference to FIGS. 6H-6L. In some embodiments, the second electronic device 500b can detect the colors of the images 624a-624e and transmit color calibration information to the second electronic device 500b to enable the second electronic device 500b to adjust the colors output by display generation component 504a as described above with reference to FIGS. 6E-6M.

Thus, as described above with reference to FIGS. 6FF-6JJ, the electronic devices 500a and 500b can perform a combined audio-video synchronization and color calibration process. Performing the audio-video synchronization and color calibration at the same time can leverage the images 624a-624e used for color calibration for use in the video synchronization process and save time by performing the processes together.

In some embodiments, once the audio-video synchronization and color calibration processes are complete, the electronic devices 500a and 500b present user interfaces similar to the user interfaces described above with reference to FIG. 6M and/or FIG. 6BB. After completing the combined color calibration and audio-video synchronization, the electronic device 500a can adjust the relative timing of the audio and video signals provided to speakers 500c and 500d and display generation component 504a and adjust the video signal provided to display generation component 504a or instruct display generation component 504a to adjust its color outputs in accordance with the synchronization and calibration results.

Figure 7:
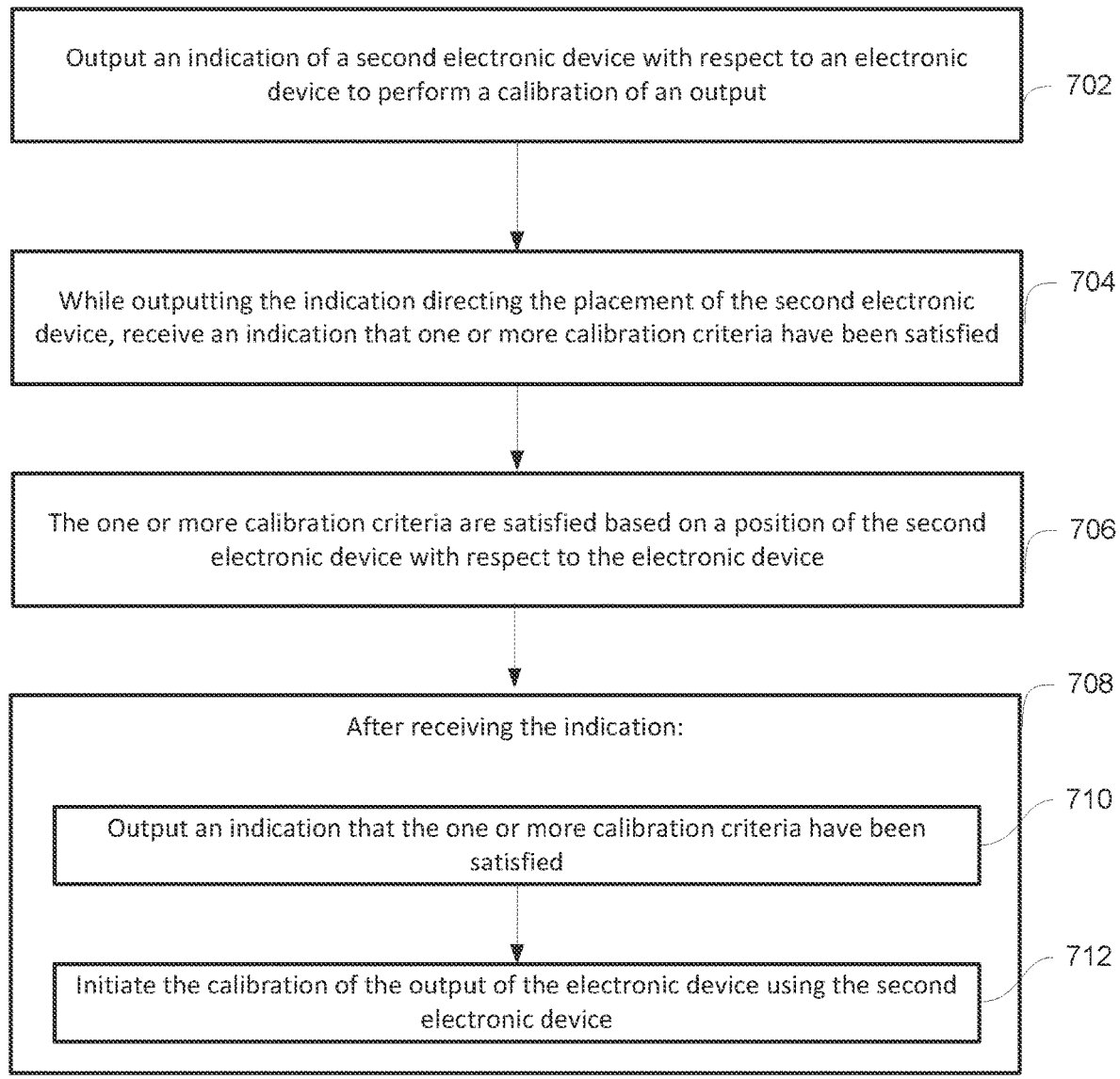
FIG. 7 is a flow diagram illustrating a method of displaying a user interface with a first electronic device directing placement of a second electronic device to calibrate and/or synchronize the output(s) of one or more third electronic devices or the first electronic device in accordance with some embodiments of the disclosure.

FIG. 7 is a flow diagram illustrating a method of displaying a user interface with a first electronic 500a device directing placement of a second electronic device 500b to calibrate and/or synchronize the output(s) of one or more third electronic devices 504a, 500b, or 500c or the first electronic device 500a in accordance with some embodiments of the disclosure. The method 700 is optionally performed at an electronic device such as device 100, device 300, device 500, device 510, and device 511 as described above with reference to FIGS. 1A-1B, 2-3, 4A-4B and 5A-5C. Some operations in method 700 are, optionally, combined and/or order of some operations is, optionally, changed.

As described below, the method 700 provides ways to present indications direction placement of another electronic device to perform a calibration or synchronization process. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

Method 700 is optionally performed at a first electronic device 500a in communication with a display generation component 504a, such as in FIG. 6A (e.g., a mobile device (e.g., a tablet, a smartphone, a media player), a computer (e.g., a desktop computer, a laptop computer), a wearable device (e.g., a watch, a head-mounted device), or a set-top box in communication with a remote control and a display generation component (e.g., a television or other display). In some embodiments, the display generation component is a display integrated with the electronic device (optionally a touch screen display) and/or an external display such as a monitor, projector, television, etc. In some embodiments, the first electronic device is in communication with one or more input devices.

The electronic device 500a optionally outputs 702 an indication 618, such as in FIG. 6E (e.g., displaying, via the display generation component, a user interface including a visual indication and/or outputting, via an audio device, an aural indication) directing placement (e.g., location and/or orientation) of a second electronic device 500b with respect to an electronic device (e.g., the display generation component or the first electronic device) to perform a calibration of an output (e.g., a human-perceivable output, such as visual or aural). In some embodiments, the calibration is a calibration of an output of the display generation component. In some embodiments, the first electronic device displays a user interface directing placement of the second electronic device to perform a color calibration of the output of the display generation component. The calibration process optionally calibrates a video signal transmitted by the first electronic device to the display generation component or calibrates the display generation component's output in response to a video signal from the first electronic device. The user interface optionally includes a visual indication of a location at which the second electronic device is to be placed for the calibration procedure. For example, a set-top box causes a television screen to display a rectangle on which a smartphone is to be placed to calibrate the color output of the television screen. In some embodiments, the user interface including the visual indication directing placement of the second electronic device with respect to the display generation component is displayed in response to selecting a calibration procedure option in a settings user interface displayed by the first electronic device via the display generation component.

In some embodiments, such as in FIG. 6G, while outputting the indication 618 (e.g., displaying the user interface with the visual indication and/or presenting an audio indication) directing the placement of the second electronic device 500b, the first electronic device 500a receives (704) (e.g., from the second electronic device) an indication that one or more calibration criteria (e.g., represented in legends 620a-620d) have been satisfied, wherein the one or more calibration criteria are satisfied based on a position of the second electronic device 500b with respect to the electronic device 504a. In some embodiments, the one or more calibration criteria are satisfied based on the position of the second electronic device with respect to the display generation component. In some embodiments, the second electronic device determines, using one or more sensors in communication with the second electronic device, that the second electronic device is in the correct position to perform the calibration process. For example, a smartphone detects that it is positioned approximately parallel to the display generation component (e.g., a televisions screen) at a location indicated on the television screen, at a distance from the display generation component less than a threshold distance (e.g., lcm, 0.5 cm, etc.) and transmits an indication of its position and/or an indication that its calibration position has been reached to the first electronic device (e.g., a set-top box) that controls the displayed image on the display generation component (e.g., television screen).

In some embodiments, such as in FIG. 6G, after receiving the indication (e.g., one or more UI screens might be displayed before initiating the calibration) (708), the first electronic device 500a outputs (710) an indication 662 (e.g., updating the user interface to include a visual indication and/or presenting an audio indication) that the one or more calibration criteria have been satisfied. For example, prior to receiving the indication, the user interface includes an animation of a plurality of particles moving around the user interface and, in response to receiving the indication, the particles move towards the visual indication of the placement of the second electronic device. In some embodiments, the visual indication also includes text indicating that the placement of the second electronic device is correct.

In some embodiments, after receiving the indication (e.g., one or more UI screens might be displayed before initiating the calibration) (708), the first electronic device 500a initiates (712) the calibration of the output of the electronic device 504a (e.g., the display generation component or the first electronic device) using the second electronic device 500b, such as in FIG. 6H. The first electronic device optionally initiates the calibration process. For example, a set top box causes a television screen to display a series of images that a smartphone is able to detect using an image sensor as part of performing a color calibration process for the output of the television screen when the set top box is controlling the output of the television screen.

The above-described manner of displaying the visual indication directing placement of the second electronic device for performing a calibration of an output of the display generation component and, in response to the indication that the position of the second electronic device satisfies the calibration criteria, initiating the calibration procedure enables the electronic device to efficiently guide the user through performance of a calibration procedure, which simplifies the interaction between the user and the electronic device and enhances the operability of the electronic device and makes the user-device interface more efficient (e.g., by reducing the inputs needed to perform the calibration procedure and reducing the number of times the calibration needs to be performed to be successful), which additionally reduces power usage and improves battery life of the electronic device by enabling the user to use the electronic device more quickly and efficiently.

In some embodiments, the result of the calibration is used to scale the video output provided by the first electronic device 500a to the display generation component 504b, such as in FIG. 6M. For example, a set top box adjusts the video data it transmits to a television screen in communication with the set top box (e.g., by shifting color levels, brightness, positions in the color space, etc.), resulting in adjusted color characteristics presented by the television screen when the television screen is displaying images provided by the set-top box. In some embodiments, the result of the calibration is used to adjust one or more output settings of the display generation component itself. For example, the result of the calibration is used to adjust the white balance or other color settings of a television screen to adjust the color characteristics presented by the television screen.

In some embodiments, such as in FIG. 6Q, while outputting the indication, in accordance with a determination that a predetermined time 634 (e.g., 2 or 3 or 4 seconds) has passed while outputting the indication 618 without receiving the indication that the one or more calibration criteria (e.g., represented by legends 620a-d) have been satisfied, the first electronic device 500a selectively adjusts a characteristic (e.g., a visual characteristic, such as size, location) (e.g., a TTL) of the indication 618. In some embodiments, the electronic device initially displays the indication at a predetermined size (e.g., 8% of the display area). In accordance with a determination that the predetermined time has passed since displaying the indication at the initial size, the electronic device optionally increases the size of the visual indication. In some embodiments, the size of the visual indication is increased without receiving a user input corresponding to a request to increase the size of the visual indication. In some embodiments, the electronic device initially displays the indication at a predetermined location. In accordance with the determination that the predetermined time has passed without the one or more calibration criteria having been met, the electronic device updates the location of the indication. For example, the electronic device displays the indication at a lower or different location of the display generation component.

The above-described manner of selectively adjusting the characteristic of the indication in accordance with the determination that the predetermined time has passed while outputting the indication without receiving the indication that the calibration criteria have been satisfied enables the electronic device to make it easier to satisfy the calibration criteria if the criteria have not been met in the predetermined time, which simplifies the interaction between the user and the electronic device and enhances the operability of the electronic device and makes the user-device interface more efficient (e.g., by reducing the time it takes to start the calibration process without increasing the number of user inputs needed to adjust the characteristic of the indication), which additionally reduces power usage and improves battery life of the electronic device by enabling the user to use the electronic device more quickly and efficiently.

In some embodiments, such as in FIG. 6E, the one or more calibration criteria (e.g., represented by legends 620a-d) include one or more second electronic device 500b placement criteria and one or more additional criteria. In some embodiments, the one or more second electronic device placement criteria include criteria that are satisfied when a distance between the second electronic device and the electronic device (e.g., the first electronic device and/or the display generation component) is within a threshold distance, the second electronic device is oriented upright relative to gravity, and the second electronic device has remained still (within a predetermined threshold of movement) and these placement criteria have been satisfied for at least a predetermined period of time (e.g., 2 or 3 or 4 seconds, etc.). In some embodiments, the one or more additional criteria include a criterion that is satisfied when the second electronic device (and/or a camera and/or an ambient light color/temperature sensor of the second electronic device) is overlaid on the indication. For example, the second electronic device detects that it is overlaid on the indication by detecting, with a camera and/or an ambient light color/temperature sensor in communication with or integrated into the second electronic device, the indication. In some embodiments, selectively adjusting the characteristic of the indication 618 includes, in accordance with a determination that the one or more second electronic device placement criteria are satisfied but the one or more additional criteria are not satisfied, adjusting the characteristic (e.g., size, location) of the indication 636 as shown in FIG. 6Q. In some embodiments, the second electronic device is positioned at a distance from the electronic device (e.g., the first electronic device and/or the display generation component) that is within a threshold distance, the second electronic device is oriented upright relative to gravity, and the second electronic device has remained still (within a predetermined threshold of movement) and these placement criteria have been satisfied for at least a predetermined period of time (e.g., 2 or 3 or 4 seconds, etc.) but the second electronic device is not positioned overlaid on the indication. In some embodiments, selectively adjusting the characteristic of the indication 618 includes, in accordance with a determination that the one or more second electronic device placement criteria are not satisfied, forgoing adjusting the characteristic of the indication 618 shown in FIG. 6E. In some embodiment, one or more of the distance between the second electronic device and the electronic device (e.g., the display generation component and/or first electronic device), the orientation of the second electronic device relative to gravity, and/or the stillness of the second electronic device fail to satisfy the one or more second electronic device placement criteria), In some embodiments, in accordance with the determination that the placement of the second electronic device fails to satisfy one or more of the second electronic device placement criteria, the first electronic device forgoes updating the indication. In some embodiments, if the placement of the second electronic device satisfies the second electronic device placement criteria but the location of the second electronic device relative to the indication is not correct, the first electronic device updates the size and/or location of the indication such that the indication might, after being modified, coincide with the camera and/or an ambient light color/temperature sensor of the second electronic device without requiring the user to move the second electronic device. In some embodiments, the indication directing placement of the second electronic device is a visual indication, and the method further includes, while outputting the indication directing the placement of the second electronic device, receiving a second indication that an orientation of the second electronic device satisfies one or more criteria and the placement of the electronic device does not satisfy the one or more calibration criteria. In some embodiments, in response to receiving the second indication, the first electronic device updates one or more of a size or a location of the indication.

The above-described manner of updating the characteristic of the indication in response to detecting that the one or more second electronic device placement criteria are satisfied and the one or more additional criteria are not satisfied and forgoing updating the characteristic of the indication if the one or more second electronic device placement criteria are not satisfied enables the electronic device to automatically make it easier for the user to place the second electronic device to satisfy the one or more additional criteria when it appears as though the user is attempting to place the second electronic device in a way that satisfies the criteria without updating the characteristic of the indication in situations where the user is still trying to satisfy the one or more second electronic device placement criteria, which simplifies the interaction between the user and the electronic device and enhances the operability of the electronic device and makes the user-device interface more efficient (e.g., by making the criteria easier to satisfy when needed and reducing visual clutter when the user does not need the characteristic of the indication to be updated in order to satisfy the criteria), which additionally reduces power usage and improves battery life of the electronic device by enabling the user to use the electronic device more quickly and efficiently.

In some embodiments, initiating the calibration causes the calibration process to be performed and calibration results to be obtained. In some embodiments, after initiating the calibration of the output of the electronic device 504a using the second electronic device 500b, in accordance with a determination that the calibration fails to satisfy one or more criteria (e.g., the calibrated output of the electronic device (e.g., the display generation component or the first electronic device) fails to satisfy one or more criteria), the first electronic device 500a outputs an indication 640 directing changing of an output mode of the electronic device 504a, such as in FIG. 6R. For example, in accordance with a determination that the calibrated output of a set-top box or television screen fails to produce a white point within a predetermined range (e.g., 5%, 10%, 15%) of a target white point, the set-top box generates an indication to change the output mode of the television. For example, the television has a plurality of possible output modes with different white points and color settings (e.g., a sports mode, a movie mode, a bright mode, an accurate mode, etc.). In some embodiments, if calibration is unsuccessful while the output mode of the electronic device is a first output mode, it is possible that calibration will be successful for a different output mode of the electronic device (e.g., television). In some embodiments, the first electronic device is able to perform the calibration process multiple times, thus enabling the user to change the output mode of the electronic device and attempt to perform the calibration again until calibration is successful.

In some embodiments, such as in FIG. 6M, in accordance with a determination that the calibration satisfies the one or more criteria (e.g., the calibrated output of the electronic device (e.g., the display generation component or the first electronic device) satisfies one or more criteria), the first electronic device 500a forgoes outputting the indication directing the changing of the output mode of the electronic device (e.g., the display generation component or the first electronic device). In some embodiments, if the calibration is successful, the first electronic device does not present the indication to change the output mode of the electronic device because the calibrated output with the current output mode selected already satisfies the one or more criteria. The above-described manner of presenting the indication to change the output mode of the electronic device enables the electronic device to automatically guide the user to successfully complete the calibration if the calibration cannot currently be completed, which simplifies the interaction between the user and the electronic device and enhances the operability of the electronic device and makes the user-device interface more efficient (e.g., by reducing the time it takes to complete the calibration and reducing the inputs needed to troubleshoot an unsuccessful calibration), which additionally reduces power usage and improves battery life of the electronic device by enabling the user to use the electronic device more quickly and efficiently.

In some embodiments, such as in FIG. 6AA, initiating the calibration of the output of the electronic device 504 (e.g., the display generation component and/or the first electronic device) includes outputting a respective visual indication 624a and outputting a respective audio indication. In some embodiments, the visual indication and audio indication are synchronized (e.g., the start times of each of the visual and audio indications is the same). The first electronic device optionally presents the visual indication and the audio indication at the same time or with a predetermined delay. In some embodiments, such as in FIG. 6AA, the respective visual indication 624a is detected by the second electronic device 500b for calibrating a visual output of the electronic device 504a (e.g., the first electronic device and/or the display generation component) and for calibrating an audio output of the electronic device 500a (e.g., via speakers 500c and 500d). In some embodiments, the visual indication is used to perform a color calibration of the first electronic device and/or the display generation component and to perform an audio-video synchronization of the first electronic device. The color calibration optionally calibrates an output of the first electronic device provided to the display generation component and/or an output generated by the display generation component. In some embodiments, during the color calibration, the second electronic device detects the color of one or more images displayed by the electronic device and transmits the color information to the first electronic device to perform the calibration (e.g., to adjust the output of the first electronic device to better reproduce the target color(s)). The audio-video synchronization calibration optionally calibrates a relative timing of the video output and audio output of the first electronic device, including synchronizing the audio of multiple audio output devices in communication with the first electronic device. In some embodiments, during the audio-video synchronization calibration, the second electronic device detects an audio output and video output provided by the first electronic device and transmits the relative timing at which the audio and video were detected to perform the calibration (e.g., to determine any delay between generation/receipt of the audio and video outputs). In some embodiments, the audio-visual synchronization and the color calibration are performed at the same time to reduce the time it takes to perform both calibrations (e.g., the same visual indication used to calibrate the video output is used as the video reference for performing the audio delay calibration). In some embodiments, the audio-visual synchronization and the color calibration are performed at different times to avoid overwriting user-adjusted settings pertaining to one calibration while performing the other calibration. In some embodiments, the same visual indication is used for both calibrations. In some embodiments, the visual indication is different for each calibration process. In some embodiments, such as in FIG. 6AA, the respective audio indication is detected by the second electronic device 500b for calibrating the audio output of the electronic device 500a. The second electronic device optionally uses the audio indication to perform an audio-visual synchronization calibration of the audio and video outputs of the first electronic device, including synchronizing the audio outputs provided to each of a plurality of audio output devices in communication with the first electronic device. In some embodiments, the audio indication is not used by the second electronic device to perform the color calibration.

The above-described manner of using the visual indication to perform a visual calibration and an audio calibration and using the audio indication to perform the audio calibration enables the electronic device to perform multiple calibrations using one visual indication, which simplifies the interaction between the user and the electronic device and enhances the operability of the electronic device and makes the user-device interface more efficient (e.g., by reducing the time it takes to perform both calibrations and/or reducing the volume of stored information related to calibrations), which additionally reduces power usage and improves battery life of the electronic device by enabling the user to use the electronic device more quickly and efficiently.

In some embodiments, the audio-video synchronization calibration illustrated in FIGS. 6AA-6BB result shifts the timing of audio and video signals output by the first electronic device. The first electronic device optionally adjusts the timing of multiple audio signals being transmitted to multiple audio output devices in communication with the first electronic device. For example, a set-top box modifies the timing of a video signal being transmitted to a television and audio signals being transmitted to one or more speaker systems to be used at the same time to output audio provided by the set-top box (e.g., adjusts the relative delay between transmitting video outputs and audio outputs such that the audio and video outputs end up being presented (e.g., displayed by a television and played by a television/speaker/audio system) at the same time (e.g., within a time threshold, such as 3 ms, 5 ms, 10s of each other).

In some embodiments, the visual indication used for the audio-video synchronization calibration is the same as the visual indication used to perform the color calibration. In some embodiments, the visual indications used for the two calibration processes are different.

In some embodiments, after performing a color or audio calibration of the electronic device (e.g., the first electronic device or the display generation component), the first electronic device 500a presents an image 628a-628b comparing the color balance before the calibration to the color balance after the calibration (e.g., a split screen view of the difference, or sequential screens showing the difference), such as in FIG. 6M.

In some embodiments, prior to outputting the indication 618 directing placement of the second electronic device 500b illustrated in FIG. 6E, the first electronic device 500a receives, from the second electronic device 500b, an indication that a pairing process of the first electronic device 500a and the second electronic device 500b is successful, such as in FIG. 6D. In some embodiments, prior to displaying the indication directing placement of the second electronic device for the purpose of calibrating the output of the electronic device (e.g., the first electronic device and/or the display generation component), the first and second electronic devices undergo a pairing process, thus enabling the first and second electronic devices to communicate with one another for the purpose of performing the calibration process. In some embodiments, the pairing process is initiated at the first electronic device. When pairing is successful, the second electronic device optionally transmits an indication to the first electronic device to confirm the pairing. In some embodiments, outputting the indication 618 directing placement of the second electronic device 500b shown in FIG. 6E is performed in response to receiving the indication that the pairing process is successful. In some embodiments, if the indication that the pairing process is successful is not received within a predetermined time of initiating the pairing process, the first electronic device optionally presents an error message and/or troubleshooting message and forgoes presenting the indication direction placement of the second electronic device for the calibration process.

The above-described manner of presenting the indication directing placement of the second electronic device in response to receiving the indication that the pairing process is successful enables the electronic device to automatically present the indication directing placement of the second electronic device when the second electronic device and first electronic device are paired and ready to perform the calibration process, which simplifies the interaction between the user and the electronic device and enhances the operability of the electronic device and makes the user-device interface more efficient (e.g., by reducing the number of inputs needed to initiate the calibration process), which additionally reduces power usage and improves battery life of the electronic device by enabling the user to use the electronic device more quickly and efficiently.

In some embodiments, the one or more calibration criteria include a criterion that is satisfied when the second electronic device 500*b* is at a particular position with respect to the electronic device (e.g., the criterion represented by legend 620*b*, such as in FIG. 6E). In some embodiments, the criterion is satisfied when the second electronic device (e.g., a camera and/or an ambient light color/temperature sensor of the second electronic device) is positioned overlaid on at least a portion of the indication directing the placement of the second electronic device. The second electronic device optionally detects that it is located overlaid on the visual indication directing placement of the second electronic device using a camera and/or an ambient light color/temperature sensor in communication with or integrated with the second electronic device to detect the indication directing placement of the second electronic device. The above-described manner of evaluating the position of the second electronic device with respect to the electronic device as one of the criteria enables the electronic device to initiate the calibration when the second electronic device is positioned such that it is possible to perform the calibration, which simplifies the interaction between the user and the electronic device and enhances the operability of the electronic device and makes the user-device interface more efficient (e.g., by reducing the number of calibration attempts needed to successfully perform the calibration), which additionally reduces power usage and improves battery life of the electronic device by enabling the user to use the electronic device more quickly and efficiently.

In some embodiments, the one or more calibration criteria include a criterion that is satisfied when an orientation of the second electronic device (e.g., relative to the electronic device or relative to gravity) is within a threshold of a predetermined orientation (e.g., the criteria corresponding to legend 620*d* such as in FIG. 6E). In some embodiments, the second electronic device uses a 672 to detect the orientation of the second electronic device relative to the electronic device (e.g., the first electronic device and/or the display generation component). In some embodiments, the second electronic device uses an accelerometer to detect the orientation of the second electronic device relative to gravity. In some embodiments, the proper orientation of the second electronic device ensures that the camera and/or an ambient light color/temperature sensor of the second electronic device properly detects the visual indication displayed by the electronic device. The above-described manner of evaluating the orientation of the second electronic device as one of the criteria enables the electronic device to initiate the calibration when the second electronic device is positioned such that it is possible to perform the calibration, which simplifies the interaction between the user and the electronic device and enhances the operability of the electronic device and makes the user-device interface more efficient (e.g., by reducing the number of calibration attempts needed to successfully perform the calibration), which additionally reduces power usage and improves battery life of the electronic device by enabling the user to use the electronic device more quickly and efficiently.

In some embodiments, the one or more calibration criteria include a criterion (e.g., represented by legend 620*a*, such as in FIG. 6E) that is satisfied when a distance between the second electronic device and the electronic device (e.g., the first electronic device and/or the display generation component) is less than a threshold distance (e.g., 1 or 2 or 3 cm). In some embodiments, the second electronic device uses a proximity sensor to detect the distance between the second electronic device and a proximate surface and uses a camera and/or an ambient light color/temperature sensor to verify that the proximate surface is the surface of the electronic device (e.g., the first electronic device or the display generation component). In some embodiments, the proper distance between the second electronic device and the electronic device ensures that the camera and/or an ambient light color/temperature sensor of the second electronic device properly detects the visual indication displayed by the electronic device (e.g., by reducing light other than that from the visual indication from reaching the camera and/or an ambient light color/temperature sensor of the second electronic device). The above-described manner of evaluating the distance between the second electronic device and the electronic device as one of the criteria enables the electronic device to initiate the calibration when the second electronic device is positioned such that it is possible to perform the calibration, which simplifies the interaction between the user and the electronic device and enhances the operability of the electronic device and makes the user-device interface more efficient (e.g., by reducing the number of calibration attempts needed to successfully perform the calibration), which additionally reduces power usage and improves battery life of the electronic device by enabling the user to use the electronic device more quickly and efficiently.

In some embodiments, the one or more criteria include a criterion that is satisfied when a respective image sensor (e.g., camera and/or an ambient light color/temperature sensor) integrated or in communication with the second electronic device is facing the electronic device (e.g., the first electronic device or the display generation component). The second electronic device optionally includes image sensors on two opposite sides of the second electronic device, including an image sensor that detects a color of ambient light that is on the same side of the second electronic device as a proximity sensor of the second electronic device. In some embodiments, the one or more criteria include a criterion that is satisfied when the image sensor that detects the color of the ambient light and the proximity sensor are facing the electronic device (e.g., the display generation component or the first electronic device).

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 800) are also applicable in an analogous manner to method 700 described above with respect to FIG. 7. For example, the ways of providing an indication directing placement of another device described above with reference to method 700 optionally have one or more of the characteristics of the ways of evaluating placement criteria, etc., described herein with reference to other methods described herein (e.g., method 800). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C or application specific chips. Further, the operations described above with reference to FIG. 7 are, optionally, implemented by components depicted in FIGS. 1A-1B. For example, outputting operations 702, 704, and 710 and initiating operation 712 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 8:
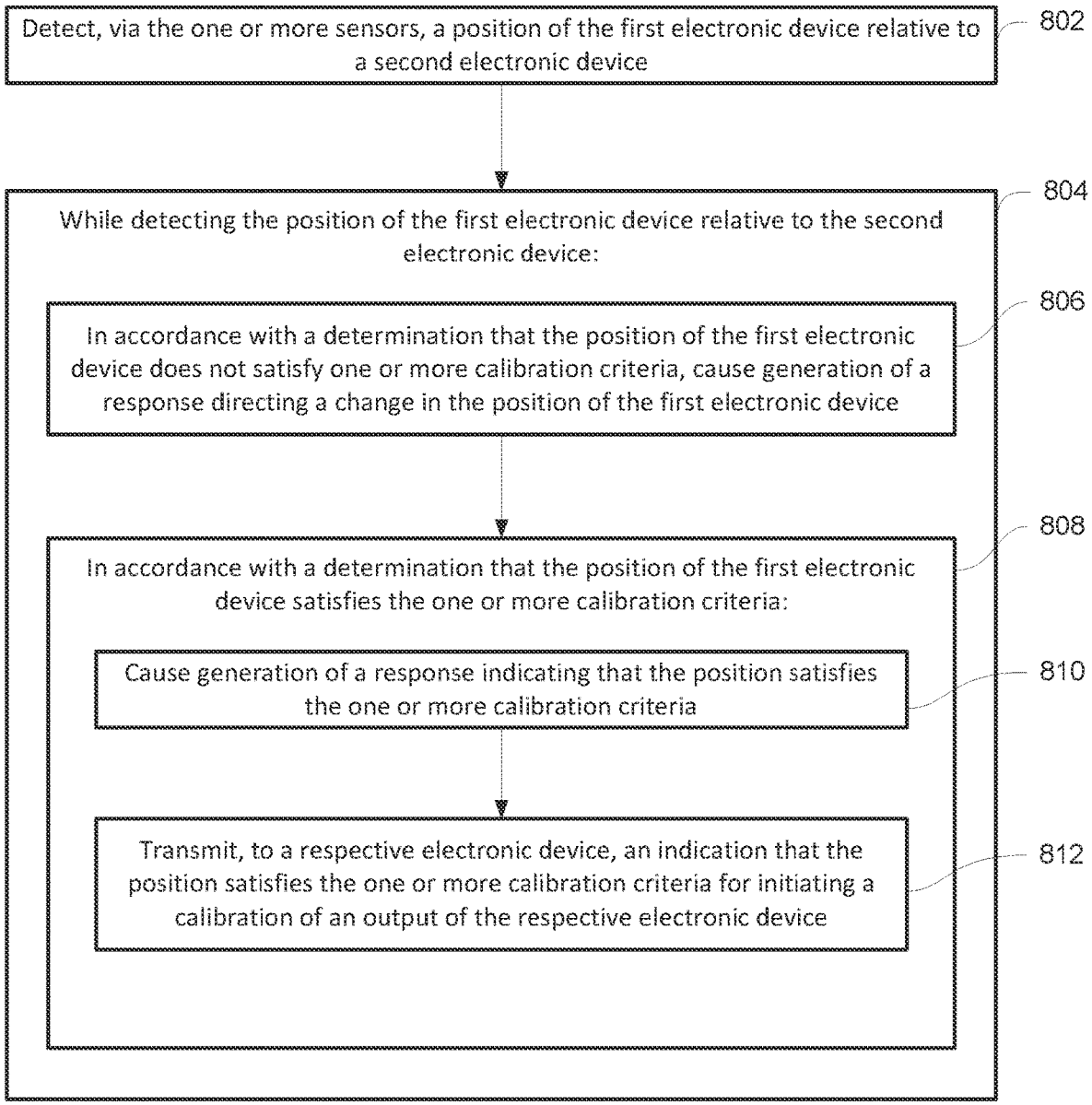
FIG. 8 is a flow diagrams illustrating a method of evaluating the position of a first electronic device to perform a calibration and/or synchronization of one or more outputs of another electronic device in accordance with some embodiments of the disclosure.

FIG. 8 is a flow diagrams illustrating a method of evaluating the position of a first electronic device 500*b* to perform a calibration and/or synchronization of one or more outputs of another electronic device 500*a* or 504*a* in accordance with some embodiments of the disclosure. The method 800 is optionally performed at an electronic device such as device 100, device 300, device 500, device 510, and device 511 as described above with reference to FIGS. 1A-1B, 2-3, 4A-4B and 5A-5C. Some operations in method 800 are, optionally combined and/or order of some operations is, optionally, changed.

As described below, the method 800 provides ways of evaluating the position of the first electronic device 500*b* to perform a calibration of another electronic device (e.g., electronic device 500*a*, speakers 500*c* and 500*d*, or display generation component 504*a*). The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 800 is performed at a first electronic device 500*b* in communication with one or more sensors (e.g., a mobile device (e.g., a tablet, a smartphone, a media player), a computer (e.g., a desktop computer, a laptop computer), or a wearable device (e.g., a watch, a head-mounted device)). In some embodiments, the one or more sensors include one or more cameras and/or image sensors (e.g., visible light camera(s), IR cameras), proximity sensor(s), accelerometer(s) and/or gyroscopes.).

In some embodiments, the electronic device 500*b* detects (802), via the one or more sensors, a position (e.g., a location and/or an orientation) of the first electronic device 500*b* relative to a second electronic device 504*a*, such as in FIG. 6F (e.g., a display generation component in communication with a third electronic device). In some embodiments, the first electronic device determines its distance from the second electronic device using one or more proximity and/or image sensors. In some embodiments, the first electronic device determines its alignment relative to an indication of a desired position of the first electronic device displayed on the second electronic device using the one or more image sensors and/or cameras and/or ambient light color/temperature sensor(s). In some embodiments, the first electronic device determines its angle relative to second electronic device using one or more proximity sensors and its angle relative to gravity using one or more accelerometers and/or gyroscopes. For example, a smartphone uses its one or more sensors to determine its position relative to an indication displayed on a television screen that is in communication with a set-top box, including detecting whether or not the smartphone's placement overlaps the indication, whether or not the smartphone is within a threshold angle (e.g., 10 degrees or less) of parallel to the television screen, and whether the smartphone is within a threshold angle (e.g., 10 degrees or less) of upright relative to gravity. In some embodiments, the first electronic device is analogous to the second electronic device described above with reference to method 700 and the second electronic device is analogous to the electronic device described above with reference to method 700.

In some embodiments, such as in FIG. 6T, while detecting the position of the first electronic device 500*b* relative to the second electronic device 504*a* (804), (e.g., the display generation component or a third electronic device that includes a display generation component), in accordance with a determination that the position of the first electronic device 500*b* does not satisfy one or more calibration criteria, the first electronic device 500*b* causes (806) generation of a response (e.g., a visual or tactile response at the first device, a visual or audio response at the display generation component via the second electronic device, etc.) directing a change in the position of the first electronic device (e.g., towards satisfying the one or more calibration criteria). Optionally, the first electronic device generates a tactile output or an audio output or transmits an indication to the second electronic device to generate an image or sound indicating that the position of the first electronic device does not satisfy the calibration criteria. For example, a smartphone generates haptic feedback and transmits an indication to a set-top box to display a message instructing the user to adjust the position of the smartphone.

In some embodiments, such as in FIG. 6S, while detecting the position of the first electronic device 500*b* relative to the second electronic device 504*a* (804), in accordance with a determination that the position of the first electronic device 500*b* satisfies the one or more calibration criteria (808)(e.g., the first electronic device is in a position relative to the display generation component in communication with the second electronic device that is sufficient for performing a calibration of an output of the display generation component), the first electronic device 500*b* causes (810) generation of a response indicating that the position satisfies the one or more calibration criteria (e.g., the first electronic device generates audio and/or tactile feedback and/or transmits an indication to the second electronic device to generate a visual and/or audio indication). For example, a smartphone generates a haptic and transmits an indication to a set-top box to display an indication on a television screen that the position of the smartphone relative to the television screen satisfies the calibration criteria. For example, a smartphone is positioned overlaid on a calibration indication displayed on a television screen that is in communication with a set-top box at a close distance (e.g., within 2 cm, 1 cm, 0.5 cm) from the surface of the television screen, and upright relative to gravity.

In some embodiments, such as in FIG. 6S, while detecting the position of the first electronic device 500b relative to the second electronic device 504a (804), in accordance with a determination that the position of the first electronic device 500b satisfies the one or more calibration criteria (808), the first electronic device 500b transmits (812), to a respective electronic device 500a, an indication that the position satisfies the one or more calibration criteria for initiating a calibration of an output of the respective electronic device 500a or 504a (e.g., the display generation component). In some embodiments, the first electronic device transmits an indication to the respective electronic device to initiate the calibration procedure in response to detecting that the position of the first electronic device relative to the second electronic device satisfies the one or more criteria. For example, a smartphone transmits an indication to a set-top box that the smartphone is positioned over a position indicator displayed on a television screen that is in communication with the set top box, and the indication causes the set-top box to display a series of images as part of a color calibration procedure of the output of the television screen. The respective electronic device is optionally one of the second electronic device or an electronic device in communication with the second electronic device that provides a video signal for display via the second electronic device. In some embodiments, the respective electronic device is analogous to the first electronic device referenced in the description of method 700. The above-described manner of providing feedback to the user about the position of the first electronic device and transmitting an indication to the second electronic device to initiate the calibration procedure in response to detecting that the position of the first electronic device satisfies the calibration criteria enables the electronic device to efficiently cause initiation of the calibration procedure only when the position of the first electronic device will produce a successful calibration, which simplifies the interaction between the user and the electronic device and enhances the operability of the electronic device and makes the user-device interface more efficient (e.g., by reducing the inputs needed to perform the calibration and reducing the number of times the calibration must be performed to achieve a successful result), which additionally reduces power usage and improves battery life of the electronic device by enabling the user to use the electronic device more quickly and efficiently.

In some embodiments, such as in FIGS. 6H-6L, after calibration of the respective electronic device 504a or 500a has been initiated and during the calibration process, the first electronic device 500b detects, using an ambient light sensor, the color(s) of a series of images 624a-e displayed by the second electronic device 504a and transmits either image data or calibration data to the respective electronic device 500a or 504a (e.g., the second electronic device or a third electronic device in communication with the second electronic device).

In some embodiments, generating the response indicating that the position satisfies the one or more calibration criteria includes generating a tactile output, such as in FIG. 6G.

In some embodiments, such as in FIG. 6G, the first electronic device 500b detects its position relative to the second electronic device 504a using, at least in part, a camera and/or an ambient light color/temperature sensor. The first electronic device 500b optionally detects an image displayed by the second electronic device 504a using the camera. In some embodiments, the one or more calibration criteria include a criterion that is satisfied when the first electronic device (e.g., the camera and/or the ambient light color/temperature sensor of the first electronic device) is positioned overlaid on a respective portion of an image displayed via the second electronic device, such as according to one or more steps of method 700.

In some embodiments, such as in FIG. 6T, causing generation of the response directing the change in the position of the first electronic device 500b includes generating a tactile response, at the first electronic device 500b, directing the change in the position of the first electronic device 500b. In some embodiments, the first electronic device generates a tactile response directing change of the position of the first electronic device in accordance with the determination that the position of the first electronic device does not satisfy the one or more calibration criteria. In some embodiments, the first electronic device generates a different tactile response in accordance with the determination that the position of the first electronic device satisfies the one or more calibration criteria. For example, the tactile response directing change of the placement of the first electronic device and the tactile response generated in accordance with the determination that the position of the first electronic device satisfies the one or more calibration criteria have one or more of different frequencies, durations, and/or patterns. In some embodiments, the first electronic device generates a continuous tactile response that increase in magnitude, frequency, pattern, or another characteristic as the electronic device moves closer to, and decreases in magnitude, frequency, pattern or other characteristic as the electronic device move further from, satisfying the one or more calibration criteria.

The above-described manner of generating a tactile response directing the change in position of the first electronic device enables the electronic device to instruct the user to change the position of the electronic device in a manner that does not require the user to move the electronic device to see a display generation component integrated into the first electronic device (e.g., which is optionally oriented towards the second electronic device, and not towards the user) which simplifies the interaction between the user and the electronic device and enhances the operability of the electronic device and makes the user-device interface more efficient (e.g., by reducing the time it takes to receive feedback on the position of the first electronic device, thereby reducing the amount of time it takes to adjust the position of the first electronic device), which additionally reduces power usage and improves battery life of the electronic device by enabling the user to use the electronic device more quickly and efficiently.

In some embodiments, such as in FIG. 6E, prior to determining that the position of the first electronic device 500b satisfies a respective criterion of the one or more calibration criteria, a display generation component 504b in communication with the first electronic device 500b is displaying a visual output (e.g., a touch screen integrated into the first electronic device displays a user interface, such as a user interface directing a pairing operation with the respective electronic device or a user interface directing placement of the first electronic device for the purpose of calibrating the respective electronic device).

In some embodiments, in accordance with the determination that the position of the first electronic device 500b satisfies the respective criterion of the one or more calibration criteria, the first electronic device 500b ceases to display the visual output at the display generation component 504b in communication with the first electronic device 500*b*, such as in FIG. 6F. In some embodiments, in accordance with the determination that the proximity of the first electronic device satisfies a proximity criterion of the one or more calibration criteria, the first electronic device powers off a touch screen or other display generation component included in the first electronic device. For example, a smartphone powers off—or otherwise ceases light output from—its touch screen in accordance with a determination that the smartphone is positioned over a visual indication output by a set-top box for display on a television screen. In some embodiments, the first electronic device does this so light output from its display does not influence the light detected by the camera and/or the ambient light color/temperature sensor of the first electronic device (e.g., optionally on the same side of the first electronic device as the display). In some embodiments, the display of the first electronic device does not cease displaying an image until all of the one or more calibration criteria are satisfied.

The above-described manner of ceasing display of the visual output in accordance with the determination that the position of the first electronic device satisfies the one or more calibration criteria enables the electronic device to capture an image of the second electronic device without interference by the display of the first electronic device which simplifies the interaction between the user and the electronic device and enhances the operability of the electronic device and makes the user-device interface more efficient (e.g., by improving the accuracy and speed of a calibration process), which additionally reduces power usage and improves battery life of the electronic device by enabling the user to use the electronic device more quickly and efficiently.

In some embodiments, such as in FIG. 6G, causing generation of the response indicating that the position satisfies the one or more calibration criteria includes generating a tactile response (e.g., vibration, haptics) at the first electronic device 500*b*. For example, a smartphone generates haptic feedback in accordance with a determination that the smartphone (e.g., a camera and/or an ambient light color/temperature sensor of the smartphone) is positioned over a calibration indication displayed on a television by a set-top box.

The above-described manner of generating a tactile response as the response indicating that the position satisfies the one or more calibration criteria enables the electronic device to provide feedback to the user that the position of the first electronic device is correct without requiring the user to move the first electronic device to view visual feedback displayed on a display of the first electronic device which simplifies the interaction between the user and the electronic device and enhances the operability of the electronic device and makes the user-device interface more efficient (e.g., by reducing the time it takes to verify the position of the first electronic device is correct, thus reducing the time it takes to initiate the calibration), which additionally reduces power usage and improves battery life of the electronic device by enabling the user to use the electronic device more quickly and efficiently.

In some embodiments, the tactile response has a characteristic (e.g., frequency, magnitude, pattern, etc.) with a first value, such as in FIG. 6G. In some embodiments, after determining that the position of the first electronic device 500*b* satisfies the one or more calibration criteria, in accordance with a determination that the position of the first electronic device 500*b* has changed from satisfying the one or more calibration criteria to not satisfying the one or more calibration criteria, such as in FIG. 6T, generating, at the first electronic device 500*b*, a second tactile response having the characteristic with a second value, different from the first value. In some embodiments, the first electronic device generates different tactile responses in response to detecting the position of the first electronic device satisfies the one or more calibration criteria and in response to detecting the position of the first electronic device does not satisfy the one or more calibration criteria. For example, the tactile response directing change of the placement of the first electronic device and the tactile response generated in accordance with the determination that the position of the first electronic device satisfies the one or more calibration criteria have one or more of different frequencies, durations, and/or patterns. In some embodiments, the first electronic device generates a continuous tactile response that changes in magnitude, frequency, pattern, or another characteristic as the electronic device moves closer or further from satisfying the one or more calibration criteria. For example, the first electronic device generates a continuous haptic until the position of the first electronic device satisfies the one or more criteria. IN this example, in response to detecting that the position of the first electronic device changes from satisfying the one or more criteria to not satisfying the one or more criteria, the first electronic device generates a different haptic output, such as a series of pulses or "taps" as the first electronic device moves further from the position satisfying the one or more criteria.

The above-described manner of generating the second tactile response with the characteristic having the second value in response to detecting that the position of the first electronic device has changed from satisfying the one or more calibration criteria to not satisfying the one or more calibration criteria enables the electronic device to communicate to the user that the placement of the first electronic device is no longer acceptable in a manner that does not require the user to look at a display generation component of the first electronic device or move the electronic device to be able to view the display generation component of the first electronic device which simplifies the interaction between the user and the electronic device and enhances the operability of the electronic device and makes the user-device interface more efficient (e.g., by increasing the speed at which the user is able to receive the feedback on the position of the electronic device, thereby reducing the time it takes to initiate the calibration), which additionally reduces power usage and improves battery life of the electronic device by enabling the user to use the electronic device more quickly and efficiently.

In some embodiments, such as in FIG. 6AA, during an audio-visual synchronization calibration of the respective electronic device 504*a* or 500*a*, the first electronic device 500*b* receives visual input and audio input(s) generated by the respective output device 504*a*, 500*c*, or 500*d*. The first electronic device and/or the respective electronic device optionally determines delay based on known timing of the generated video and audio and the received timing of the video and audio at the first electronic device. In some embodiments, the respective electronic device is in communication with multiple speaker systems to generate an audio output of the respective electronic device. In some situations, the speaker systems are out of synchronization with one another. In some embodiments, the calibration process includes generating audio at each speaker system to determine the delay of each system, thus enabling synchronization calibration of the speaker systems. In some embodiments, the audio-visual calibration and a color calibration process are performed together or separately.

In some embodiments, such as in FIG. 6AA the respective electronic device 504a provides an image 624a or a series of images as part of a color calibration process and provides an image and audio as part of an audio-video synchronization calibration process. In some embodiments, the images used for the calibration processes are the same. In some embodiments, the images used for the calibration processes are different.

In some embodiments, prior to detecting, via the one or more sensors, the position of the first electronic device 500b relative to the second electronic device 504a, the first electronic device 500b receives, from the respective electronic device 500a, an indication to perform a pairing process to pair the first electronic device 500b with the respective electronic device 500a, such as in FIG. 6D. In some embodiments, the pairing process enables the first electronic device and the respective electronic device to communicate with one another, including the first electronic device transmitting calibration measurements or data to the respective electronic device (e.g., colors detected during a color calibration process, timing of audio and video during an audio-video synchronization calibration process. In some embodiments, in response to receiving a user input to perform the pairing process, such as in FIG. 6D, the first electronic device 500a performs the pairing process to pair the first electronic device 500b with the respective electronic device 500a. In some embodiments, detecting the position of the first electronic device 500b relative to the second electronic device 504a, such as in FIG. 6E, is in accordance with a determination that the pairing process to pair the first electronic device and the respective electronic device was successful. In some embodiments, in accordance with a determination that the pairing process was not successful, the first electronic device forgoes detecting the position of the first electronic device relative to the second electronic device, such as according to one or more steps of method 700. For example, in response to detecting that pairing between a smartphone and a set-top box is successful, the smartphone detects its position with respect to a television in communication with the set-top box.

The above-described manner of detecting the position of the first electronic device in accordance with a determination that pairing between the first electronic device and the respective electronic device was successful enables the electronic device to begin guiding placement of the first electronic device when the first electronic device and respective electronic device are ready to perform the calibration process, which simplifies the interaction between the user and the electronic device and enhances the operability of the electronic device and makes the user-device interface more efficient (e.g., by reducing the time it takes to position the first electronic device for calibration), which additionally reduces power usage and improves battery life of the electronic device by enabling the user to use the electronic device more quickly and efficiently.

In some embodiments, such as in FIG. 6G the one or more calibration criteria include a criterion (e.g., the criterion represented by legend 620b in FIG. 6G) that is satisfied when the first electronic device is positioned overlaid on a visual indication 618 displayed by the second electronic device 504a. In some embodiments, the first electronic device 500b detects that it (e.g., a camera and/or ambient light color/temperature sensor of the first electronic device) is positioned overlaid on the visual indication displayed by the second electronic device using one or more cameras and/or an ambient light color/temperature sensor in communication with the first electronic device. In some embodiments, the one or more cameras are integrated with the same side of the first electronic device as an ambient light sensor configured to detect the temperature of ambient light. The first electronic device optionally also uses the ambient light sensor to adjust the temperature of the output of a display generation component in communication with the first electronic device, such as according to one or more steps of method 700.

The above-described manner of evaluating the position of the first electronic device including whether the first electronic device is positioned overlaid on the visual indication displayed by the second electronic device enables the electronic device to evaluate the position of the first electronic device against criteria readily understood by the user, which simplifies the interaction between the user and the electronic device and enhances the operability of the electronic device and makes the user-device interface more efficient (e.g., by reducing the time it takes to satisfy the one or more calibration criteria), which additionally reduces power usage and improves battery life of the electronic device by enabling the user to use the electronic device more quickly and efficiently.

In some embodiments, the one or more calibration criteria include a criterion (e.g., the criterion represented by legend 620d, such as in FIG. 6G) that is satisfied when an orientation of the first electronic device 500b is within a threshold of a predetermined orientation. In some embodiments, the first electronic device uses an accelerometer to determine the orientation of the first electronic device relative to gravity and the criterion is satisfied when the first electronic device is within a threshold angle of being parallel to gravity, such as according to one or more steps of method 700.

The above-described manner of evaluating the position of the first electronic device including evaluating whether the orientation of the electronic device is within a threshold of a predetermined orientation enables the electronic device to initiate calibration when the first electronic device is in an orientation at which calibration is able to be performed, which simplifies the interaction between the user and the electronic device and enhances the operability of the electronic device and makes the user-device interface more efficient (e.g., by reducing the time it takes to achieve a successful calibration), which additionally reduces power usage and improves battery life of the electronic device by enabling the user to use the electronic device more quickly and efficiently.

In some embodiments, the one or more calibration criteria include a criterion (e.g., the criterion represented by legend 620, such as in FIG. 6G) that is satisfied when the first electronic device 500b is within a threshold distance (e.g., 1 or 2 or 3 cm) of the second electronic device 504b. In some embodiments, the first electronic device uses a proximity sensor to determine the distance between the first electronic device and a surface proximate to the first electronic device and uses a camera and/or an ambient light color/temperature sensor to determine that the surface proximate to the first electronic device is the second electronic device, such as according to one or more steps of method 700. In some embodiments, the first electronic device also uses the proximity sensor to detect proximity to a user's ear during a phone call and, in response to detecting the user's ear, the first electronic device darkens the display of the first electronic device and/or disables touch sensing of the touch screen of the first electronic device.

The above-described manner of evaluating the position of the first electronic device including evaluating whether the distance between the first electronic device and the second electronic device is within the threshold distance enables the electronic device to initiate calibration when the first electronic device is in a distance from the second electronic device at which calibration is able to be performed, which simplifies the interaction between the user and the electronic device and enhances the operability of the electronic device and makes the user-device interface more efficient (e.g., by reducing the time it takes to achieve a successful calibration), which additionally reduces power usage and improves battery life of the electronic device by enabling the user to use the electronic device more quickly and efficiently.

In some embodiments, the one or more calibration criteria include a criterion (e.g., the criterion represented by legend 620c, such as in FIG. 6G) that is satisfied when one or more image sensors of the first electronic device 500b are facing the second electronic device 504a. In some embodiments, the one or more image sensors include an ambient light temperature sensor. During calibration, the first electronic device optionally uses the ambient light temperature sensor to detect the color(s) of one or more images displayed by the second electronic device, such as according to one or more steps of method 700. In some embodiments, the first electronic device also uses the ambient light temperature sensor to detect a temperature of ambient light and uses the ambient light temperature measurement to adjust the color output of a display generation component of the first electronic device. In some embodiments, the first electronic device includes one or more additional image sensors on a side of the first electronic device opposite to the side of the electronic device on which the ambient light temperature sensor is disposed. The first electronic device optionally does not use the other image sensors when performing the calibration. In some embodiments, the first electronic device uses the color temperature sensor to detect the images in order to capture more detailed color information than the first electronic device is able to capture using the other image sensors. In some embodiments, the color temperature sensor is used because it is on the same side of the first electronic device as the proximity sensor.

The above-described manner of evaluating which side of the first electronic device faces the second electronic device enables the electronic device to initiate calibration when the first electronic device is at an orientation at which calibration is able to be performed, which simplifies the interaction between the user and the electronic device and enhances the operability of the electronic device and makes the user-device interface more efficient (e.g., by reducing the time it takes to achieve a successful calibration), which additionally reduces power usage and improves battery life of the electronic device by enabling the user to use the electronic device more quickly and efficiently.

It should be understood that the particular order in which the operations in FIG. 8 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 800 described above with respect to FIG. 8. For example, the ways of evaluating whether the position of the electronic device satisfies one or more criteria for performing a calibration or synchronization described above with reference to method 800 optionally have one or more of the characteristics of the ways of presenting an indication directing placement of another device to perform a calibration or synchronization, etc., described herein with reference to other methods described herein (e.g., method 700). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C or application specific chips. Further, the operations described above with reference to FIG. 8 are, optionally, implemented by components depicted in FIGS. 1A-1B. For example, detecting operation 802 and transmitting operation 812 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology includes facilitating a wireless connection between multiple electronic devices. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, location data can be used to facilitate communication between two or more electronic devices. Accordingly, use of such personal information data enables users to use electronic devices in coordinated manners. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of network services, the present technology can be configured to allow users to select to "opt in" or "opt out" of participation in the collection of personal information data during registration for services or anytime thereafter. In another example, users can select not to enable wireless connection between multiple electronic devices. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, wireless communication can be manually configured instead of being location-based or requiring the electronic devices to be "discoverable" by other devices.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at a first electronic device in communication with a display generation component:
outputting an indication directing placement of a second electronic device with respect to an electronic device to perform a calibration of an output;
while outputting the indication directing the placement of the second electronic device:
determining that a predetermined time has passed while outputting the indication directing the placement of the second electronic device and that a position of the second electronic device relative to the indication does not satisfy one or more calibration criteria; and
in response to determining that the predetermined time has passed while outputting the indication directing the placement of the second electronic device and that the position of the second electronic device does not satisfy the one or more calibration criteria, selectively adjusting a size of the indication directing the placement of the second electronic device;
after selectively adjusting the size of the indication directing the placement of the second electronic device, determining that the one or more calibration criteria have been satisfied, wherein the one or more calibration criteria are satisfied based on the position of the second electronic device with respect to the electronic device; and
in response to determining that the one or more calibration criteria have been satisfied, initiating the calibration of the output of the electronic device using the second electronic device.

2. The method of claim 1, wherein the one or more calibration criteria include one or more second electronic device placement criteria and one or more additional criteria that are based on the position of the second electronic device relative to the indication, and wherein selectively adjusting the size of the indication directing the placement of the second electronic device includes:
in accordance with a determination that the one or more second electronic device placement criteria are satisfied but the position of the second electronic device relative to the indication is not satisfied, adjusting the size of the indication directing the placement of the second electronic device; and
in accordance with a determination that the one or more second electronic device placement criteria are not satisfied, forgoing adjusting the size of the indication directing the placement of the second electronic device.

3. The method of claim 1, further comprising:
after initiating the calibration of the output of the electronic device using the second electronic device:
in accordance with a determination that the calibration fails to satisfy one or more criteria, outputting an indication directing changing of an output mode of the electronic device; and
in accordance with a determination that the calibration satisfies the one or more criteria, forgoing outputting the indication directing the changing of the output mode of the electronic device.

4. The method of claim 1, wherein initiating the calibration of the output of the electronic device includes:
outputting a respective visual indication and outputting a respective audio indication;
wherein:
the respective visual indication is detected by the second electronic device for calibrating a visual output of the electronic device and for calibrating an audio output of the electronic device, and
the respective audio indication is detected by the second electronic device for calibrating the audio output of the electronic device.

5. The method of claim 1, further comprising:
prior to outputting the indication directing the placement of the second electronic device:
receiving, from the second electronic device, an indication that a pairing process of the first electronic device and the second electronic device is successful,
wherein outputting the indication directing the placement of the second electronic device is performed in response to receiving the indication that the pairing process is successful.

6. The method of claim 1, wherein the one or more calibration criteria include a criterion that is satisfied when the second electronic device is at a particular position with respect to the electronic device.

7. The method of claim 1, wherein the one or more calibration criteria include a criterion that is satisfied when an orientation of the second electronic device is within a threshold of a predetermined orientation.

8. The method of claim 1, wherein the one or more calibration criteria include a criterion that is satisfied when a distance between the second electronic device and the electronic device is less than a threshold distance.

9. An electronic device, comprising:
one or more processors;
memory; and
one or more programs, wherein the one or more programs are stored in the memory and configured to be executed by the one or more processors, the one or more programs including instructions for:
outputting an indication directing placement of a second electronic device with respect to the electronic device to perform a calibration of an output;
while outputting the indication directing the placement of the second electronic device:
determining that a predetermined time has passed while outputting the indication directing the placement of the second electronic device and that a position of the second electronic device relative to the indication satisfies does not satisfy one or more calibration criteria; and
in response to determining that the predetermined time has passed while
outputting the indication directing the placement of the second electronic device and that the position of the second electronic device does not satisfy the one or more calibration criteria, selectively adjusting a size of the indication directing the placement of the second electronic device;
after selectively adjusting the size of the indication directing the placement of the second electronic device, determining that the one or more calibration criteria have been satisfied, wherein the one or more calibration criteria are satisfied based on the position of the second electronic device with respect to the electronic device; and
in response to determining that the one or more calibration criteria have been satisfied, initiating the calibration of the output of the electronic device using the second electronic device.

10. A non-transitory computer readable storage medium storing one or more programs, the one or more programs comprising instructions, which when executed by one or more processors of an electronic device, cause the electronic device to:
output an indication directing placement of a second electronic device with respect to the electronic device to perform a calibration of an output;
while outputting the indication directing the placement of the second electronic device:
determining that a predetermined time has passed while outputting the indication directing the placement of the second electronic device and that a position of the second electronic device relative to the indication does not satisfy one or more calibration criteria; and
in response to determining that the predetermined time has passed while
outputting the indication directed the placement of the second electronic device and that the position of the second electronic device does not satisfy the one or more calibration criteria, selectively adjust a size of the indication directing the placement of the second electronic device;
after selectively adjusting the size of the indication directing the placement of the second electronic device, determine that the one or more calibration criteria have been satisfied, wherein the one or more calibration criteria are satisfied based on the position of the second electronic device with respect to the electronic device; and
in response to determining that the one or more calibration criteria have been satisfied, initiate the calibration of the output of the electronic device using the second electronic device.

11. The method of claim 1, wherein prior to determining that the position of the second electronic device satisfies the one or more calibration criteria, the second electronic device is displaying, via a second display generation component of the second electronic device, a visual output, the method further comprising:
while outputting the indication directing the placement of the second electronic device, in accordance with a determination that the one or more calibration criteria have been satisfied, causing the second electronic device to cease displaying, via the second display generation component, the visual output.

12. The electronic device of claim 9, wherein the one or more calibration criteria include one or more second electronic device placement criteria and one or more additional criteria that are based on the position of the second electronic device relative to the indication, and wherein selectively adjusting the size of the indication directing the placement of the second electronic device includes:
in accordance with a determination that the one or more second electronic device placement criteria are satisfied but the position of the second electronic device relative to the indication is not satisfied, adjusting the size of the indication directing the placement of the second electronic device; and in accordance with a determination that the one or more second electronic device placement criteria are not satisfied, forgoing adjusting the size of the indication directing the placement of the second electronic device.

13. The electronic device of claim 9, further including instructions which, when executed by the one or more processors of the electronic device, further cause the electronic device to perform:
after initiating the calibration of the output of the electronic device using the second electronic device:
in accordance with a determination that the calibration fails to satisfy one or more criteria, outputting an indication directing changing of an output mode of the electronic device; and
in accordance with a determination that the calibration satisfies the one or more criteria, forgoing outputting the indication directing the changing of the output mode of the electronic device.

14. The electronic device of claim 9, wherein initiating the calibration of the output of the electronic device includes:
outputting a respective visual indication and outputting a respective audio indication;
wherein:
the respective visual indication is detected by the second electronic device for calibrating a visual output of the electronic device and for calibrating an audio output of the electronic device, and
the respective audio indication is detected by the second electronic device for calibrating the audio output of the electronic device.

15. The electronic device of claim 9, further including instructions which, when executed by the one or more processors of the electronic device, further cause the electronic device to perform:
prior to outputting the indication directing the placement of the second electronic device:
receiving, from the second electronic device, an indication that a pairing process of the electronic device and the second electronic device is successful,
wherein outputting the indication directing the placement of the second electronic device is performed in response to receiving the indication that the pairing process is successful.

16. The electronic device of claim 9, wherein the one or more calibration criteria include a criterion that is satisfied when the second electronic device is at a particular position with respect to the electronic device.

17. The electronic device of claim 9, wherein the one or more calibration criteria include a criterion that is satisfied when an orientation of the second electronic device is within a threshold of a predetermined orientation.

18. The electronic device of claim 9, wherein the one or more calibration criteria include a criterion that is satisfied when a distance between the second electronic device and the electronic device is less than a threshold distance.

19. The electronic device of claim 9, wherein prior to determining that the position of the second electronic device satisfies the one or more calibration criteria, the second electronic device is displaying, via a second display generation component of the second electronic device, a visual output, the electronic device further including instructions which, when executed by the one or more processors of the electronic device, further cause the electronic device to perform:
while outputting the indication directing the placement of the second electronic device, in accordance with a determination that the one or more calibration criteria have been satisfied, causing the second electronic device to cease displaying, via the second display generation component, the visual output.

20. The non-transitory computer readable storage medium of claim 10, wherein the one or more calibration criteria include one or more second electronic device placement criteria and one or more additional criteria that are based on the position of the second electronic device relative to the indication, and wherein selectively adjusting the size of the indication directing the placement of the second electronic device includes:
in accordance with a determination that the one or more second electronic device placement criteria are satisfied but the position of the second electronic device relative to the indication is not satisfied, adjusting the size of the indication directing the placement of the second electronic device; and
in accordance with a determination that the one or more second electronic device placement criteria are not satisfied, forgoing adjusting the size of the indication directing the placement of the second electronic device.

21. The non-transitory computer readable storage medium of claim 10, further including instructions which, when executed by the one or more processors of the electronic device, further cause the electronic device to perform:
after initiating the calibration of the output of the electronic device using the second electronic device:
in accordance with a determination that the calibration fails to satisfy one or more criteria, outputting an indication directing changing of an output mode of the electronic device; and
in accordance with a determination that the calibration satisfies the one or more criteria, forgoing outputting the indication directing the changing of the output mode of the electronic device.

22. The non-transitory computer readable storage medium of claim 10, wherein initiating the calibration of the output of the electronic device includes:
outputting a respective visual indication and outputting a respective audio indication;
wherein:
the respective visual indication is detected by the second electronic device for calibrating a visual output of the electronic device and for calibrating an audio output of the electronic device, and
the respective audio indication is detected by the second electronic device for calibrating the audio output of the electronic device.

23. The non-transitory computer readable storage medium of claim 10, further including instructions which, when executed by the one or more processors of the electronic device, further cause the electronic device to perform:
prior to outputting the indication directing the placement of the second electronic device:
receiving, from the second electronic device, an indication that a pairing process of the electronic device and the second electronic device is successful,
wherein outputting the indication directing the placement of the second electronic device is performed in response to receiving the indication that the pairing process is successful.

24. The non-transitory computer readable storage medium of claim 10, wherein the one or more calibration criteria include a criterion that is satisfied when the second electronic device is at a particular position with respect to the electronic device.

25. The non-transitory computer readable storage medium of claim 10, wherein the one or more calibration criteria include a criterion that is satisfied when an orientation of the second electronic device is within a threshold of a predetermined orientation.

26. The non-transitory computer readable storage medium of claim 10, wherein the one or more calibration criteria include a criterion that is satisfied when a distance between the second electronic device and the electronic device is less than a threshold distance.

27. The non-transitory computer readable storage medium of claim 10, wherein prior to determining that the position of the second electronic device satisfies the one or more calibration criteria, the second electronic device is displaying, via a second display generation component of the second electronic device, a visual output, the non-transitory computer readable storage medium further including instructions which, when executed by the one or more processors of the electronic device, further cause the electronic device to perform:
- while outputting the indication directing the placement of the second electronic device, in accordance with a determination that the one or more calibration criteria have been satisfied, causing the second electronic device to cease displaying, via the second display generation component, the visual output.

* * * * *